United States Patent [19]
Nilsen et al.

[11] Patent Number: 5,819,304
[45] Date of Patent: Oct. 6, 1998

[54] RANDOM ACCESS MEMORY ASSEMBLY

[75] Inventors: Kelvin D. Nilsen; William Schmidt, both of Ames, Iowa

[73] Assignee: Iowa State University Research Foundation, Inc., Ames, Iowa

[21] Appl. No.: 823,464

[22] Filed: Mar. 24, 1997

Related U.S. Application Data

[62] Division of Ser. No. 592,956, Jan. 29, 1996, Pat. No. 5,692,185.

[51] Int. Cl.$^6$ ..................................................... G06F 12/06
[52] U.S. Cl. .............................. 711/5; 711/104; 711/172
[58] Field of Search .............................. 711/5, 104–106, 711/211, 172

[56] References Cited

U.S. PATENT DOCUMENTS

| | | | |
|---|---|---|---|
| 4,706,214 | 11/1987 | Kassai | 711/149 |
| 5,228,132 | 7/1993 | Neal et al. | 711/5 |
| 5,394,541 | 2/1995 | Chesley et al. | 711/167 |
| 5,463,755 | 10/1995 | Dumarot et al. | 711/148 |
| 5,613,094 | 3/1997 | Khan et al. | 395/500 |

Primary Examiner—Eddie P. Chan
Assistant Examiner—R. G. Bragdon
Attorney, Agent, or Firm—Robert E. Malm

[57] ABSTRACT

The invention is a random access memory assembly which is a key component of an object space manager which in turn is a key circuit in a garbage-collecting control unit for a computer system. An object space manager provides the means for deriving pointers to headers of objects from pointers to internal data of objects. The object space manager comprises an encoder that generates an object locator code for each memory cell in which an object is resident, a random access memory assembly for storing the object locator codes for all memory cells in which objects are resident, and an object locator which identifies the memory cell containing the header of an object by means of the object locator code for any memory cell occupied by the object.

3 Claims, 46 Drawing Sheets

| Object Headers | |
|---|---|
| Bits | Interpretation |
| 0-1 | Type tag:<br>00 - Record<br>01 - Slice<br>10 - Slice Data Region |
| 2 | For slices, non-zero means this is a descriptor slice. |
| 2-31 | For records and slice data regions, the size of the object measured in words. |

*Figure 3*

```
typedef void *Descriptor;           // A descriptor may point to anything.
typedef unsigned int UINT;
typedef UINT *UIPTR;

// These ports represent output from the GC module to the mutator.
const UIPTR GC_Status =                 (UIPTR) 0xffffffac;
const Descriptor *GC_Result =           (Descriptor *) 0xffffffb0;
const char **GC_ToSpace =               (char **) 0xffffffb4;
const char **GC_FromSpace =             (char **) 0xffffffb8;
const UIPTR GC_SemiSpaceSize =          (UIPTR) 0xffffffbc;
const UIPTR *GC_Relocated =             (UIPTR *) 0xffffffc0;
const UIPTR *GC_CopyDest =              (UIPTR *) 0xffffffc4;
const UIPTR *GC_Reserved =              (UIPTR *) 0xffffffc8;
const UIPTR *GC_New =                   (UIPTR *) 0xffffffcc;
const UIPTR GC_NumSliceObjects =        (UIPTR) 0xffffffd0;
const UIPTR GC_CopiedSliceObjects =     (UIPTR) 0xffffffd4;
const UIPTR GC_ScannedSliceObjects =    (UIPTR) 0xffffffd8;
const UIPTR GC_NumSliceRegions =        (UIPTR) 0xffffffdc;
const UIPTR GC_NumRegionsCopied =       (UIPTR) 0xffffffe0;
const UIPTR GC_TotalSliceData =         (UIPTR) 0xffffffe4;
const UIPTR GC_TotalSliceCopied =       (UIPTR) 0xffffffe8;
const UIPTR GC_TotalSliceControlled =   (UIPTR) 0xffffffec;
const UIPTR GC_TotalSliceScanned =      (UIPTR) 0xfffffff0;
const UIPTR GC_TotalSlicePostprocessed = (UIPTR) 0xfffffff4;
const UIPTR GC_TotalZappedWords =       (UIPTR) 0xfffffff8;
const UIPTR GC_Busy =                   (UIPTR) 0xfffffffc;

// These ports represent input to the GC module from the mutator.
const UIPTR GC_AllocRec =               (UIPTR) 0xffffffb8;
const UIPTR GC_AllocDSlice =            (UIPTR) 0xffffffbc;
const UIPTR GC_AllocTSlice =            (UIPTR) 0xffffffc0;
const UIPTR GC_AllocDSubSlice =         (UIPTR) 0xffffffc4;
const UIPTR GC_AllocTSubSlice =         (UIPTR) 0xffffffc8;
const UIPTR GC_InitBlock =              (UIPTR) 0xffffffcc;
const Descriptor *GC_TendDesc =         (Descriptor *) 0xffffffd0;
const UIPTR GC_TendingDone =            (UIPTR) 0xffffffd4;
```

*Figure 4*

```
// The following values are returned in the GC_Status register in response
// to InitBlock and TendingDone invocations.
const int
    GCNotDone = 0,      // The pending operation has not yet completed.
    GCDone = 1;         // The most recently issued request is done.

// The garbage collected heap consists of two semi-spaces named to-space and from-space.
// The total size of the garbage-collected heap is twice the size of each semi-space.
const unsigned int
    SemiSpaceSize = 0x1000000;    // Number of bytes in each garbage-collected
                                  // semispace. This must be a power of 2.
```

*Figure 5*

```
const int SemiSpaceSize;  // the number of words in each semi-space struct MemWord {
    int value;           // the data stored in a particular location
    int ptrtag:1;        // 1 bit to distinguish descriptors
} Memory[2 * SemiSpaceSize], *toMem, *fromMem;
// toMem and fromMem point into Memory Address
    Relocated,    // points to next object to be copied into to-space
    Reserved,     // points to next word of to-space to be reserved for copying
    New,          // points to most recently allocated object in to-space
    CopySrc,      // points to next word to be copied out of from-space
    CopyDest,     // points to next to-space location to be copied
    CopyEnd;      // points one word beyond the to-space object
                  //   currently being copied struct ExplicitCache {
    struct MemWord data;   // data cached from memory
    Address addr;          // location of cached data
} CREG;                    // holds the memory value currently being scanned
                           //   or copied by the garbage collector class OSM {
    // clear the OSM data base
    void reset();

// create a new object
    void createHeader(Address addr, int numWords);

// find the beginning address of the object containing a particular address
    Address findHeader(Address derivedAddr);
} toOSM, fromOSM;
```

*Figure 6*

```
// Allocate a record containing size bytes of memory.
Descriptor allocRecord(int size) {
  *GC_AllocRec = size;
  return *GC_Result;
}
```

```
// Allocate a descriptor slice object that refers to size bytes of slice region data.
Descriptor allocDSlice(int size) {
   *GC_AllocDSlice = size;
   return *GC_Result;
}
```

```
// Allocate a descriptor slice object that refers to the previously
//   allocated slice data region of len bytes located at start.
Descriptor allocDSubSlice(unsigned int len, Descriptor start) {
    *GC_AllocDSubSlice = len;
    *GC_AllocDSubSlice = (int) start;
    return *GC_Result;
}
```

```
// Initialize numwords words beginning at addr with tag bits as specified by map.
void initBlock(Descriptor addr, int numwords, int map) {
    *GC_InitBlock = (int) addr;
    *GC_InitBlock = numwords;
    *GC_InitBlock = map;
    invalidateCache(addr, addr + numwords);
    while (*GC_Status == GCNotDone)
        ;
}
```

```
// Tend a single descriptor, returning its updated value.
Descriptor tendDesc(Descriptor desc) {
  // don't tend a NULL pointer
  if (desc) {
    *GC_TendDesc = desc;
    desc = *GC_Result;
  }
  return desc;
}
```

```
// inform the garbage collector that all descriptors have been tended
void tendingDone() {
  *GC_TendingDone = 0;
  while (*GC_Status == GCNotDone)
    ;
}
```

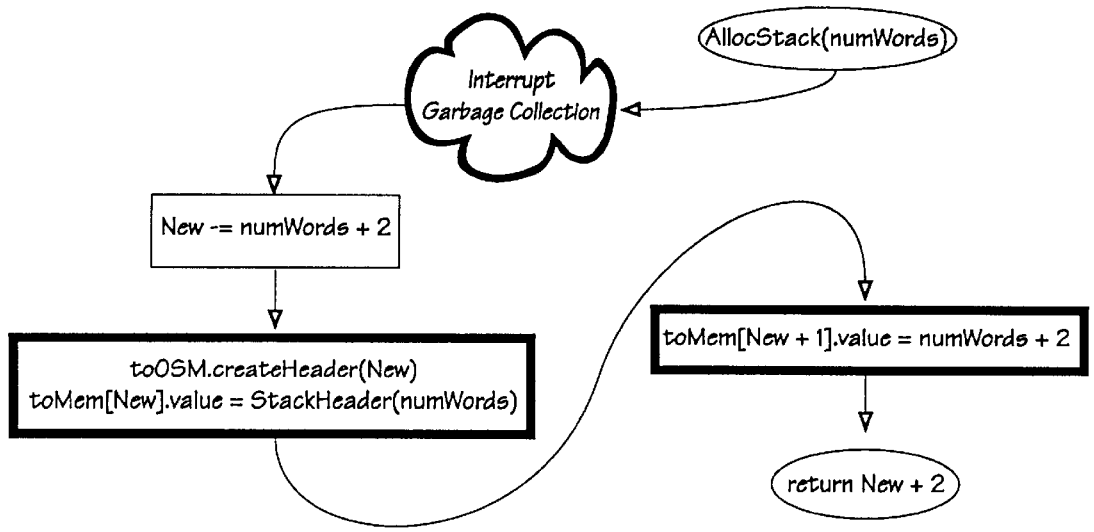

Figure 31

```
// initiate a new garbage collection
void doflip()
{
  register int i;
  char *fromSpace;

fromSpace = *GC_FromSpace;
  invalidateCache(fromSpace, fromSpace + SemiSpaceSize);
  for (i = 0; i < NumTendDesc; i++)
    TendDesc[i] = tendDesc(TendDesc[i]);
  tendingDone();
}
```

Figure 32

| Port Name | Port Address |
|---|---|
| Arbiter | 0x00 |
| GC µprocessor | 0x01 |
| RAM Module 1 | 0x02 |
| RAM Module 2 | 0x03 |
| OSM Module 1 | 0x04 |
| OSM Module 2 | 0x05 |
| Forged RAM Module 1 | 0x0a |
| Forged RAM Module 2 | 0x0b |

Figure 33

| Output to the RAM Command Port | |
| --- | --- |
| Port Bits | Interpretation |
| 0-31 | Data to be written (right justified) |
| 32 | The descriptor tag |
| 33 | The write-protect tag |
| 34-57 | Address to be read or written |
| 58 | Overwrite descriptor tag? |
| 59 | Overwrite write-protect tag? |
| 60-61 | 00 - write one byte<br>01 - write two bytes<br>10 - write 4 bytes |
| 62-63 | 00 - Read operation<br>01 - Write operation<br>1x - Reset memory operation<br>(For read operations, bits 0-33 and 58-61 are don't cares. For reset operations, bits 0-61 are don't cares.) |

*Figure 34*

| Output to the OSM Command Port | |
| --- | --- |
| Port Bits | Interpretation |
| 0-23 | For CreateHeader, address of header<br>For FindHeader, address of derived pointer |
| 24-47 | For CreateHeader, length of object in bytes |
| 48-61 | Unused |
| 62-63 | 00 - CreateHeader<br>01 - FindHeader<br>1x - Reset<br>(For FindHeader operations, bits 24-61 are don't cares. For Reset operations, bits 0-61 are don't cares.) |

*Figure 35*

Valid Bits:    | 0 | 0 | 0 | 1 | 1 | 1 | 1 | 1 |

Start Offsets: | ? | ? | ? | 3 | 3 | 3 | 6 | 6 |

Objects:

*Figure 36*

```
// Note: NumLevelOneGroups is always one.
// Other constants depend on the configuration.
const int
   NumLevelOneGroups = 4, NumLevelTwoGroups = 2, NumLevelThreeGroups = 1,
   SizeLevelOneGroup = 2, SizeLevelTwoGroup = 2, SizeLevelThreeGroup = 2;

int levelOne[NumLevelOneGroups][SizeLevelOneGroup],
    levelTwo[NumLevelTwoGroups][SizeLevelTwoGroup],
    levelThree[NumLevelThreeGroups][SizeLevelThreeGroup];

// Which group corresponds to a particular offset?
#define WhichLevelOneGroup(offset)  ((offset) / SizeLevelOneGroup)
#define WhichLevelTwoGroup(offset)  ((offset) / (SizeLevelOneGroup * SizeLevelTwoGroup))

// What starting offset corresponds to a particular group number?
#define GroupOneStart(gn) ((gn) * SizeLevelOneGroup)
#define GroupTwoStart(gn) ((gn) * SizeLevelTwoGroup * SizeLevelOneGroup)

// start and end point to the first and last words of memory contained
//   within the new object. assume that start resides within the memory
//   controlled by this OSM. end may point outside the memory controlled
//   by this OSM. OSMBase is the first address controlled by this OSM module.
void Install(int start, int end) {
   int group_number, bottom, top;

// Convert addresses to base-relative offsets.
   start -= OSMBase;
   end -= OSMBase;

if (start >= 0) {
     // Update level one.
     group_number = WhichLevelOneGroup(start);
     bottom = start - GroupOneStart(group_number);
     start_offset = start - GroupOneStart(group_number);
     if (group_number == WhichLevelOneGroup(end)) {
       top = end - GroupOneStart(group_number);
       while (bottom <= top)
         LevelOne[group_number][bottom++] = start_offset;
     }
     else {
       top = SizeLevelOneGroup - 1;
       while (bottom <= top)
         LevelOne[group_number][bottom++] = start_offset;

// Now update level two.
       group_number = WhichLevelTwoGroup(start);
       bottom = ((start - GroupTwoStart(group_number)) / SizeLevelOneGroup) + 1;
       start_offset = start - GroupTwoStart(group_number);
       if (group_number == WhichLevelTwoGroup(end)) {
         top = (end - GroupTwoStart(group_number)) / SizeLevelOneGroup;
         while (bottom <= top)
           LevelTwo[group_number][bottom++] = start_offset;
       }
```

*Figure 39*

```
    else {
      top = SizeLevelTwoGroup - 1;
      while (bottom <= top)
        LevelTwo[group_number][bottom++] = start_offset;

// Finally, update level three.
      bottom = (start / (SizeLevelOneGroup * SizeLevelTwoGroup)) + 1;
      top = end / (SizeLevelOneGroup * SizeLevelTwoGroup);
      if (top >= SizeLevelThreeGroup)
        top = SizeLevelThreeGroup - 1;
      while (bottom <= top)
        LevelThree[0][bottom++] = start;
    }
  }
}
else {           // start <= 0, update only level three
  bottom = 0;
  top = end / (SizeLevelOneGroup * SizeLevelTwoGroup);
  if (top >= SizeLevelThreeGroup)
    top = SizeLevelThreeGroup - 1;
  while (bottom <= top)
    LevelThree[0][bottom++] = start;
  }
}
```

*Figure 40*

```
// find the start address of the object containing pointer.  assume pointer
// resides within the range of memory controlled by the OSM.  OSMBase is
// the first address controlled by this OSM module.
int Lookup(int pointer) {
  int group_number, group_offset;

pointer -= OSMBase;

group_number = WhichLevelOneGroup(pointer);
  group_offset = pointer - GroupOneStart(group_number);
  if (IsValid(LevelOne[group_number][group_offset]))
    return OSMBase + GroupOneStart(group_number) +
      LevelOne[group_number][group_offset];
  else {
    group_number = WhichLevelTwoGroup(pointer);
    group_offset = (pointer - GroupTwoStart(group_number)) /
      SizeLevelOneGroup;
    if (IsValid(LevelTwo[group_number][group_offset]))
      return OSMBase + GroupTwoStart(group_number) +
        LevelTwo[group_number][group_offset];
    else {
      group_offset = pointer / (SizeLevelOneGroup * SizeLevelTwoGroup);
      return OSMBase + LevelThree[0][group_offset];
    }
  }
}
```

*Figure 41*

To Space:

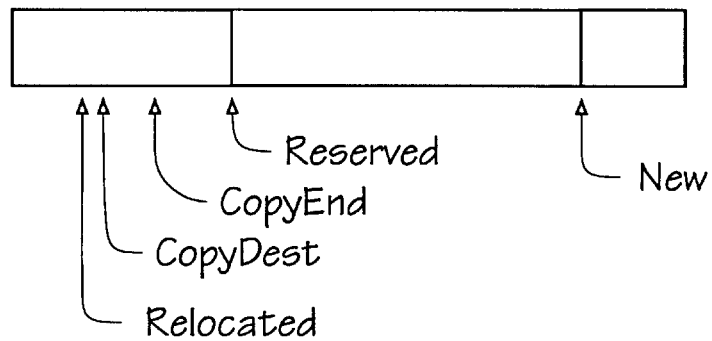

Figure 42

```
// Abstract representation of to- and from-space.
struct MemWord {
    unsigned int data;         // a word of memory
    unsigned int tagbits:2;    // descriptor and write-protect tags
} *toSpace, *fromSpace;

const int DescriptorTag = 0x01, ReadOnlyTag = 0x02;

// Returns non-zero if and only if the descriptor tag is non-zero.
int IsDescriptor(int tagbits:2) { return tagbits & DescriptorTag; }

// Assume ObjectSize returns the size of an object, measured in words, given the object's header.
int ObjectSize(int header);

// Assume PointsToFromSpace returns non-zero iff its pointer argument refers to from-space.
int PointsToFromSpace(Descriptor pointer);

class OSM {

// Return the location of the header of the object that contains the memory
    //   location referenced by derivedPointer.
    Address findHeader(Descriptor derivedPointer);

// Add the object at location where of size len words to the internal data base.
    void createHeader(Descriptor where, unsigned int len);

// Reset the OSM's state.
    void reset();
} toOSM, fromOSM;
```

Figure 43

```
void HandleRead() {
  Assume fetchAddr represents the address being fetched by the BIU;
  if ((garbage collection is not currently active) || (fetchAddr >= New))
    signal approval of the read operation;  // even before the RAM raises its ready signal
  else {
    if (fetchAddr lies between CopyDest and CopyEnd)
      fetchedData = fromSpace[(fetchAddr - CopyDest) + CopySrc];
    else if (fetchAddr lies between CopyEnd and Reserved) {
      headerLoc = toOSM.findHeader(fetchAddr);
      origObjectLoc = toSpace[headerLoc + 1];
      srcLoc = (fetchAddr - headerLoc) + origObjectLoc;
      fetchedData = fromSpace[srcLoc];
    }
    else {        // fetchAddr lies to the left of CopyDest
      Wait for the to-space RAM to raise its ready signal;
      fetchedData = the value available from the to-space RAM's command port.
    }
    if (fetchedData is a descriptor pointing to from-space)
      tend fetchedData;
    assert the high-order address bit on the local bus, the
      to-space RAM's ready signal, and the Arbiter's approval signal;
    when the BIU attempts to read the fetched word from RAM,
      place the appropriate data onto the local bus;
  }
}
```

*Figure 44*

```
void HandleWrite() {
  Assume storeAddr and storeData represent the address and data to be stored.
  if ((garbage collection is not currently active) || (storeAddr > New) || (storeAddr < CopyDest))
    signal approval of the write operation;  // even before the RAM raises its ready signal
  else if (storeAddr lies between CopyDest and CopyEnd) {
    fromSpace[(storeAddr - CopyDest) + CopySrc] = storeData;
    assert the to-space ready signal and the Arbiter's approval after
      from-space signals ready;
  }
  else {
    // storeAddr lies between CopyEnd and Reserved
    headerLoc = toOSM.findHeader(storeAddr);
    // srcLoc points to the original location of the object in from-space
    srcLoc = (storeAddr - headerLoc) + toSpace[headerLoc + 1];
    fromSpace[srcLoc] = storeData;
    assert the to-space ready signal and the Arbiter's approval after
      the from-space ready signal is raised;
  }
}
```

*Figure 45*

| Input to the Arbiter Command Port ||
|---|---|
| *Port Bits* | *Interpretation* |
| 0-31 | Descriptor tags for InitBlock<br>Descriptor value for TendDesc<br>Original slice location for AllocDSubSlice<br>and AllocTSubSlice (*bits 24-31 not used*) |
| 32-55 | Block address for InitBlock<br>Desired size for AllocRec, AllocDSlice, AllocTSlice,<br>AllocDSubSlice, AllocTSubSlice |
| 56-60 | For InitBlock, block size (00000 means 32 words)<br>For Allocate:<br>    00001 - AllocRec<br>    00010 - AllocDSlice<br>    00011 - AllocTSlice<br>    00100 - AllocDSubSlice<br>    00101 - AllocTSubSlice<br>For ReadRegister:<br>    00000 - GC_Status†<br>    00001 - GC_Result†<br>    00010 - GC_ToSpace†<br>    00011 - GC_FromSpace†<br>    00100 - GC_SemiSpaceSize†<br>    00101 - GC_Relocated†<br>    00110 - GC_CopyDest†<br>    00111 - GC_Reserved†<br>    01000 - GC_New†<br>    01001 - GC_NumSliceObjects†<br>    01010 - GC_CopiedSliceObjects<br>    01011 - GC_ScannedSliceObjects<br>    01100 - GC_NumSliceRegions†<br>    01101 - GC_NumRegionsCopied<br>    01110 - GC_TotalSliceData†<br>    01111 - GC_TotalSliceCopied<br>    10000 - GC_TotalSliceControlled<br>    10001 - GC_TotalSliceScanned†<br>    10010 - GC_TotalSlicePostprocessed<br>    10011 - GC_TotalZappedWords†<br>    10100 - GC_Busy |
| 61-63 | 000 - InitBlock<br>001 - Allocate<br>010 - ReadRegister<br>011 - TendDesc<br>100 - TendingDone |
| †This register is updated automatically by the arbiter as a side effect of certain arbiter operations. Registers not marked with † are initialized to zero by the arbiter at the time garbage collection begins, but are updated only when the microprocessor specifically requests it. ||

*Figure 46*

```
Descriptor TendDesc(Descriptor pointer) {
  struct MemWord header;

if (PointsToFromSpace(pointer)) {
    headLocation = fromOSM.findHeader(pointer);
    header = fromSpace[headLocation];
    if (IsDescriptor(header.tagbits))
      // the referenced object has already been queued for copying
      pointer = header.data + (pointer - headLocation);
    else {       // queue the referenced object to be copied later
      fromSpace[headLocation].data = Reserved;
      fromSpace[headLocation].tagbits = Descriptor | ReadOnly;
      pointer = Reserved + (pointer - headLocation);
      tospace[Reserved].data = header;
      tospace[Reserved].tagbits = ReadOnly;
      tospace[Reserved+1].data = headLocation;
      tospace[Reserved+1].tagbits = Descriptor | ReadOnly;
      toOSM.createHeader(Reserved, ObjectSize(header));
      Reserved += ObjectSize(header);
    }
  }
  return pointer;
}
```

*Figure 47*

| Inputs from the μprocessor Command Port ||
|---|---|
| Port Bits | Interpretation |
| 0-33 | Data to be written by WriteWord<br>Object size in words for CopyBlock, CopyScanBlock, ScanBlock, and CreateHeader (bits 22-33 not used) |
| 34-58 | 25-bit address for CopyBlock, CopyScanBlock, ScanBlock, ReadWord, WriteWord, FindHeader, CreateHeader<br>25-bit signed increment for IncRelocated, IncReserved, IncCopiedSliceObjects, IncScannedSliceObjects, IncNumRegionsCopied, IncTotalSliceCopied, IncTotalSliceControlled, and IncTotalSlicePostprocessed |
| 59 | Not Used |
| 60-63 | 0000 - CopyBlock<br>0001 - CopyScanBlock<br>0010 - ScanBlock<br>0011 - ReadWord<br>0100 - WriteWord<br>0101 - CreateHeader<br>0110 - FindHeader<br>0111 - IncRelocated<br>1000 - IncReserved<br>1001 - IncCopiedSliceObjects<br>1010 - IncScannedSliceObjects<br>1011 - IncNumRegionsCopied<br>1100 - IncTotalSliceCopied<br>1101 - IncTotalSliceControlled<br>1110 - IncTotalSlicePostprocessed<br>1111 - ZapFromSpace |

*Figure 48*

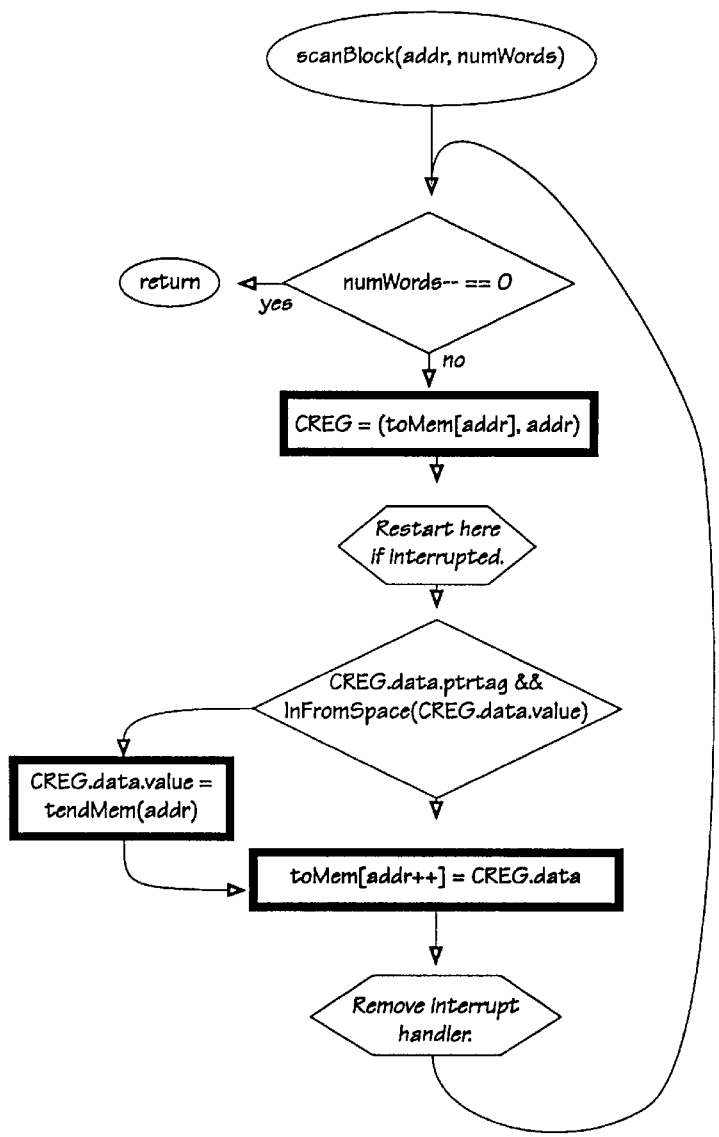

Figure 52

```
// Read from the local command port into msw (most significant word) and lsw (least
// significant word).  Stall the µprocessor until data is available at the local port.
void readLocalPort(unsigned int& msw, unsigned int& lsw);

// Write msw (most significant word) and lsw (least significant word) to the local command port.
// This function does not stall.
void writeLocalPort(unsigned int msw, unsigned int lsw);
```

Figure 53

```
const unsigned int CopyBlockCode =          0x00000000;
const unsigned int CopyScanBlockCode =      0x10000000;
const unsigned int ScanBlockCode =          0x20000000;
const unsigned int ReadWordCode =           0x30000000;
const unsigned int WriteWordCode =          0x40000000;
const unsigned int CreateHeaderCode =       0x50000000;
const unsigned int FindHeaderCode =         0x60000000;
const unsigned int IncRelocatedCode =       0x70000000;
const unsigned int IncReservedCode =        0x80000000;
const unsigned int IncCopiedSliceObjects =  0x90000000;
const unsigned int IncScannedSliceObjects = 0xa0000000;
const unsigned int IncNumRegionsCopied =    0xb0000000;
const unsigned int IncTotalSliceCopied =    0xc0000000;
const unsigned int IncTotalSliceControlled = 0xd0000000;
const unsigned int IncTotalSlicePostprocessed = 0xe0000000;
const unsigned int ZapFromSpaceCode =       0xf0000000;
```

*Figure 54*

```
const int BytesPerWord = 4;

typedef int WORD;                    // 32-bit signed value
typedef unsigned int UWORD;          // 32-bit unsigned value
typedef WORD *WPTR;                  // pointer to a 32-bit signed value typedef unsigned int Address:25,     // A 25-bit address selects memory within semi-space.
    SemiAddress:24,                  // A 24-bit address selects memory within one semi-space.
    WordSizeType:22,                 // A 22-bit unsigned quantity represents the size of
                                     //   the largest possible heap object, measured in words.
    ByteSizeType:24,                 // A 24-bit unsigned quantity represents the size of
                                     //   the largest possible heap object, measured in bytes.
    TagType:2;                       // Two bits represent the descriptor and write-protect tags.
```

*Figure 55*

```
// The following tags are used within object headers to represent the type of the object.
const unsigned int
    RecordTag =     0x00,    // A record.
    DataSliceTag =  0x01,    // A slice object.
    DataAreaTag =   0x02,    // A slice region.
    TagMask =       0x03;

const unsigned int
    DescriptorSliceTag =  0x04;    // Within a slice object header, this bit is
                                   // set if the referenced slice may contain descriptors.

int TagBits(WORD head) {
  return (head & TagMask);
}
```

*Figure 56*

```
#define SubRegionSize     8     // number of words in each subregion.

#define SmallestDataSize  7     // number of words in smallest possible slice region.

struct sr {                     // subregion control block
    WORD *first;                // points to first live data originating in this subregion.
    UWORD len;                  // number of bytes of live data in this subregion.
};

struct controlblock {           // data region control block
    WPTR srptr;                 // points to controlled region
    UWORD size;                 // how many total words in controlled block?
    struct controlblock *next;  // all control blocks are linked through this field
    struct sr subregions[1];    // this array is expanded according to size.
};

// Given that a data region occupies a total of numWords words,
//   how many subregion control blocks are involved?
//  the answer depends on:
//     1. how much of the data area contains data (subtract 1 for header)
//     2. alignment: if the size is not an exact multiple of the
//                   subregion size, round the size up.
//     3. add 1 because of ProbeOffset alignments
//
#define NumSubRegions(nw)    (((((nw) - 1) + SubRegionSize - 1) / SubRegionSize) + 1)

int ProbeOffset = 16;           // byte offset at which subregions are aligned.

static int nxtprobes[8] = {     // ProbeOffset is changed for each pass of the garbage collector.
    3, 5, 6, 7, 2, 0, 1, 4,
};

#define nextProbe(oldprobe)    (nxtprobes[oldprobe / BytesPerWord] * BytesPerWord)
```

*Figure 57*

```
// Given the header of a slice data region that is currently being garbage
// collected, return a pointer to the region's control block.
Address GetControlBlockPtr(UWORD header) {
    return (Address) (header & ~TagMask);
}

// Given a pointer to a region control block, make a header for the controlled
// region, which consists of the pointer combined with the region's type tag.
UWORD MakeControlBlockPtr(Address cbp) {
    return ((UWORD) cbp) | DataAreaTag;
}
```

*Figure 58*

```
const TagType
    DescriptorTag  =  0x01,
    WriteProtectTag = 0x02;
```

*Figure 59*

```
const int SliceSize = 3;         // Number of words in a slice object.

// Given the header of an object, return its size measured in words.
int ObjectSize(UWORD header) {
  if (TagBits(header) == SliceTag)
    return SliceSize;
  else
    return ((header) & ~TagMask) / 4;
}
```

Figure 60

```
static char *GCMemStart;         // Points to the base of garbage-collected memory.

// The garbage collected heap consists of two semi-spaces named to-space and from-space.
//  The total size of the garbage-collected heap is twice the size of each semi-space.
const unsigned int
  SemiSpaceBit = 0x1000000;      // Address bit that distinguishes between
                                 //  to-space and from-space.
```

Figure 61

```
static int pendingOperation = 0;   // Non-zero means the arbiter is working
                                   //  on a previously issued request.

static WORD dontCare;              // a 32-bit wide place holder

// Arrange for numWords of from-space memory residing at fromAddr to be
//  copied into to-space at the location named by the arbiter's Relocated
//  register.  Increment Relocated by numWords.
void copyBlock(Address fromAddr, WordSizeType numWords) {
  if (pendingOperation)
    readLocalPort(dontCare, dontCare);
  writeLocalPort(CopyBlockCode | (fromAddr << 2), numWords);
  pendingOperation = 1;
}

// Arrange for numWords of from-space memory residing at fromAddr to be
//  scanned and copied into to-space at the location named by the
//  arbiter's Relocated register.  Increment Relocated by numWords.
void copyScanBlock(Address fromAddr, WordSizeType numWords) {
  if (pendingOperation)
    readLocalPort(dontCare, dontCare);
  writeLocalPort(CopyScanBlockCode | (where << 2), numWords);
  pendingOperation = 1;
}

// Arrange to increment the arbiter's Relocated register by numWords.
void skipCopyBlock(WordSizeType numWords) {
  if (pendingOperation)
    readLocalPort(dontCare, dontCare);
  writeLocalPort(IncRelocatedCode, numWords);
  pendingOperation = 1;
}
```

Figure 62

```
// Arrange to increment the arbiter's CopiedSliceObjects register.
void incCopiedSliceObjects() {
  if (pendingOperation)
    readLocalPort(dontCare, dontCare);
  writeLocalPort(IncCopiedSliceObjectsCode, 1);
  pendingOperation = 1;
}

// Arrange to increment the arbiter's ScannedSliceObjects register.
void incScannedSliceObjects() {
  if (pendingOperation)
    readLocalPort(dontCare, dontCare);
  writeLocalPort(IncScannedSliceObjectsCode, 1);
  pendingOperation = 1;
}

// Arrange to increment the arbiter's NumRegions register.
void incNumRegions() {
  if (pendingOperation)
    readLocalPort(dontCare, dontCare);
  writeLocalPort(IncNumRegionsCode, 1);
  pendingOperation = 1;
}

// Arrange to increment the arbiter's TotalSliceCopied register by numWords.
void incTotalSliceCopied(WordSizeType numWords) {
  if (pendingOperation)
    readLocalPort(dontCare, dontCare);
  writeLocalPort(IncTotalSliceCopiedCode, numWords);
  pendingOperation = 1;
}

// Arrange to increment the arbiter's TotalSliceControlled register by numWords.
void incTotalSliceControlled(WordSizeType numWords) {
  if (pendingOperation)
    readLocalPort(dontCare, dontCare);
  writeLocalPort(IncTotalSliceControlledCode, numWords);
  pendingOperation = 1;
}

// Arrange to increment the arbiter's TotalSlicePostprocessed register by numWords.
void incTotalSlicePostprocessed(WordSizeType numWords) {
  if (pendingOperation)
    readLocalPort(dontCare, dontCare);
  writeLocalPort(IncTotalSlicePostprocessedCode, numWords);
  pendingOperation = 1;
}
```

*Figure 63*

```
// Arrange for numWords of to-space memory residing at where to be scanned.
void scanBlock(Address where, WordSizeType numWords) {
  if (pendingOperation)
    readLocalPort(dontCare, dontCare);
  writeLocalPort(ScanBlockCode | (where << 2), numWords);
  pendingOperation = 1;
}

// Arrange to write value to the to- or from-space address where,
//   setting tags as specified by tagbits.
void writeWord(Address where, WORD value, TagType tagbits) {
  if (pendingOperation)
    readLocalPort(dontCare, dontCare);
  writeLocalPort(WriteWordCode | (where << 2) | tagbits, value);
  pendingOperation = 1;
}

// Arrange to create an OSM object at where consisting of length words starting
//   at address where.  The region of memory contained within the object
//   should either be totally uninitialized insofar as the OSM is concerned,
//   or should be contained entirely within a previously created OSM object.
void createObject(Address where, WordSizeType length) {
  if (pendingOperation)
    readLocalPort(dontCare, dontCare);
  writeLocalPort(CreateHeaderCode | (where << 2), length);
  pendingOperation = 1;
}

// Arrange for all from-space memory and for the from-space OSM circuits to be initialized
//   to zero.  Don't return until it is time to begin another garbage collection pass.
void zapFromSpace() {
  if (pendingOperation)
    readLocalPort(GCProc, dontCare, dontCare);
  writeLocalPort(GCProc, ZapFromSpaceCode, dontCare);
  readLocalPort(GCProc, dontCare, dontCare);
  pendingOperation = 0;
}
```

*Figure 64*

```
// Arrange to fetch a word from either to-space or from-space.
WORD readWord(Address where, TagType& tagbits) {
  WORD value;
  if (pendingOperation)
    readLocalPort(dontCare, dontCare);
  writeLocalPort(ReadWordCode | (where << 2), dontCare);
  readLocalPort(tagbits, value);
  pendingOperation = 0;
  return value;
}

// Obtain the current value of the arbiter's Reserved register.
Address getReserved() {
  Address reservedValue;
  if (pendingOperation)
    readLocalPort(dontCare, dontCare);
  writeLocalPort(IncReservedCode, 0);
  readLocalPort(dontCare, reservedValue);
  pendingOperation = 0;
  return reservedValue;
}

// Arrange to find the header location of the object that contains derivedAddr.
Address findHeader(Address derivedAddr) {
  Address headerAddr;
  if (pendingOperation)
    readLocalPort(dontCare, dontCare);
  writeLocalPort(FindHeaderCode | (derivedAddr << 2), dontCare);
  readLocalPort(dontCare, headerAddr);
  pendingOperation = 0;
  return headerAddr;
}
```

*Figure 65*

```
Address Relocated,        // We keep a copy of the arbiter's Relocated register,
        Reserved;         //   and Reserved registers.

Address toSpaceBit;       // Most significant Address bit to to-space.

const Address EndOfList = (Address) 0x1fffffe;

Address ScanQueue;        // ScanQueue points to list of slice objects waiting to be copied.

Address ControlBlocks;    // Heads linked list of slice-region control blocks to be postprocessed
main() {
  // The first toSpace is found at GCMemStart. However, the first toSpace
  //   that the garbage collector "sees" is GCMemStart | SemiSpaceBit.
  toSpaceBit = 0;
  Relocated = Reserved = toSpaceBit;
  ScanQueue = EndOfList;
  ControlBlocks = EndOfList;
  zapFromSpace();         // Wait for the mutator to issue a tendingDone invocation.

for (;;) {
    Reserved = getReserved();
    if (Relocated < Reserved)
      copyObject();
    else if (ScanQueue != EndOfList)
      scanDataSlice();
    else if (ControlBlocks != EndOflist)
      doControlBlock();
    else {
      toSpaceBit ^= SemiSpaceBit;
      Relocated = Reserved = toSpaceBit;
      ScanQueue = ControlBlocks = EndOfList;
      ProbeOffset = nextProbe(ProbeOffset);
      zapFromSpace();
    }
  }
}
```

*Figure 66*

```
void copyObject() {
  UWORD src;
  WORD head;

head = readWord(Relocated, dontCare);
  switch (TagBits(head)) {
  case DataAreaTag:
    copyData(head);
    break;
  case DataSliceTag:
    // place slice object on the scan queue.
    head = (head & DescriptorSliceTag)? ScanQueue | 0x01: ScanQueue;
    writeWord(Relocated, head, DescriptorTag | WriteProtectTag);
    incCopiedSliceObjects();
  case RecordTag:
    src = readWord(Relocated + BytesPerWord, dontCare);
    skipCopyBlock(1);                  // skip over the header.
    copyScanBlock(src + BytesPerWord, ObjectSize(head) - 1);
    Relocated += ObjectSize(head) * BytesPerWord;
    break;
  }
}
```

*Figure 67*

```
// Copy a slice data region and overwrite the old region with a region control block.
void copyData(WORD head) {
  Address src;

src = readWord(Relocated + BytesPerWord, dontCare);
  skipCopyBlock(1);
  copyBlock(src + BytesPerWord, ObjectSize(head) - 1);
  makeControlBlock(src, head);
  writeWord(Relocated, MakeControlBlockPtr(src), DescriptorTag | WriteProtectTag);
  incTotalSliceCopied(ObjectSize(head) - 1);
  incNumRegionsCopied();
  Relocated += ObjectSize(head) * BytesPerWord;
}

// Make a control block at where to control the data region with header head,
// given that where[0] already holds a pointer to the controlled region.
void makeControlBlock(Address where, WORD head) {
  struct controlblock *cbp = (struct controlblock *) where;
  register int i;

// Note that the srptr field of *cbp already holds a forwarding
  // pointer to the controlled region.
  writeWord((Address) &cbp->size, ObjectSize(head), WriteProtectTag);
  writeWord((Address) &cbp->next, ControlBlocks, DescriptorTag | WriteProtectTag);
  ControlBlocks = (Address) cbp;
  for (i = 0; i <= NumSubRegions(ObjectSize(head)); i++)
    writeWord((Address) &cbp->subregions[i].len, 0, WriteProtectTag);
  incTotalSliceControlled(ObjectSize(head) - 1)
}
```

*Figure 68*

```
void scanDataSlice() {
  WORD head;
  Address start;          // start and length of referenced
  UWORD len;              //  data, in bytes.
  Address regionHeadLoc, srpfirst;
  UWORD regionHead, srplen, offset, whichsubregion;
  struct controlblock *cbp;
  struct sr *srp;

head = readWord(ScanQueue, dontCare);
  start = readWord(ScanQueue + BytesPerWord, dontCare);
  len = readWord(ScanQueue + 2 * BytesPerWord, dontCare);
  regionHeadLoc = findHeader(start);
  if (head & 0x01)        // scan the referenced data
    scanBlock(start, len / BytesPerWord);
  regionHead = readWord(regionHeadLoc, dontCare);
  cbp = (struct controlblock *) GetControlBlockPtr(regionHead);
  offset = start - regionHeadLoc - BytesPerWord;
  whichsubregion =
    (offset < ProbeOffset)? 0: (1 + (offset - ProbeOffset) / (SubRegionSize * BytesPerWord));
  srp = &(cbp->subregions[whichsubregion]);
  srplen = readWord((Address) &(srp->len), dontCare);
  srpfirst = readWord((Address) &(srp->first), dontCare);

if (srplen == 0) {      // this is first slice to reference this subregion
    srplen = len;
    srpfirst = start;
  }
  else {                  // merge this slice with previously initialized subregion
    if (srpfirst > start) {
      srplen += srpfirst - start;
      srpfirst = start;
    }
    if (srpfirst + srplen < start + len)
      srplen = ((start + len) - srpfirst);
  }
  writeWord((Address) &(srp->len), srplen, WriteProtectTag);
  writeWord((Address) &(srp->first), srpfirst, DescriptorTag | WriteProtectTag);
  writeWord(ScanQueue, DataSliceTag | ((head & 0x01)? DescriptorTag: 0))
  ScanQueue = (Address) (head & ~0x01);
  incScannedSliceObjects();
}
```

*Figure 69*

```
#define ObjectAlignment    4        // Align objects on 4-byte boundaries,
#define AlignMask       (0x03)      // which requires that we mask out the two
                                    // least-significant address bits define AlignDown(pointer) ((pointer) & ~AlignMask)
define AlignUp(pointer)          (((pointer) + ObjectAlignment - 1) & ~AlignMask)

// Postprocess a control block.
int doControlBlock() {
    struct controlblock *cbp = (struct controlblock *) ControlBlocks;
    Address region, regionEnd;
    WordSizeType sizeInWords;
    UWORD i, numsr;

ControlBlocks = readWord((Address) &cbp->next, dontCare);
    region = readWord((Address) &cbp->srptr, dontCare);
    sizeInWords = readWord((Address) &cbp->size, dontCare);
    numsr = NumSubRegion(sizeInWords - 1);
    regionEnd = region + sizeInWords * BytesPerWord;

// Restore the region's header.
    writeWord(region, (sizeInWords << 2) | DataAreaTag, WriteProtectTag);
    // Carve up the controlled region into smaller regions containing live data.
    for (i = 0; i < numsr; ) {
        ByteSizeType srlen;

do {                // look for some live data
            srlen = readWord((UWORD) &cbp->subregions[i++].len, dontCare);
        } while (srlen == 0 && i < numsr);
```

*Figure 70*

```
if (i < numsr) {
    Address srstart, curend, nxtstart;
    ByteSizeType nxtlen;

srstart = readWord((Address) &cbp->subregions[i-1].first, dontCare);
    curend = srstart + srlen;
    do {              // look for the end of the live data
        nxtlen = readWord((Address) &cbp->subregions[i++].len, dontCare);
        if (nxtlen) {
            nxtstart = readWord((Address) &cbp->subregions[i-1].first, dontCare);
            if (endContiguous(srstart, curend, regionEnd, nxtStart)) {
                i--;          // Prepare to restart the loop re-examining
                break;        //   the current subregion.
            }
            else if (nxtstart + nxtlen > curend)
                curend = nxtstart + nxtlen;
            // else, this subregion is subsumed within the current contiguous region
        }
    } while (i < numsr);
    // Create a small data region to cover the region of memory from srstart to curend.
    makeSmallDataRegion(srstart, curend, regionEnd);
}
else if (srlen) {
    Address srstart, curend;

// After processing the controlBlock, there is some live data to turn into a small data region.
    srstart = readWord((Address) &cbp->subregions[i-1].first, dontCare);
    curend = srstart + srlen;
    makeSmallDataRegion(srstart, curend, regionEnd);
}
// else, we'll break out of the loop from the top.
}
incTotalSlicePostprocessed(sizeInWords - 1);
}
```

*Figure 71*

```
// Should we begin a new small data region between curend and nxtStart?
int endContiguous(Address srstart, Address curend, Address regionEnd, Address nxtStart) {
    return ((AlignDown(nxtstart - BytesPerWord) > curend) &&
            (curend - srstart >= SmallestDataSize * BytesPerWord) &&
            (regionEnd - curend >= SmallestDataSize * BytesPerWord));
}
```

*Figure 72*

```
// Make a small data region to enclose the live data between start and back,
//  taking care to ensure that the size of the small data region is at least
//  SmallestDataSize words.
void makeSmallDataRegion(Address start, Address back, Address regionend) {
  Address nustart;

if (back - start < (SmallestDataSize - 1) * BytesPerWord) {
    // This only happens for the last segment of contiguous data in the region.
    if (back < regionend) {
      if (start + (SmallestDataSize - 1) * BytesPerWord > regionend) {
        back = regionend;
        start = regionend + (1 - SmallestDataSize) * BytesPerWord;
      }
      else
        back = start + (SmallestDataSize - 1) * BytesPerWord;
    }
    else
      start = back + (1 - SmallestDataSize) * BytesPerWord;
  }

// Subtract BytesPerWord from start to make room for the header.
  nustart = AlignDown(start - BytesPerWord);
  back = AlignUp(back);

// Note that the word we are overwriting may have been a descriptor.
  createObject(nustart, back - nustart);
  writeWord(nustart, (back - nustart) | DataAreaTag, WriteProtectTag);
}
```

*Figure 73*

RANDOM ACCESS MEMORY ASSEMBLY

This application is a division of application Ser. No. 08/592,956, filed Jan. 29, 1996 now U.S. Pat. No. 5,692,185.

The U.S. Government has a paid-up license in this invention and the right in limited circumstances to require the patent owner to license others on reasonable terms as provided for by the terms of Grant MIP 9010412 awarded by the National Science Foundation and Grant ITA 87-02 awarded by the Department of Commerce.

BACKGROUND OF INVENTION

This invention relates generally to computer systems and more specifically to the memory portions of such systems.

One of the major trends in computer science of the last decade has been the increasing popularity of the "object-oriented" paradigm. While there is little consensus regarding the meaning of this term, any object-oriented system must be concerned with the allocation and maintenance of storage for "objects" where an "object" is data that share a particular attribute and occupy a contiguous region of memory. Objects are not permitted to overlap. "Live" objects are those needed in the computational process currently being performed by a computer system.

If all objects in a system are permanent, then there is no concern about memory management. The space assigned to each object at system startup need never be reclaimed. In most real systems, however, live objects have varying life-times that cannot be predicted in advance. In such systems, some method of recognizing expired ("dead") objects and evicting them from memory is necessary if memory resources are to be conserved.

"Garbage" is a term of art in computer technology which refers to data stored in computer system memory that is no longer being used in the performance of an application program. Garbage collection is the process of locating data in dynamically-allocated memory that is no longer being used and reclaiming the memory to satisfy future allocation requests. Since garbage collection greatly reduces low-level programming detail, it offers the potential of significant programmer productivity gains. By freeing programmers from this low-level detail, garbage collection encourages programmers and system designers to dedicate their intellectual efforts to higher-level pursuits, such as the design of fundamental algorithms, user interfaces, and general program functionality. Also, by eliminating many low-level programming concerns, garbage collection reduces the likelihood of programming errors. And finally, dynamic memory management based on copying-types of garbage-collection algorithms are capable of delivering much higher storage throughput than explicit allocation and deallocation, reference-count storage reclamation, and even stack allocation. Together these benefits of garbage collection combine to offer improved software functionality and reliability for lower development costs.

Traditional garbage collectors work by periodically halting execution of system programs in order to traverse all of memory in search of memory regions that are no longer in use. Traditional garbage collectors have a number of major shortcomings: (1) storage throughput in terms of rates of allocation and deallocation of objects is generally much lower than, for example, stack allocation; (2) the times required to allocate memory are only very loosely bounded—the bounds on allocation times are not tight enough to allow reliable programming of highly-interactive or real-time systems such as mouse tracking, interactive multimedia device control, virtual reality systems, and reactive robot control; and (3) in incremental garbage collection systems, the performance penalties associated with memory reads and writes are so high that overall system performance may be unacceptably slow.

Traditional garbage collection systems are incompatible with real-time systems because of their stop-and-wait behavior. Real-time garbage collectors work by dividing the labor of garbage collection into many small steps so that system programs are infrequently halted for the purpose of collecting garbage. Software prototypes of real-time garbage collection algorithms demonstrate the feasibility of the real-time algorithms but exhibit much poorer throughput than traditional garbage collection algorithms. By dedicating hardware to the task of garbage collection, both real-time response and high storage throughput are possible.

A number of incremental garbage collection techniques have been proposed. Some of these are capable of guaranteeing upper bounds on the times required to allocate a unit of memory and to read or write previously allocated memory cells. All of the incremental garbage collection algorithms require frequent synchronization between the application processor and the garbage collector. Depending on the algorithm, this synchronization generally consists of one or more extra instructions executed on every fetch or store that accesses the garbage-collected heap. In detailed performance analysis of these systems, the overhead of synchronizing on writes ranges from 3 to 24 percent of total execution time in one study, and synchronizing on reads was found to more than double execution time in a different study. Furthermore, all garbage collectors occasionally suspend execution of the application while the garbage collector completes certain uninterruptable activities.

A real-time garbage collector must honor a certain upper bound on the duration of time during which it might suspend execution of the application process. The tightest bound currently available on the time applications must wait for garbage collection based on using stock hardware is 500 microseconds for applications that are somewhat restricted in their use of dynamic memory. More general garbage collection systems promise looser bounds ranging from several to several hundred milliseconds. Suspending execution of the application process for time periods such as these is unacceptable for many real-time system applications.

BRIEF SUMMARY OF INVENTION

The invention is a random access memory assembly which is a key component of an object space manager which in turn is a key circuit in a garbage-collecting control unit for a computer system. An object space manager provides the means for deriving pointers to headers of objects from pointers to internal data of objects. The object space manager comprises an encoder that generates an object locator code for each memory cell in which an object is resident, a random access memory assembly for storing the object locator codes for all memory cells in which objects are resident, and an object locator which identifies the memory cell containing the header of an object by means of the object locator code for any memory cell occupied by the object.

BRIEF DESCRIPTION OF DRAWINGS

FIG. 3 shows the coding format for object headers.

FIG. 4 is a C++ code fragment which identifies the special I/O addresses that the mutator uses in communicating with the garbage collector.

FIG. 5 gives type definitions and constants to which the C++ code fragments shown in subsequent figures make frequent reference.

FIG. 6 gives variables and data structures to which the C++ code fragments shown in subsequent figures make reference.

FIG. 31 is a flow diagram which describes the operation of allocating memory to a stack and returning a pointer to the first of the allocated words.

FIG. 32 is a C++ fragment which demonstrates the protocol for initiating garbage collection.

FIG. 33 gives the port addresses of the garbage-collecting memory module components.

FIG. 34 gives the coding format for random-access memory module commands.

FIG. 35 gives the coding format for object space management module commands.

FIG. 36 illustrates a single level-one object space management group which controls eight possible object locations.

FIG. 39 shows C++ declarations which represent the three levels of the object space management hierarchy exemplified in FIG. 38 and a representation in C++ of the beginning portion of the algorithm for installing a new object within an object space management module.

FIG. 40 is the continuation of a representation in C++ of the beginning portion of the algorithm for installing a new object within an object space management module.

FIG. 41 is a representation in C++ of the algorithm to find a header within the object space management module.

FIG. 42 identifies registers used to keep track of activities while transferring data out of one region of memory into another during garbage collection.

FIG. 43 shows C++ declarations which are used in pseudo-code implementations of TendDesc, HandleRead, and HandleWrite operations.

FIG. 44 shows the algorithm expressed in C++ that is used by the arbiter in monitoring memory read transactions.

FIG. 45 shows the algorithm expressed in C++ that is used by the arbiter in monitoring memory write transactions.

FIG. 46 shows the coding format for mutator-initiated commands to the arbiter.

FIG. 47 shows the algorithm expressed in C++ for tending a descriptor.

FIG. 48 shows the coding format for the microprocessor's work requests.

FIG. 52 is a flow diagram which describes the operation of incrementally scanning data contained within a single to-space object.

FIG. 53 shows two functions expressed in C++ which abstract the interface between the microprocessor and the arbiter.

FIG. 54 gives constants expressed in C++ which represent the operation code portion of the operation encodings shown in FIG. 48.

FIG. 55 gives the type declarations which are used in the C++ implementation of the garbage collection code that runs on the microprocessor.

FIG. 56 shows the declarations pertaining to the tags used within object headers to represent the type of the object.

FIG. 57 shows the declarations supporting the operation of aligning slice subregions at a different offset relative to the beginning of the slice region on each pass of the garbage collector.

FIG. 58 shows two C++ routines which implement the operations of returning a pointer to a slice data region's control block and making a header for the controlled region consisting of the pointer combined with the region's type tag.

FIG. 59 shows the C++ declarations of constants that represent the values of flags that distinguish terminal from descriptor data and that identify write-protected memory.

FIG. 60 is a C++ code fragment which obtains the size of the object from the object's header.

FIG. 61 shows C++ declarations which represent the configuration of the garbage-collecting memory module.

FIG. 62 defines the pendingOperation variable which remembers whether the arbiter is currently working on an operation whose completion has not yet been verified and shows the functions expressed in C++ which represent the interface between the arbiter and the microprocessor but which return no result when executed.

FIG. 63 shows additional functions expressed in C++ which represent the interface between the arbiter and the microprocessor but which return no result when executed.

FIG. 64 shows additional functions expressed in C++ which represent the interface between the arbiter and the microprocessor but which return no result when executed.

FIG. 65 shows C++ library routines that return arbiter responses to requested operations.

FIG. 66 shows the beginning portion of a C++ implementation of the garbage collector.

FIG. 67 shows the second portion of a C++ implementation of the garbage collector which copies an object into to-space.

FIG. 68 shows the third portion of a C++ implementation of the garbage collector which copies slice region data and initializes a slice region control block.

FIG. 69 shows the fourth portion of a C++ implementation of the garbage collector which (1) updates the control block for the slice region that is associated with the scanned slice object and (2) if the slice object is identified as a descriptor slice, rescans the corresponding slice region and tends any descriptors referenced by this particular slice object.

FIG. 70 shows the fifth portion of a C++ implementation of the garbage collector wherein certain macros are defined and the initial part of the sixth portion of a C++ implementation of the garbage collector which postprocesses the control blocks, restores the headers of slice regions, carves up controlled regions into smaller regions containing live data, looks for live data, looks for the ends of live data, and starts a new region of contiguous data if the next live data starts after the current contiguous data region ends and if certain other conditions are met.

FIG. 71 shows the concluding part of the sixth portion of a C++ implementation of the garbage collector which post-processes the control blocks, restores the headers of slice regions, carves up controlled regions into smaller regions containing live data, looks for live data, looks for the ends of live data, and starts a new region of contiguous data if the next live data starts after the current contiguous data region ends and if certain other conditions are met.

FIG. 72 shows the seventh portion of a C++ implementation of the garbage collector which detects the end of a segment of live data which will become an independent slice region.

FIG. 73 shows the concluding portion of a C++ implementation of the garbage collector which, whenever the garbage collector isolates a sufficiently large contiguous span of live slice region data, encapsulates this slice data into a smaller slice region.

DESCRIPTION OF THE PREFERRED EMBODIMENT

Figure 1:
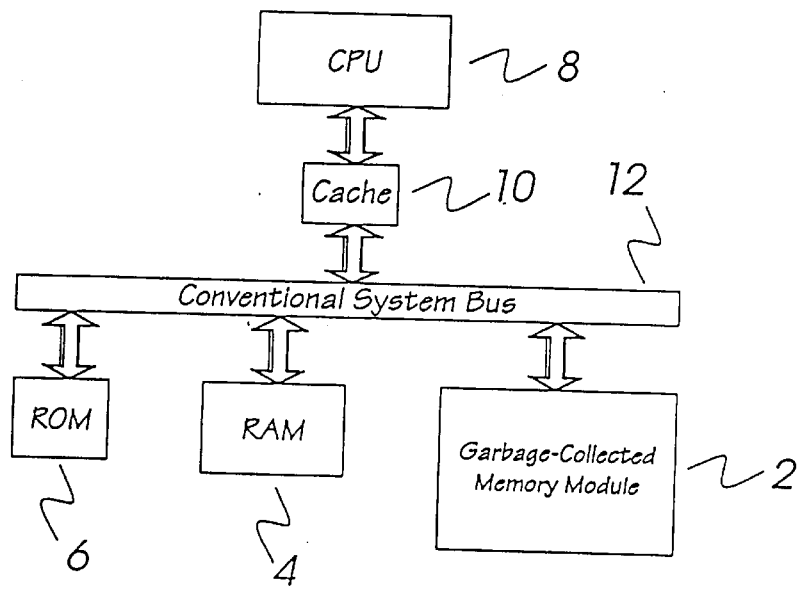
FIG. 1 is a block diagram of a computer system employing the garbage-collecting memory module.

While garbage-collection researchers struggle to alleviate the shortcomings of traditional garbage collection methods, continuing advances in computer architecture and VLSI technology have made feasible new techniques for high-performance real-time garbage collection. More specifically, memory chips and other VLSI processing elements are increasingly affordable. Already it is common for the RAM in desktop workstations to exceed the memory needs of typical users. Permanently dedicating large segments of physical memory to hard real-time tasks is now economically feasible. VLSI circuitry is so inexpensive that it represents only a small fraction of a modern computer system's cost. These advances make possible cost-effective hardware-assisted garbage collection such as that performed by the garbage-collecting memory module (GCMM).

Recent history has taught that special-purpose architectures such as Lisp machines cannot easily compete in the free market with mass-marketed general-purpose systems. Special-purpose architectures do not enjoy the luxury of large teams of engineers to implement pipelined, superpipelined, and superscalar versions of their processors because the target audience is too small. For similar reasons, major software developers do not consider it economical to port their products to specialized architectures.

To avoid these pitfalls, all of the special circuitry associated with the high-performance garbage-collecting process that provides the conceptual basis for the present invention is incorporated within a special memory module that interfaces with the central processor unit (CPU) by way of a traditional memory bus. The GCMM mimics traditional memory for fetch and store operations and additionally provides several I/O ports to support allocation and identification of objects intended for storage in the GCMM.

Since, in principle, the GCMM can be interfaced with a large number of different CPU and bus architectures, the technology investment can be shared between users of many different processor architectures. Furthermore, computer users can retain their existing computer components and familiar software libraries when they add high-performance real-time garbage collection capabilities to their systems. Additionally, the interface to the GCMM is designed to provide generality and flexibility to application and programming language implementors. The GCMM supports a variety of primitive data structures from which specialized data structures to support languages like C++, Icon, and Smalltalk are easily constructed.

Throughout this specification, the term "garbage collector" refers to the processing elements within the GCMM that perform the garbage collection process. Communicating with the garbage collector consists of reading or writing to dedicated I/O addresses on the computer system bus. Though the contents of the GCMM are usually cached, commands and communication sent via the I/O system typically are not.

"Word", as used herein, is the architecture-specific size of a pointer. The preferred embodiment of the GCMM uses 32-bit words and assumes the address space is byte addressable. All GCMM-allocated objects are aligned on word boundaries. For certain applications of the invention, other word sizes or alignments may be more appropriate.

Throughout this specification, the term "descriptor" is used interchangeably with "pointer". By pointing to objects allocated elsewhere, each descriptor is capable of "describing" all conceivable kinds of information. To the garbage collector, an object is simply a contiguous region of memory that shares a particular attribute. Since some programming language implementations use linked data structures to represent individual language-defined objects, the garbage collector's view of what constitutes an object may differ from the view of a particular object-oriented programming language.

We use the adjective "terminal" to characterize memory locations known not to contain pointers. If all live memory is represented as a directed graph in which nodes represent dynamically-allocated objects and directed edges represent pointers from one object to another, the terminal nodes are those from which no directed edges emanate. The source nodes in this directed graph are pointers residing outside of the GCMM. These source pointers, which are under direct control of the CPU, are called "tended descriptors".

During garbage collection, live objects are copied from one region of memory to another. At the moment garbage collection begins, the application process updates each of the tended descriptors to point to the new locations of the objects they reference by communicating with the GCMM via dedicated I/O ports. Tended descriptors may reside either in physical machine registers of the application processor or within traditional memory.

Application processes run on the CPU and garbage-collection tasks run within the GCMM. Application programs are collectively referred to herein as the "mutator" since, insofar as garbage collection is concerned, their only role is to modify (or mutate) the contents of GCMM memory.

The garbage collector distinguishes between memory representing descriptors and memory representing terminal data by adding a one-bit "descriptor tag" to each 32-bit word of memory. Instead of using an extra bit to tag descriptors, a convention could be established whereby all words are internally tagged without the need for a 33rd bit of RAM to accompany each word. The important point is that the garbage collector must be able to quickly distinguish pointers from non-pointers.

Besides distinguishing between descriptors and terminals, the garbage collection protocol allows some flexibility in declaring the significance of each descriptor with respect to the object it references. In some cases a pointer to a word contained within a larger object is interpreted by the garbage collector as an indication that the entire referenced object is live. In other cases, only a portion of the referenced object is considered to be live, and the garbage collector takes responsibility for shrinking or splitting the enclosing object in order to isolate and reclaim garbage from within it. These different cases are distinguished by the garbage collector based on the types of the referencing and referenced objects.

Every GCMM-allocated object has a header containing information used by the garbage collector. The first word of every header is an encoded "title" representing the object's type and size. The headers of GCMM-allocated stacks contain additional information besides the title, as described below. For all other objects, the title comprises the entire header.

A record is a fixed-size object containing any combination of descriptors and terminal data. The size of an allocated record is defined at the time of its allocation. However, its internal organization as characterized by descriptor tags on individual words within the record does not necessarily remain constant.

The record type is the most fundamental of the supported types. Records can be used to implement C++ and Smalltalk objects; C arrays, structures, and unions; and Lisp dotted pairs. Data structures built from linked records can be used to implement, for example, Icon tables and Smalltalk class hierarchies.

If any address location within a record is referenced by a live descriptor, the entire record is considered live.

A stack is a fixed-size object containing descriptor and terminal data and a one-word field representing the offset of the stack's current top element. The preferred embodiment of the garbage collector implements only stacks that grow downward. Comparisons between the locations of stack-allocated objects and the current top of stack are described in this specification using the adjectives "above" and "below". Because stacks grow downward, addresses above the current top-of-stack location are smaller-valued absolute addresses.

Each time the stack grows or shrinks, the application must update the stack's height by communicating with the garbage collector. Words within the stack are tagged similarly to words within records. Updating these tags makes growth of a garbage-collected stack more expensive than traditional stack allocation, which consists simply of decrementing the dedicated stack pointer register by the desired amount of stack growth. No tag maintenance is performed when the stack shrinks, so removing elements from the stack is nearly as efficient as in traditional stack architectures.

Because of the extra effort spent initializing descriptor tags for words pushed onto the stack, stack allocation of activation frames is not much faster than GCMM allocation of records. However, during certain phases of garbage collection, allocation of records is accompanied by garbage collection efforts that may incur delays proportional to the size of the record. Stack allocation does not incur this overhead, since the stack expands into memory that was allocated previously. Another advantage of stack allocation and deallocation is that it does not contribute to the pool of memory that must eventually be reclaimed by the garbage collector. An application that stack-allocates rather than GCMM-allocates objects collects garbage less frequently.

If any address location contained within a stack object is referenced by a live descriptor (even a location above-its current top), then the entire stack object is considered to be live. When processing a live stack, the garbage collector examines only that portion of the stack found beneath its current top in search of pointers to additional objects.

A slice object consists of a pointer to a location within a slice region and a length representing the number of consecutive bytes from that point forward that are contained within the slice. Slices are useful in implementing the built-in string and stream data types of languages like Icon and Conicon. They might also be used to represent the catenation of multimedia audio visual clips into complete audiovisual programs, and to implement shared code segments in a dynamic object-oriented programming environment. Once allocated, a slice object is considered to be read-only. Only the slice region data referenced by the slice object is writable.

When the garbage collector allocates a slice object, it initializes the object to point to a segment of contiguous slice region data. The referenced slice region is either allocated at the same time the slice object is allocated, or it is a subslice of a previously allocated segment of slice data. Slice objects may overlap each other in a slice region. Slice objects may be either descriptor slices or terminal slices. The referenced slice region for a descriptor slice may contain descriptors while that for a terminal slice does not. The distinction between terminal and descriptor slice objects is made because terminal slices make more efficient use of available memory.

Arbitrary descriptors may point directly into the slice region. These descriptors are updated properly during garbage collection. However, the slice region data referenced by an arbitrary descriptor is only treated as live if it is also referenced by a slice object. The rationale for this rule is to provide efficient support for machine register induction variables and derived pointers (including possibly the machine's instruction and stack pointers) to slice regions. These tended descriptors typically obtain new values by incrementing their previous values rather than loading from memory. For the garbage collector to decide how much slice region data should be treated as live, based only on tending of a descriptor that points to a particular location within that region, is not generally feasible. Furthermore, for the garbage collector to treat each read or write of slice region data as enlivening the referenced word significantly adds to the garbage collector's complexity and increases the number of memory cycles required to handle fetch and store operations. For these reasons, the garbage collector considers as live only slice region data that is directly referenced by slice objects.

Within slice regions, descriptors are distinguished from terminals using descriptor tags, as discussed above. Unlike records and stacks, the garbage collector may shrink a slice region or may split a single slice region into several smaller regions if segments of unreachable data are found within the region.

Slice regions are not directly visible to the mutator. There is no way to explicitly allocate one, or to directly manipulate its size. Instead, the mutator asks the garbage collector to allocate a slice object that refers to a particular amount of slice region data. In satisfying this request, the garbage collector may allocate a new slice region or it may obtain the requested segment of slice region data from within a slice region that was allocated previously. After allocating a slice object, the mutator initializes the descriptor tags of the referenced slice region by invoking certain primitive operations that will be described later.

The real-time garbage-collection process is based on an algorithm originally described by Henry Baker (H. G. Baker Jr., "List Processing in Real Time on a Serial Computer", Comm. ACM 21, 4 (April 1978), 280–293). The basic idea of the algorithm is to divide available memory into two regions named "to-space" and "from-space". Objects are allocated space in to-space while previously allocated live objects are incrementally copied into to-space out of from-space.

When the garbage collector copies an object into to-space, the first word of the old object is overwritten with a forwarding pointer to the object's new location. The garbage collector uses this forwarding pointer to update other pointers that refer to the same object. When those pointers are traced, the garbage collector recognizes that the referenced object's first word is a forwarding pointer and updates the pointers appropriately rather than creating yet another copy of the referenced object.

The garbage collector tends all pointers contained within records, stacks, and slice objects as they are copied. Descriptors within slice regions are tended after being copied. Tending of a descriptor consists of first checking whether the descriptor refers to from-space. If the descriptor refers to a from-space object already scheduled for copying into to-space, the object's new location is found by examining the from-space object's forwarding pointer. If the descriptor refers to a from-space object that has not yet been scheduled for copying, the garbage collector inserts the referenced object into the copy queue. In either case, descriptor tending makes sure that the obsolete pointer to from-space is replaced with an updated pointer to the new location of the object in to-space.

New objects are allocated at the same time that old objects are being copied into to-space. When there is no longer adequate memory in to-space to satisfy an allocation request, garbage collection begins. The names assigned to the two memory regions are interchanged, so that allocations are now made from the other region. This is called a "flip". The design of the algorithm guarantees that all live data will have been copied out of the old from-space by the time the next flip occurs.

The application program is allowed to maintain only a limited number of pointers (i.e. descriptors) to dynamically allocated objects. The descriptors under direct control of the application are called tended descriptors as indicated above. When a flip occurs, the objects directly referenced by tended descriptors are scheduled for copying into to-space, and the descriptors are modified to reflect the new locations of the objects that they refer to. The task of updating a pointer to reflect the new location of a live data object is called "tending". The garbage collector follows the rule that tended descriptors always point into to-space. Each time a value is loaded into a tended descriptor by reading from an internal field of a dynamically-allocated object, the value is tended before it is assigned to the tended descriptor.

In order to support fast response to memory read, write, and allocate instructions, it is necessary to divide the garbage collection process into a number of very small atomic actions. Certain system invariants are maintained between execution of these atomic actions. These invariants are sufficient to allow memory read and write operations to interleave with background garbage collection efforts. In order to simplify recognition of addresses referencing particular regions of memory, it is necessary to require that the total size of the module's memory be a power of two. For similar reasons, the base address of the expansion memory must have zeros in all of the low-order bits used to address locations within the module.

Because there is no limit on the size of objects supported by the garbage collector, it is essential that copying and scanning of objects be performed incrementally. Otherwise, the time required to complete a single atomic operation might exceed the desired real-time response. When an object is queued for copying, space is reserved for it in to-space and the first two words of the reserved space are initialized with the object's title and a pointer to its original location respectively. The title of the original object in from-space is overwritten with a forwarding pointer to the space reserved for eventual copying, and the descriptor tag is set for the original object's forwarding pointer.

The memory reserved for copying of objects is allocated starting from the beginning of to-space. Since objects are copied in FIFO order, all uncopied objects reside within a single contiguous range of memory addresses.

As with Baker's original algorithm, the garbage collection algorithm incorporated within the GCMM presents to the mutator the illusion that all live memory is copied instantaneously into to-space at the time of a flip. Though the garbage collector carries the main burden of performing the flip, the mutator's cooperation is required to find all live objects. The mutator keeps track of a bounded number of pointers into the GCMM - the so-called "tended descriptors".

Garbage collection is triggered by a memory allocation request that cannot be satisfied. In response to this request, the GCMM returns a special code informing the mutator that it is time to perform a flip. The mutator then passes each of its tended descriptors to the garbage collector, which queues the referenced objects for copying into to-space and returns updated values for each of the descriptors. Alternatively, the mutator could initiate a flip by passing each of its tended descriptors to the garbage collector.

The process of updating a descriptor to make sure that it does not point into from-space, including the work of queuing the referenced object for copying into to-space if necessary, is, as mentioned previously, called "tending".

Because of the alignment restrictions described above, the GCMM recognizes attempts to read untended descriptors in approximately the same time required to implement traditional memory error-correcting codes. An untended descriptor is simply any word with the descriptor tag set for which the high-order bits exactly match the base address of from-space. Whenever the mutator requests to read an untended descriptor, the requested word is tended before its value is made available to the mutator.

In Baker's original algorithm, each live object is first copied and then scanned. Scanning, in Baker's algorithm, consists of examining copied objects and tending the descriptors contained within them. In the GCMM algorithm, the descriptors within most objects are tended as they are copied. This approach approximately halves the number of memory cycles required to relocate live objects out of from-space. This approach is only possible because copying of the objects referenced by descriptors that were previously untended is deferred until a later time.

The only objects that are not scanned while copying are slice regions. Even though the pointer field of a slice object is tended while copying, it is still necessary for a subsequent scanning phase of garbage collection to visit all of the slice objects copied into to-space. Since only slice objects need to be scanned, each slice object is placed onto a linked list threaded through its title field when it is copied into to-space.

In order to guarantee sufficient space for the copying of all live memory into to-space while new objects are being allocated, it is important to pace the rate of allocation in relation to the garbage collection rate. Either the mutator or the garbage collector may take responsibility for ensuring that the allocation rate does not exceed the rate of garbage collection. The mutator assumes this responsibility in the preferred embodiment.

Each allocation of size n is accompanied by an amount of garbage collection quantified by 2nK, where K is an experimentally-determined constant. The general technique is for the mutator to maintain two variables called GCProgress and AllocProgress. Both of these variables are initialized to zero at the start of garbage collection. GCProgress records the amount of garbage collection that has been completed. AllocProgress records the amount of allocation that has been performed since the most recent flip operation. Each allocation of n words increments AllocProgress by 2nK where K is assigned a value, experimentally determined, such that GCProgress continually equals or exceeds AllocProgress. Under normal circumstances, an allocation of n words is only permitted if AllocProgress plus 2nK is less than or equal to GCProgress. Otherwise, the mutator must delay its allocation request until additional garbage collection has completed, thereby increasing the value of GCProgress so that AllocProgress plus 2nK is less than or equal to GCProgress.

At the time of a flip, both GCProgress and AllocProgress are initialized to zero. Every word relocated out of from-space causes GCProgress to be incremented by one. For record and stack objects, GCProgress is incremented twice for each word copied to account for the effort of tending the word while it is being copied.

Each slice object contains three words. GCProgress is incremented by two when the slice object is copied into to-space. The slice region pointer contained within the slice object is tended during copying of the slice object. After the slice object has been copied, it is placed on a linked list of slice objects waiting to be scanned. This linked list is called the scanning queue. The header of each slice object on the list is overwritten with a pointer to the next slice object on the list, or given a special value to indicate the end of the list. Since the architecture is assumed to be byte-addressable and each slice object is assumed to be word-aligned, the two least significant bits of this pointer are always zero. The least significant bit of this pointer is used to distinguish between slice objects that may refer to descriptor data and those known not to reference descriptor data. When a slice object residing on the scanning queue is eventually scanned, GCProgress is incremented by four. If the slice object being scanned is identified as a descriptor slice object, then the referenced slice region data is scanned and any descriptors contained therein are tended. GCProgress is incremented by one for each of the slice region words that is scanned in this step.

GCProgress is incremented by one for each word of slice region data copied into to-space, excluding the region's header. After the slice region data has been copied, the original object is overwritten with a slice region control block.

The slice region control block divides the slice region into 8-word segments called subregions, and includes one subregion control block for each of these. Each subregion control block consists of a pointer FirstMemRef to the first memory referenced by slice objects pointing into that particular subregion, and a length LastMemLen that, when added to this pointer, represents the last memory referenced by slice objects pointing into the subregion. During each pass of the garbage collector, alignment of all subregions is offset from the beginning of the corresponding slice regions by the number of bytes specified in the ProbeOffset register. The first three fields of the slice region control block are the slice region pointer, the size in words of the controlled slice region, and a pointer to the next on a linked list of all control blocks being garbage collected.

The optimal size for subregions depends on tradeoffs between the bookkeeping overhead required to maintain large numbers of small subregion control blocks, and the benefits of quickly isolating garbage within slice regions by probing for garbage at more closely spaced intervals. To allow pointers to quickly determine which subregion they refer to, the subregion size must be a power of two. Control blocks are not allocated for slice regions smaller than seven words because the slice region is not large enough to represent its own region control block. In order to guarantee that a slice region of size seven words is large enough to represent its own control block, the garbage collector requires that subregion sizes be no smaller than eight words.

GCProgress is incremented by two following initialization of the first three fields in the slice region control block. GCProgress is incremented by half the number of words contained within the corresponding subregion following initialization of each subregion control block. During post-processing of slice subregion control blocks, GCProgress is once again incremented by half the number of slice data words contained within each of the corresponding subregions.

The final phase of garbage collection consists of initializing all of from-space memory to zero, and all from-space object-space managers to their initial states. For each word so initialized, GCProgress is incremented by 2K/(K+2).

By means of dedicated I/O ports of the GCMM, the mutator is able to obtain the values of certain state variables that represent the garbage collector's progress. The variable ToSpace points to the first word of to-space, CopyDest points to the next to-space word to which live data currently residing in from-space will be copied, NumSliceObjects counts the number of slice objects that have been placed on the copying queue, CopiedSliceObjects counts the number of slice objects that have been copied into to-space, ScannedSliceObjects counts the number of slice objects that have been removed from the scanning queue, NumSliceRegions counts the number of slice regions that have been placed on the copying queue, NumRegionsCopied counts the number of copied slice regions for which region control blocks have been initialized, TotalSliceData is the number of words of slice data contained within slice data regions that have been placed on the copying queue, TotalSliceCopied is the number of words of slice data contained within slice regions that have been copied, TotalSliceScanned is the number of words of slice data that have been scanned during slice-object scanning, TotalSliceControlled is the number of words of slice data that are currently controlled by slice region control blocks, TotalSlicePostprocessed is the number of words of slice data that have been postprocessed, and TotalZappedWords is the number of words of from-space that have been initialized to zero in preparation for the next garbage collection cycle. The current value of GCProgress is represented by the following equation:

GCProgress = (CopyDest − ToSpace) × 2 −

CopiedSliceObjects × 4 − TotalSliceCopied +

ScannedSliceObjects × 4 + TotalSliceScanned +

TotalSliceControlled/2 + TotalSlicePostprocessed/2 +

TotalZappedWords × 2K/(K + 2)

Note that the expression above calculates GCProgress as twice the number of words copied into to-space minus the number of words contained within objects for which copying is not worth two units of garbage collection per word plus the appropriate units of garbage collection for each of the special garbage collection operations that has been completed. Having obtained the values of these variables from the GCMM, the mutator computes the value of GCProgress. Since GCProgress is a non-decreasing variable, it is not necessary to recompute GCProgress after each allocation request. Once GCProgress has been computed, the mutator can freely allocate objects, incrementing AllocProgress appropriately for each allocation until AllocProgress is greater than GCProgress, at which time the mutator must obtain updated values for each of the state variables that contributes to the computation of GCProgress in order to update its value. Experimental evidence collected to date suggests that the allocation rates of typical applications rarely exceed the GCMM's rate of garbage collection.

Each allocation request issued by the mutator is serviced within at most seven traditional memory cycles. Thus, transactions between the mutator and the GCMM are always very short, this circumstance thereby facilitating quick context switching between concurrent tasks. The protocol was designed to simplify context switching between tasks sharing access to the garbage-collected memory. Additionally, this protocol allows very high allocation rates as long as GCProgress is greater than AllocProgress. Since the mutator has a better understanding of the system workload and scheduling constraints, it is much more capable than the GCMM to act intelligently with respect to the pacing of garbage collection versus allocation efforts. For example, the mutator may choose to temporarily allow allocation rates to exceed garbage collection rates. Or it might dynamically adjust the constant K at the time of a flip, or even during the garbage collection effort, depending on the amount of live memory that the mutator needs to have garbage-collected and the rates at which it needs to allocate new data. Another option under mutator control is to flip earlier than would otherwise be required, in order to complete the flip during a lull in system activity. And yet another advantage of relegating this decision to the mutator is that the mutator may choose to time share with tasks that do not require dynamic allocation of memory whenever allocation rates begin to exceed garbage collection rates. This allows the mutator to perform useful work while waiting for the garbage collector to catch up.

New memory is allocated from the end of to-space while live objects are being copied from the beginning of to-space. Several dedicated registers delineate the boundaries between to-space memory in different intermediate stages of garbage collection. The CopyDest register indicates the location to which the next word copied out of from-space will be written. The CopyEnd register holds the address just beyond the end of the object currently being copied. The CopySrc register contains a pointer to the next from-space memory cell to be copied into to-space whenever CopyDest is less than CopyEnd. The Reserved register contains the pointer to the next memory available for objects to be placed on the copying queue.

All objects on the copying queue are located between CopyEnd and Reserved. The New register contains a pointer to the most recently allocated object. At the time of a flip, New is initialized to point to the end of to-space. Each allocation request is satisfied by decrementing New by the size of the allocation and returning its updated value.

As long as the amount of live data referenced by the mutator never exceeds the amount of memory that the garbage collector was configured to handle, the garbage collector guarantees to complete garbage collection prior to overflowing to-space.

The garbage collection system's principal responsibilities are, in order of decreasing priority:

1. To respond quickly to requests made by the mutator;
2. To copy live objects into to-space;
3. To scan slice objects that have already been copied into to-space;
4. After all live objects have been copied and scanned, to examine each of the slice regions copied into to-space and to collect holes of unreachable memory as garbage, this phase of garbage collection being called "postprocessing".

During garbage collection, requests to read or write memory that has not yet been copied are recognized by comparing the address of the requested operation with the current values of CopyDest, CopyEnd, and Reserved. References to memory between CopyDest and CopyEnd are redirected to the address computed by adding CopySrc to the difference between the requested memory address and CopyDest. Whenever references to memory between CopyEnd and Reserved are recognized, special circuitry in the GCMM looks up the location of the uncopied object's header. For objects on the copying queue, the word following the title points to the object waiting to be copied out of from-space. The requested memory operation is redirected to the appropriate address in from-space by adding together the address of the object to be copied and the offset of the requested memory operation's address relative to the encompassing object's header location.

Unlike records, stacks, and slice object headers, descriptors contained within slice regions are not tended during copying. This is because it is not possible to determine which of these descriptors are still live until after all live slice objects have been examined by the garbage collector. If, during garbage collection, the mutator attempts to read untended slice region descriptors, the garbage collector tends the descriptor before its value is made available to the mutator.

The ScanBalance variable, the difference between the AllocProgress and GCProgress variables, is not affected by on-demand tending of descriptors. As long as the mutator does not exceed the limits on total amounts of live data, there are sufficient ScanBalance points to tend every live descriptor in the system. Regardless of whether the mutator demands that certain descriptors be tended out of normal scanning order, the ScanBalance points reserved for tending of a descriptor are collected at the time the descriptor is eventually scanned by the garbage collector. A single ScanBalance point is charged for scanning a word, even if the word is not a descriptor in need of tending. No additional ScanBalance points are charged if scanning requires that an object be queued for copying, even though queuing an object fdr copying requires that the title of the queued object be copied into to-space. Since the title of an object is copied when the object is queued for copying, and since the title does not need to be tended, the two ScanBalance points reserved for relocation of an object's title are available for special type-dependent processing, as described below.

Tending of a descriptor pointing to any address within a record causes the record to be queued for copying. As each word of the record is copied, ScanBalance is decremented by two, and descriptors contained within the record are tended before their values are written to to-space. The two ScanBalance points associated with the record's title are charged when the garbage collector begins copying the object into to-space.

Tending of a descriptor pointing to any address within a stack causes the stack object to be queued for copying. Within the stack object's header, the word immediately following its title identifies the location of the stack's top element. During incremental copying of the stack object, only that portion of the stack beneath its top element is actually copied. At the moment that copying of the stack begins, ScanBalance is decremented by twice the number of words residing above the top-of-stack mark within the stack object, including the two words contained within the object's header. As each word of the stack is copied, ScanBalance is decremented by two to account for copying and scanning of the word, and descriptors contained within the stack object are tended before their values are written into to-space.

Tending of a descriptor pointing to any location within a slice object causes the slice object to be queued for copying. Copying of the slice object is incremental. The pointer field of the slice object is tended as its value is copied. Since copying takes precedence over scanning, this guarantees that the referenced slice region will have been completely copied into to-space by the time that this slice object is eventually scanned. For each word of the slice object copied into to-space, ScanBalance is decremented by one. The ScanBalance points reserved for scanning of the slice object are expended later, when the object is actually scanned. After the slice object has been completely copied, the slice object is linked onto a list of slice objects waiting to be scanned. The title of the slice object is overwritten with the link field, within which the least significant bit distinguishes between slice objects that reference descriptors and those that refer only to terminal data. Since the GCMM is byte-addressable, the least significant bit of every pointer to word-aligned memory is otherwise not needed.

Even though a slice region that contains some live data may contain segments of dead data also, the entire slice region is copied into to-space one word at a time. There are several reasons for this. First of all, the garbage collector cannot know which data within a slice region is garbage until after all live slice objects have been examined. Second, to postpone copying of slice region data until after the garbage collector knows exactly which data within the slice region is live would add a level of indirection to all fetches and stores that reference the slice region before garbage collection has been completed, thereby impairing system performance. And third, to efficiently handle memory operations that access slice regions on the copying queue, it is necessary that the offset between the requested memory address and the slice region's header location be identical in both the original object and within the space into which the slice region will eventually be copied.

For each slice region word copied, ScanBalance is decremented by one.

After completely copying a particular slice region into to-space, but before beginning to copy the next object on the copying queue, the garbage collector overwrites the original slice region with initial values for the slice region control block. The control block is doubly linked with the slice region it controls by temporarily overwriting the slice region's title with a pointer to the control block. The forwarding pointer for the original slice region now serves both as a forwarding pointer and as the reverse link between the slice region and its control block.

When a slice region is copied into to-space, ScanBalance is decremented by one for each word copied. However, the ScanBalance points traditionally set aside for scanning of the slice region are divided equally between initialization and postprocessing of the region's control block. The two ScanBalance points available for processing of the slice region's title are charged when the control block's header is initialized and the slice region's title is overwritten with a pointer to the region's control block. Following initialization of each subregion control block, ScanBalance is decremented by half the number of words within that subregion. Half a ScanBalance point remains unspent for each word of data in the slice region. These remaining points are spent during postprocessing of control blocks, as described below.

After all objects on the copying queue have been copied, the garbage collector begins (or resumes) scanning of slice objects. Remember that the single descriptor within each slice object is tended when the object is copied into to-space and since slice objects are read-only, every slice object that is being scanned points to a slice region that has been copied out of from-space. Scanning of slice objects consists of the following actions: (1) finding the header of the referenced slice region; (2) reading the slice region's header, which is a pointer to the region's control block; (3) calculating which subregion contains the first address referenced (FirstMemRef) by the slice object; (4) updating the FirstMemRef and LastMemLen fields within the appropriate subregion control block; and (5) restoring the slice object's title and removing the slice object from the linked list of objects waiting to be scanned.

Each of the steps above is performed in constant time. Upon completion of these five tasks, ScanBalance is decremented by the number of words in a slice object (normally three, but larger if, for example, all objects must be aligned on 4-word boundaries) plus the ScanBalance point reserved for scanning of the object's title.

Descriptor slice objects are distinguished from terminal slice objects by a single bit in the object's title. Besides the work described above, scanning of a descriptor slice includes the following additional step: (6) tending each of the slice region descriptors referenced by the slice object. For each of the slice region words scanned in this step ScanBalance is decremented by one. Note that overlapping descriptor slices require redundant scanning of the shared data. This is the only task of the garbage collection algorithm whose execution time is not linear in the total amount of live memory. Generally, users of the garbage collector who need guaranteed availability of live memory must account for the space consumed by each slice object and slice region independently. When accounting for descriptor slice objects, an additional fraction of the referenced slice region segment is added into the total storage needs to account for redundant scanning of the shared segment.

The very last phase of garbage collection consists of postprocessing region control blocks. The linked list of region control blocks is walked, and each slice region is examined in search for holes of unaccessed data. When sufficiently large holes of unaccessed data are found between subregions, the original slice region is split into multiple slice regions. Sufficiently large holes are holes that are large enough to allow an appropriately aligned slice region header to overwrite some of the garbage contained within the hole. After shrinking or splitting a slice region, the garbage within the original slice region is no longer contained within any object and will not be copied during subsequent garbage collection flips. Postprocessing is done incrementally by examining the subregion control blocks one at a time from left to right searching for contiguous segments of live data. For each contiguous segment of live data found, the garbage collector overwrites the memory preceding that segment with an appropriate SliceData header. After postprocessing of a region control block completes, division of the slice region into subregions is no longer meaningful.

During postprocessing of each subregion control block, ScanBalance is decremented by half the number of words within that subregion.

Since holes of garbage located at either the front or rear of a slice region are always found by the garbage collector, regardless of ProbeOffset's value, ProbeOffset is never set to zero. Therefore, the smallest control blocks control two subregions, and the minimum size of a control block is consequently seven words.

The garbage collector refrains from creating slice regions smaller than seven words. Whenever smaller segments of live slice region data are isolated, they are enclosed within a slice region that contains enough of the surrounding garbage to make the slice region's total size seven words. It would be possible for the garbage collector to support slice data regions smaller than seven words by treating them specially during certain phases of garbage collection. However, this adds considerable complexity to the garbage collection system, with very limited improvement in terms of storage utilization.

By changing the value of ProbeOffset with each flip of the garbage collector, the garbage collector guarantees that all holes of garbage within a slice region will eventually be found. However, for any particular flip of the garbage collector, the garbage collector promises only that the amount of slice region memory allocated to a particular slice object does not exceed the amount of memory actually used by that slice object by any more than eight words, the size of each subregion. Garbage collector users who need to verify availability of memory must generally use a conservative estimate when accounting for the memory dedicated to each slice.

A computer system incorporating the GCMM is shown is FIG. 1. The GCMM 2, the random-access memory (RAM) 4, and the read-only memory (ROM) 6 connect to the central processing unit (CPU) 8 via the cache 10 by means of the conventional system bus 12. The GCMM plays the role of traditional expansion memory within a standard bus-oriented system architecture.

For the purposes of describing the GCMM and how it works, it is necessary to postulate a specific computer system design. The computer system design described below for the preferred embodiment is only one of a number of computer system designs in which the GCMM could be incorporated.

In the preferred embodiment of a computer system incorporating the GCMM, all memory is byte-addressable. The memory system uses 32-bit words, and physical memory is addressed with 32-bit words. All pointers are word-aligned. Memory words are big-endian.

Insofar as the garbage collector is concerned, all pointers referring to a particular object directly address a memory location contained within the referenced object. With certain CPU architectures, code optimizers might be tempted to rearrange code so that programmer-defined variables pointing directly to particular objects are replaced with a pointer base and an integer offset, where the base pointer actually points outside the boundaries of the referenced object. If such techniques are used, they must be hidden from the garbage collector. An off-target base pointer must not be written to garbage-collected memory as a descriptor. Further, the mutator must perform the arithmetic necessary to convert the base pointer to a valid descriptor before tending it, and later, to convert the tended descriptor back to an appropriate off-target base pointer.

Pointers need not address the first word in the referenced object.

Write-through caching is used to ensure that the memory system is always aware of the most recent values represented by particular memory locations.

The CPU is capable of directly manipulating its cache. In particular, the CPU is able to invalidate ranges of addresses that may reside in its cache.

The cache may use a write buffer to improve the efficiency of write-through caching. However, it is important that the write buffer be flushed (written) in FIFO order to memory before reading from or writing to an uncached memory-mapped I/O port.

The cache line size must be no larger than one word. The architecture is assumed to be byte-addressable, with cache lines aligned on addresses evenly divisible by four. It is important that the cache not prefetch words that have not been explicitly referenced by the CPU.

Figure 2:
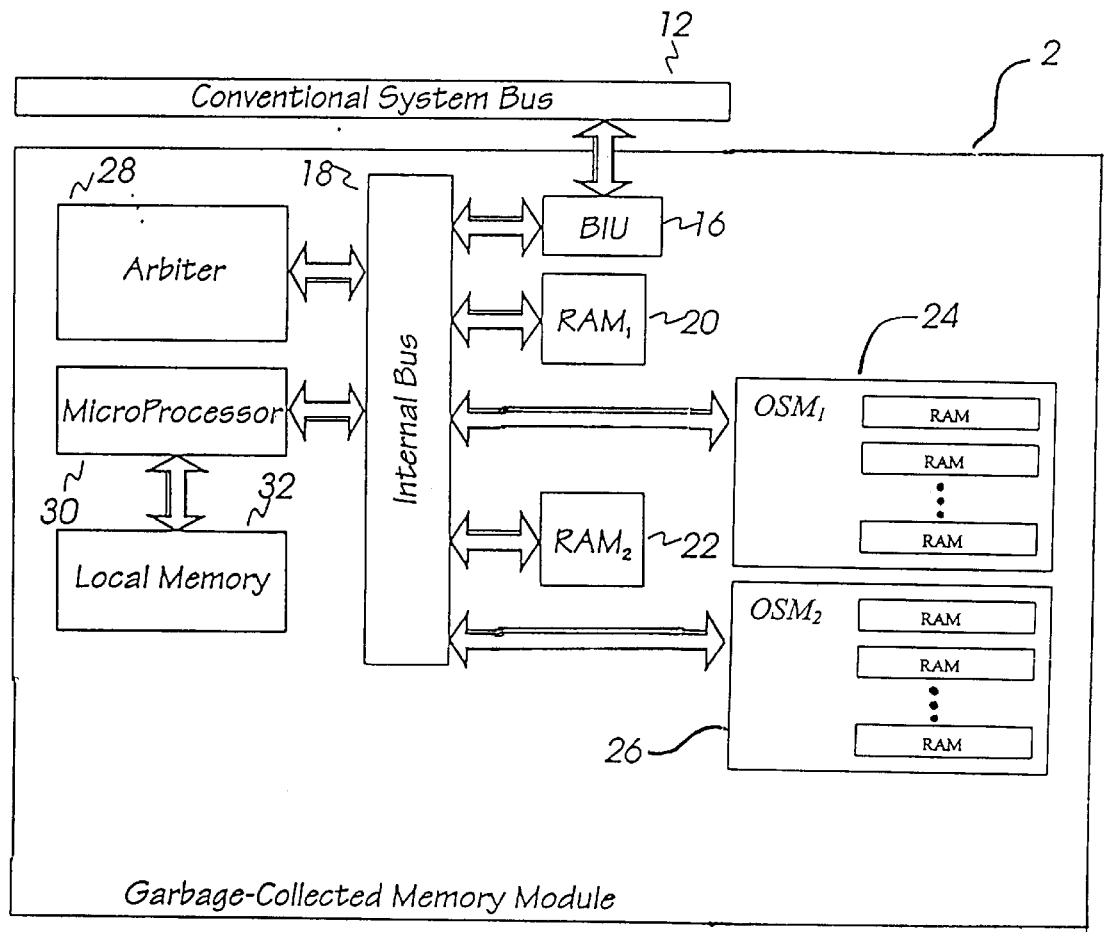
FIG. 2 is a block diagram of the garbage-collecting memory module showing the interface with the conventional system bus of a computer system.

The configuration of the GCMM 2 and the manner of interfacing with the conventional system bus 12 is shown in FIG. 2. The bus interface unit (BIU) 16 provides the interface between the system bus 12 and the internal bus 18 used for communication between components within the GCMM.

There are two identical random-access memories—$RAM_1$ 20 and $RAM_2$ 22. Each RAM module consists of 16 MBytes of random access memory. At any particular time, one of the two independent RAM modules represents to-space and the other, from-space. Each 32-bit word of RAM is accompanied by a one-bit tag that distinguishes pointers from non-pointers, a one-bit write-protect tag that prevents the mutator from overwriting the garbage collector's internal data structures, and six bits of error-correcting codes.

Associated with $RAM_1$ 20 and $RAM_2$ 22 are object space managers $OSM_1$ 24 and $OSM_2$ 26 respectively. Each OSM module manages its associated RAM module by maintaining a data base of locations at which each object residing in the RAM module begins. Given a pointer to any location within a memory module, the associated OSM is capable of reporting the address of the start of the object that contains that address in approximately the same time required to perform a traditional memory read or write. The OSM's primitive operations are reset which initializes the OSM, createHeader which installs an object into the OSM's data base, and findHeader which reports the beginning address of the object containing a particular address.

The arbiter 28 oversees access to the internal bus and performs a number of important garbage collection activities using circuitry dedicated to providing rapid context switching between background garbage collection activities and mutator demands.

The main responsibility of the microprocessor 30 is to supervise garbage collection. The local memory 32 provides the memory resources for the microprocessor 30 to perform its supervisory tasks. The microprocessor 30 oversees garbage collection by dividing the job into a large number of small straightforward activities and individually assigning each of these activities to the arbiter 28. The arbiter 28 works on commands from the microprocessor 30 as a background activity while giving highest priority to servicing requests from the BIU.

The organization illustrated in FIG. 2 permits multiple RAM and OSM components to work in parallel.

$RAM_1$ 20 and $RAM_2$ 22 each implements a 3-slot write buffer. $OSM_1$ 24 and $OSM_2$ 26 can each buffer one createHeader request. Thus, as long as sufficient time has passed since a preceding OSM request has been issued, a createHeader request completes instantly. Furthermore, subsequent findHeader requests need not wait for the buffered createHeader request to complete.

In order for the GCMM to collect garbage with minimal supervision from the CPU, it must know for each word of dynamically-allocated memory whether it contains descriptor or terminal data, and it must know which contiguous regions of memory represent indivisible objects. Within dynamically-allocated objects, all descriptors are tagged to distinguish them from terminal data. Object boundaries are identified when objects are allocated. The garbage collector retains size and type information about each allocated object by prepending a one-word header to each allocated object. This header is transparent to the mutator in that it precedes the address returned by the garbage collector in response to an allocation request.

Object headers take the form shown in FIG. 3. The header is marked as read-only to the mutator in order to protect the memory manager's integrity.

Normally, the descriptor tag associated with each object header is zero. However, when the garbage collector decides to copy an object to a particular to-space location, it copies the object's header into the first word of memory reserved for the copy and overwrites the original object's header with a pointer to the object's new location. The garbage collector also sets the original header's descriptor tag to indicate that the object's header really contains a forwarding pointer. At the same time, it overwrites the second word of memory reserved for the object's copy with a pointer to the original object residing in from-space.

The mutator communicates with the garbage collector by reading and writing special I/O addresses which are given symbolic names in the C++ programming language code fragment shown in FIG. 4. Those who are unfamiliar with the C++ syntax are referred to Paul M. Chirlian, *Programming in C++*, Merrill Publishing Co., Columbus, Ohio, 1990 and Paul J. Lucas, *The C++ Programmer's Handbook*, Prentice Hall, Englewood Cliffs, N.J., 1992. For convenience in exposition, it is postulated that these port addresses do not conflict with other I/O ports or memory addresses within the system.

The GC_Status and GC_Result ports provide responses to service requests issued by way of the input ports. The other output ports allow the mutator to examine the internal state of the garbage collector. The GC_ToSpace port provides the current address of to-space, and the GC_FromSpace port supplies the current address of from-space. The GC_SemiSpaceSize port returns the number of bytes in each memory semi-space. The GC_Relocated, GC_CopyDest, GC_Reserved, and GC_New ports return the current values of the arbiter's Relocated, CopyDest, Reserved, and New registers respectively. The GC_NumSliceObjects port reports the total number of slice objects that have been queued for copying into to-space, the GC_CopiedSliceObjects port reports how many of these have been copied into to-space, and the GC_ScannedSliceObjects port reports how many have been scanned. The GC_NumSliceRegions port reports how many slice regions have been queued for copying, and the GC_NumRegionsCopied port reports how many of these regions have been copied. A slice region is not considered copied until after its region control block has been initialized. The GC_TotalSliceData port reports how many words of slice data are contained within slice regions queued for copying. Not included in this figure is the combined sizes of slice region headers. The GC_TotalSliceCopied port represents how much of the slice data has been copied into to-space.

After slice data is copied, slice region control blocks are constructed to maintain detailed accountings of which memory within the slice region contains live data. The GC_TotalSliceControlled port represents the number of words of slice data region which are under the control of slice region control blocks. Whenever a descriptor slice object is scanned, the slice region data referenced by the slice object is scanned in search of from-space pointers. The GC_TotalSliceScanned port represents the number of slice region data words that have been scanned in this manner. Since words referenced by more than one descriptor slice object will be scanned multiple times, the value of GC_TotalSliceScanned may exceed the value of GC_TotalSliceData. After all live data has been relocated and, if necessary, scanned, the garbage collector visits each slice region control block in order to isolate the live data contained therein. This is called postprocessing. The GC_TotalSlicePostprocessed port represents the number of words of slice region data corresponding to the slice region control blocks that have been postprocessed.

The last phase of garbage collection consists of resetting all from-space memory and object space managers to zero in preparation for the next garbage collection flip. The GC_TotalZappedWords port reports how many words of from-space have been so initialized. Finally, the GC_Busy port returns non-zero if and only if the current garbage collection pass has not yet been completed. The information made available through these output ports allows the mutator to assess the garbage collector's progress, in order to pace its allocation efforts and plan for the beginning of the next garbage collection pass.

Service routines are invoked by writing one or more parameters to the appropriate input port. Only one service request may be active at a time—once a parameter value has been written to one of the input ports, no other request may be issued until subsequent parameters have been supplied and the garbage collector signals completion of the requested service.

Each of the services provided by the garbage collector is described in more detail below, and sample C++ code to invoke the service is shown. The C++ code makes frequent reference to the type definitions and constants shown in FIG. 5.

The flow diagrams that are shown in subsequent figures also utilize the syntax of C++. The code segments appearing in the flow diagrams do not necessarily represent actual code fragments. Rather, they abstract the sequence of actions and memory accesses that must be performed in order to implement particular operations. In some cases, multiple distinct blocks in the flow diagrams correspond to a single block of hardwired code. Many low-level details such as the implementation of memory alignment restrictions are omitted from the flow diagrams.

The C++ like code fragments that describe arbiter operations make frequent reference to the variables and data structures defined in FIG. 6. We use comma-separated parenthesized lists of values to represent record constructors. We postulate that the translator infers the type of constructors from their context.

In diagramming the control flow associated with memory allocation, we omit the test to determine whether garbage collection must be initiated and omit the pacing between the garbage collection and allocation. Neither of these concerns requires any access to the memory subsystem.

To the garbage collector, a record is any GCMM-allocated region of memory that never needs to be divided into smaller independent memory regions. If any address within a record is referenced by a live pointer, the garbage collector treats the entire record as live. To allocate a record, the mutator writes the desired size of the record, measured in bytes, to the GC_AllocRec port (FIG. 4) as indicated by the C++ code fragment shown in FIG. 7. The value returned at the GC_Result port (FIG. 4) is a pointer to the first word of the allocated record.

Figures 7, 8:
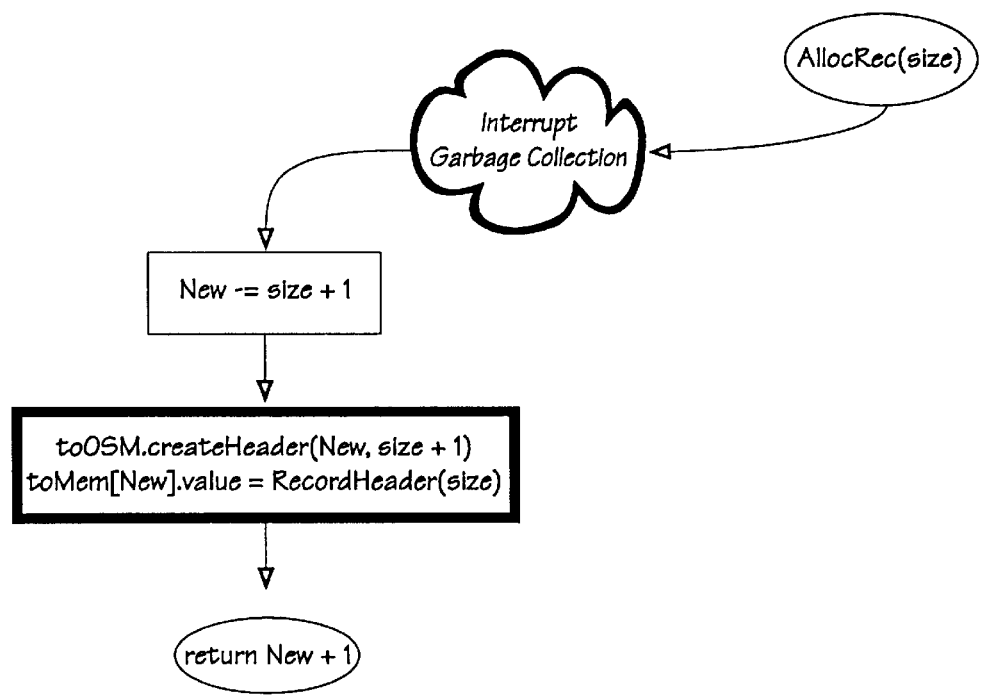
FIG. 7 is a C++ code fragment which allocates "size" bytes of memory to a record.
FIG. 8 is a flow diagram which describes the operation of allocating "size" bytes of memory to a record.

The response of the arbiter 28 (FIG. 2) to the mutator's record allocation request is detailed in the flow diagram shown in FIG. 8.

In all of the flow diagrams presented herein, a rectangle with a light border represents an action that can be implemented without access to the memory subsystem. A rectangle with a heavy border represents an action that normally incurs the overhead of a memory access. A cloud symbol is used to represent the cost of interrupting background garbage collection activities. Depending on the amount of specialized circuitry dedicated to minimizing this latency, the time represented by this action ranges from a single processor cycle to multiple memory cycles. In our memory cycle accountings, the worst-case time required to interrupt background garbage collection activities is assumed to be one memory cycle. A hexagon is used to highlight actions used to control concurrency between background garbage collection activities and the high-priority services provided to the mutator.

Two memory cycles are required to allocate a record.

Figures 9, 10:
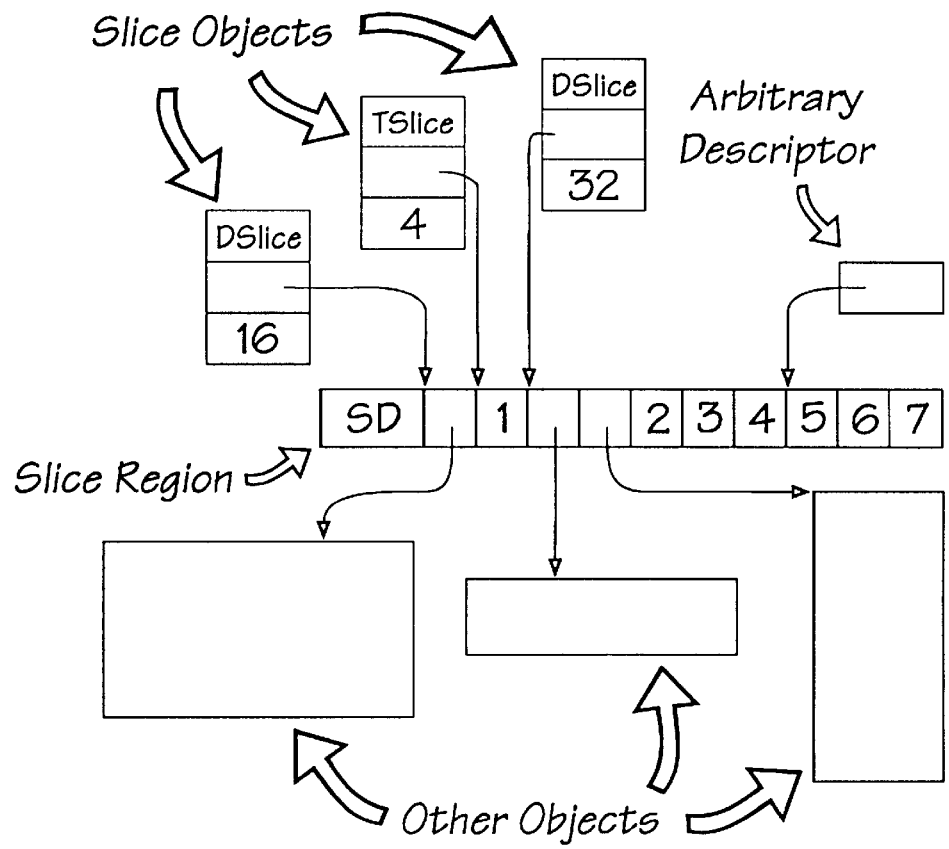
FIG. 9 illustrates the relationship between a slice region and slice objects.
FIG. 10 is a C++ code fragment that allocates "size" bytes of new slice region data and a corresponding slice object that refers to that data.

A slice is a region of contiguous memory that may be aliased either in its entirety or in part (as a subslice) by multiple pointers. A level of indirection is used in the implementation of slices, as shown in FIG. 9. This figure illustrates three slice objects and a single slice region. Each slice consists of a one-word title, a pointer to slice region data, and a count of the number of consecutive bytes of slice region referenced by the slice object. Two of the slices are titled with DSlice headers indicating that the slice data they reference may contain descriptors. The third slice has a TSlice header indicating that the referenced slice region segment is known to contain only terminal data. Note that arbitrary descriptors are allowed to point directly into a slice region. Since such pointers are not accompanied with length information, these descriptors do not by themselves cause the garbage collector to treat any of the slice region segments as live. Descriptors should only point to slice region addresses that are contained within segments already referenced by live slice objects.

The mutator writes the desired size of the slice to either the GC_AllocDSlice or the GC_AllocTSlice ports (FIG. 4) to allocate descriptor or terminal slices respectively. The difference between terminal and descriptor slices is that the slice region data referenced by terminal slice objects is not scanned for descriptors during garbage collection. The allocation function is shown in FIG. 10.

The value returned in the GC_Result register is a pointer to the first of two data words comprising the allocated slice object. The first word in the slice object points to the allocated slice data. The second represents the number of bytes of slice object data in the slice region. These two words are preceded by a one-word header that differentiates slice objects from other kinds of objects and distinguishes between descriptor and terminal slices. The garbage-collection algorithm requires that the three-word slice object not be modified by the mutator, so the slice object is marked as read-only. The mutator may, however, modify the slice region data referenced by the slice object.

Figures 11, 12:
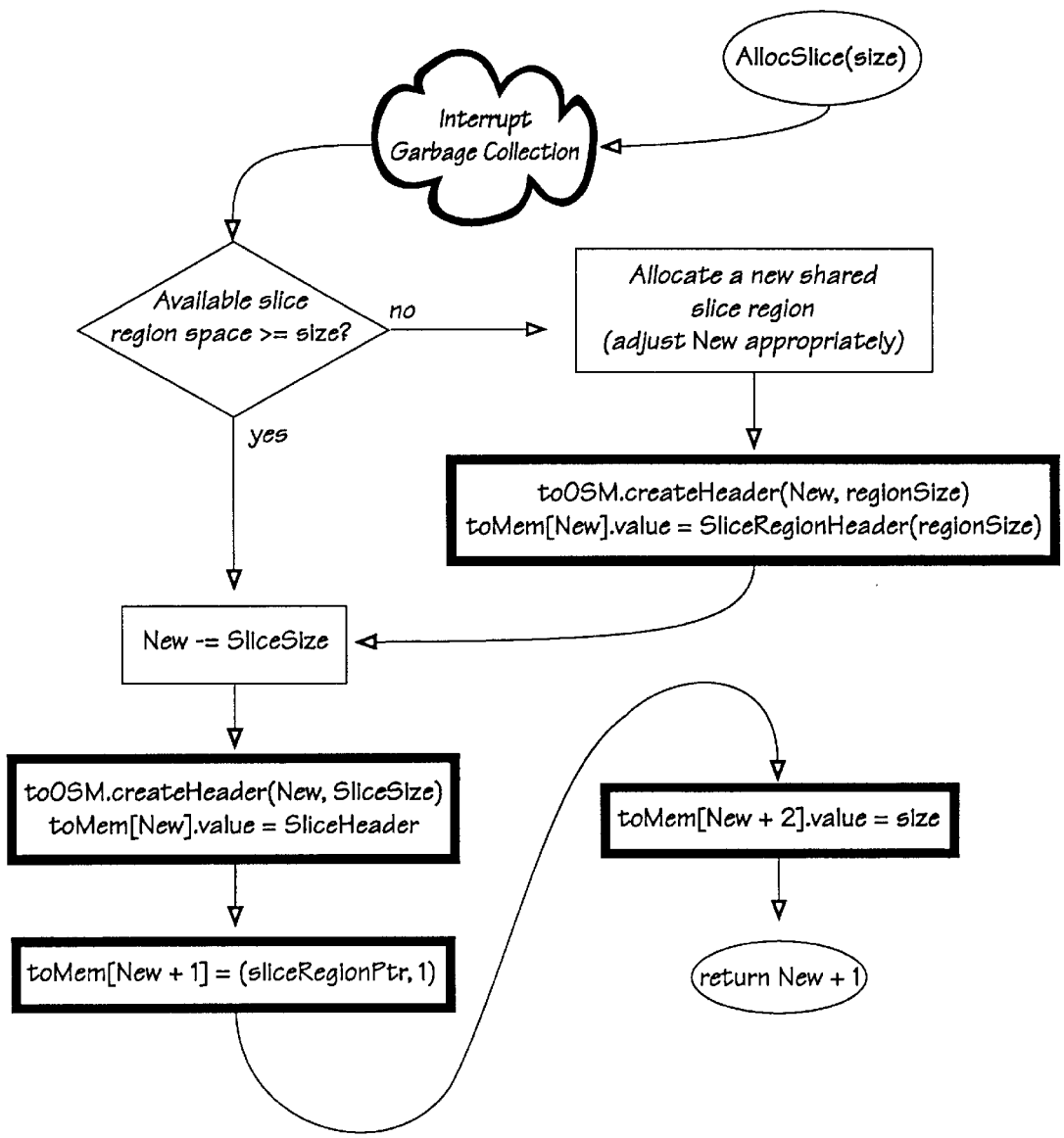
FIG. 11 is a flow diagram which describes the operation of allocating "size" bytes of slice region data and a corresponding slice object that refers to the allocated slice region data.
FIG. 12 is a C++ code fragment which allocates "size" bytes to a slice object in a previously-allocated slice data region

The response of the arbiter 28 (FIG. 2) to the mutator's slice allocation request to either the GC_AllocDSlice or GC_AllocTSlice port (FIG. 4) is detailed in the flow diagram shown in FIG. 11 wherein memory is allocated for slice region data and a slice object that references the allocated slice region data memory space, and a pointer to the slice object is returned to the mutator.

To provide efficient support for large numbers of short slice region allocations, the size of newly allocated slice regions is generally larger than is required to meet the immediate slice region needs. Before creating new slice regions in response to subsequent slice allocation requests, the storage allocator first tries to squeeze the requested slice region data into a previously allocated slice region.

The only difference between GC_AllocDSlice and GC_AllocTSlice port requests is the formats of the slice headers that result from the requests.

A worst-case total of five memory cycles is required to allocate a new slice.

Multiple slice objects may refer to overlapping segments of slice data. To create a slice object that is a subslice of a previously allocated region segment, the mutator writes the size of the desired subslice, measured in bytes, followed by the starting address of the desired subslice, which need not be word-aligned, to either the GC_AllocDSubSlice or GC_AllocTSubSlice port (FIG. 4) to allocate descriptor or terminal slice objects respectively. This process is exemplified by the code shown in FIG. 12.

It is the responsibility of the mutator to ensure that the specified starting address and length refer to a currently live segment of an existing slice region.

Figures 13, 14:
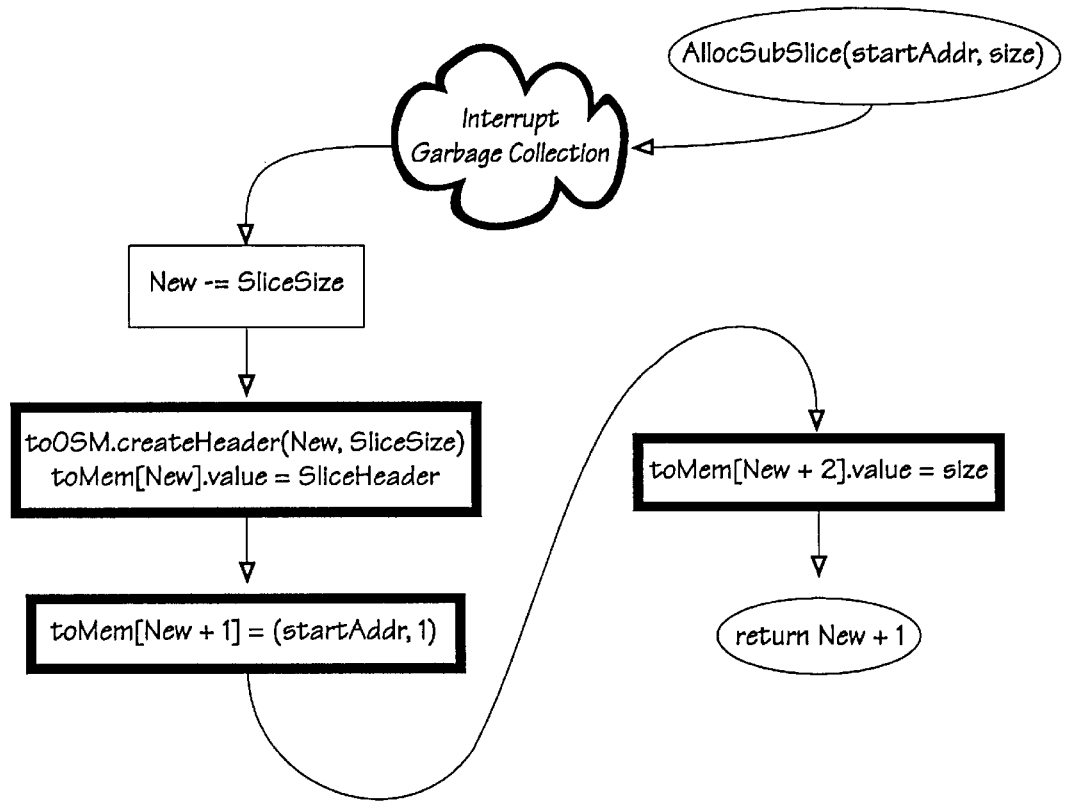
FIG. 13 is a flow diagram which describes the operation of allocating "size" bytes to a slice object in a previously-allocated slice data region.
FIG. 14 is a C++ code fragment which demonstrates the protocol for initializing a block of memory.

The response of the arbiter 28 (FIG. 2) to the mutator's subslice allocation request to either the GC_AllocDSubSlice or GC_AllocTSubSlice port (FIG. 4) is detailed in the flow diagram shown in FIG. 13 where it is assumed that startAddr points to a currently live segment of slice region data (containing at least size words of live data starting at startAddr). The only difference between GC_AllocDSubSlice and GC_AllocTSubSlice port requests are the formats of the slice headers that result from the requests.

Four memory cycles are required in the worst case to allocate a subslice.

Every word of dynamically-allocated memory is accompanied by a tag bit that distinguishes descriptors from terminal data. For slice objects, the tag bits are initialized when the slice is allocated. Within records and slice data regions, each word of allocated memory and its accompanying tag bit is initialized to zeros at the time of its allocation, indicating that it initially contains only terminal data.

The InitBlock operation (FIG. 4) permits the mutator to reinitialize a block of memory and accompanying descriptor tags. This process is parameterized with the address of the block of memory to be initialized, the number of consecutive words to be initialized (this number must be less than or equal to 32), and a 32-bit integer mask containing one tag bit for each word to be initialized. The C++ code shown in FIG. 14 demonstrates the protocol for initializing a block of memory.

Following the execution of InitBlock, the descriptor tag bit of memory location addr[i] is set to the value of the expression (mask >>i) & 0x01

It is the mutator's responsibility, when requesting the InitBlock process, to remove from its memory cache any data in the range of addresses between addr and (addr +numwords).

Figure 15:
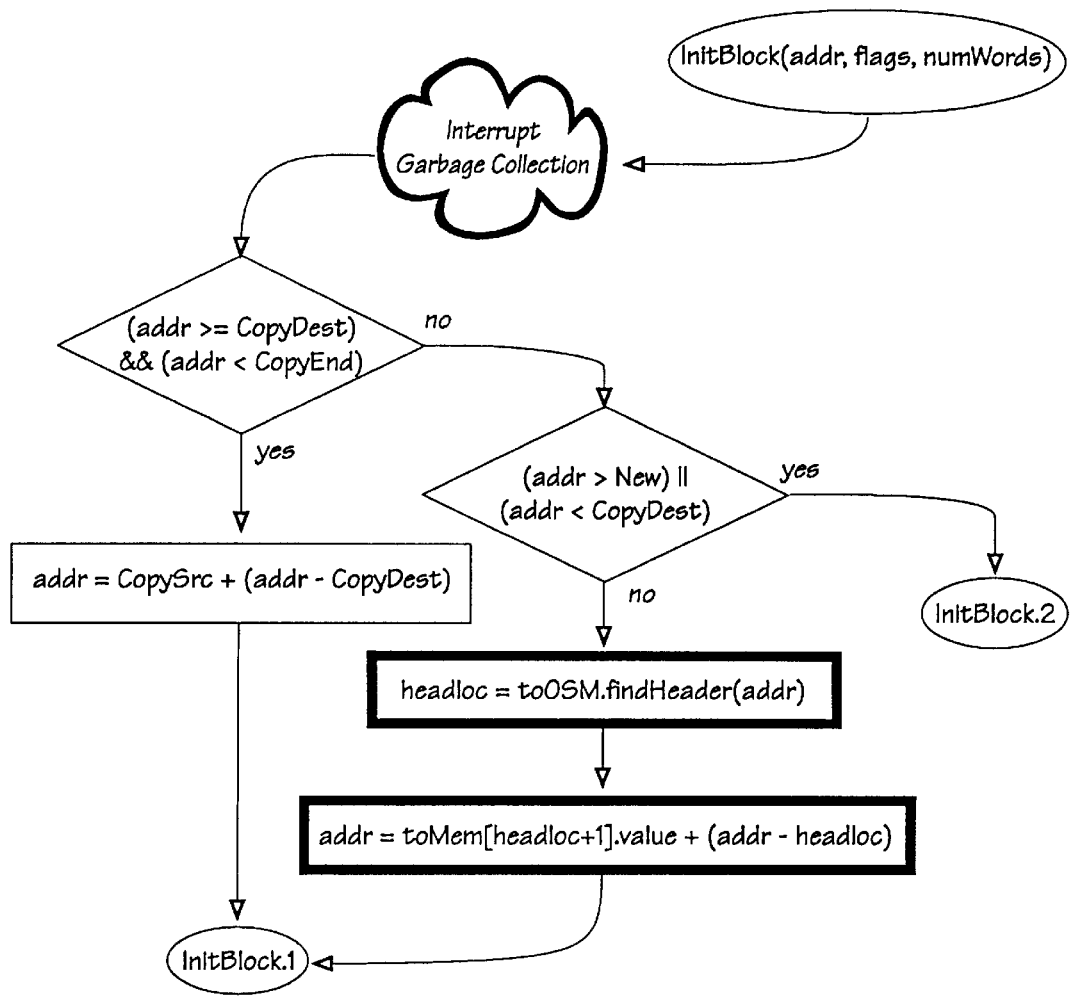
FIG. 15 is a flow diagram which describes the operation of initiallizing a block of memory.

The start-up code response of the arbiter 28 (FIG. 2) to the mutator's subslice initialization request is detailed in the flow diagram shown in FIG. 15 wherein numWords of memory starting at addr are initialized to zero. The quantity numWords is less than or equal to 32. The quantity flags is a 32-bit mask with one bit for each of the words to be initialized, the least significant bit corresponding to the first word to be initialized. A non-zero flags bit signifies that the corresponding memory word holds a descriptor.

The start-up code for InitBlock shown in FIG. 15 requires in the worst case three memory cycles to complete.

Figures 16, 17:
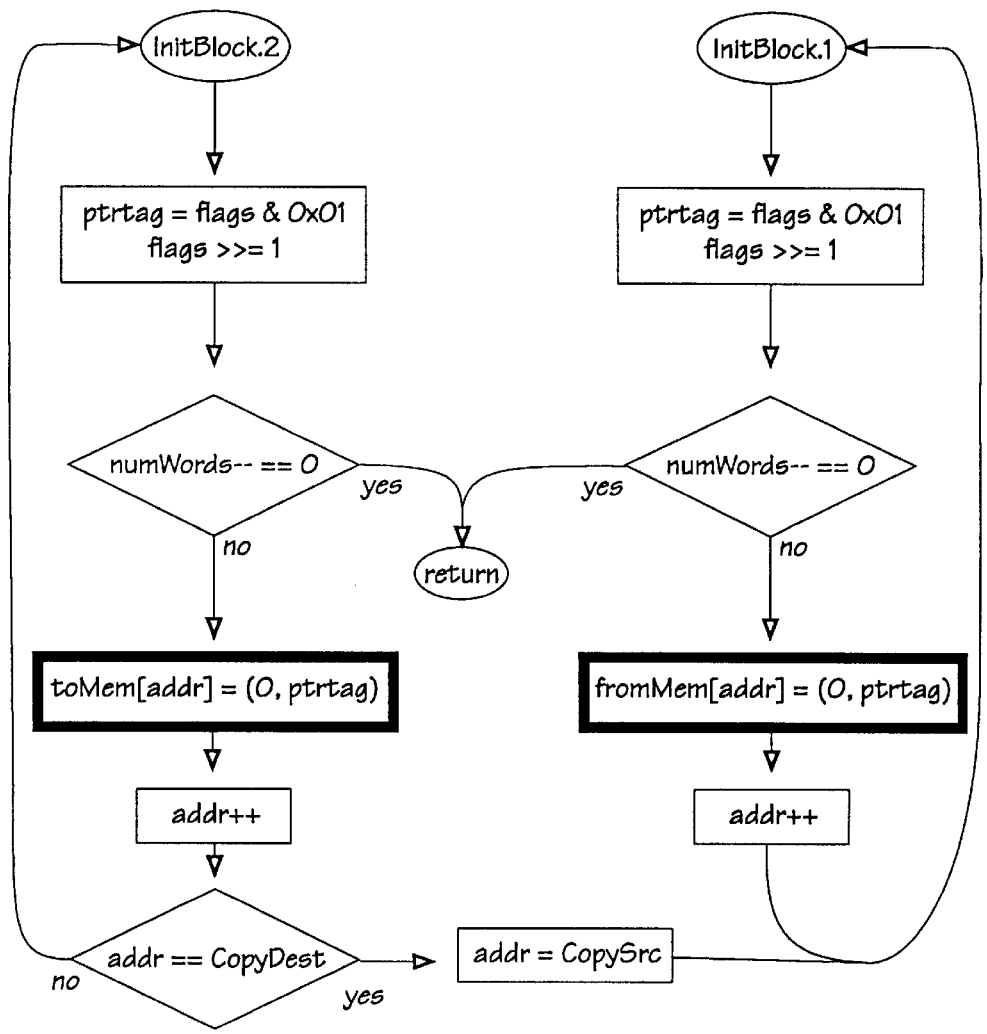
FIG. 16 is a continuation of the flow diagram of FIG. 15.
FIG. 17 is a C++ code fragment which demonstrates the recommended protocol for tending a descriptor.

The start-up code is followed by iterative execution of the routines shown in FIG. 16. The InitBlock.1 label corresponds to the case in which the data to be initialized currently resides in from-space. The InitBlock.2 label provides handling for data newly allocated in or already copied into to-space. Note that control passes from the InitBlock.2 loop to the InitBlock.1 loop whenever the region to be initialized spans the boundary, delineated by the CopyDest register, between data that has already been copied and data waiting to be copied. In total, numWords memory accesses are required to complete the loop iterations. Whenever numWords is greater than or equal to two and the InitBlock start-up costs are charged as three memory cycles, at least two of the iterative memory accesses can be buffered. Therefore, the total number of memory cycles required to implement InitBlock is numWords plus one.

The mutator continually monitors the status of the garbage collector and the amount of memory in the current free pool in order to decide when a new garbage collection pass should begin. Once initiated, the garbage collector incrementally copies live objects to new locations in order to eliminate fragmentation of the free pool. The mutator must cooperate with the garbage collector during initialization of the garbage collector by informing the garbage collector of each of its pointers into the GCMM. The garbage collector, in turn, responds with new pointer values representing the new locations of the objects they refer to. Each exchange of pointer values is known as tending of a descriptor. The C++ code shown in FIG. 17 demonstrates the recommended protocol for tending a descriptor.

After passing a value to the GC_TendDesc port (FIG. 4), the GC_Result port (FIG. 4) holds the value zero until the garbage collector has determined the new location of the object referred to by the pointer. After the garbage collector determines the object's new location, it updates the GC_Result port to hold the pointer's updated value.

The mutator initiates garbage collection by invoking the TendDesc procedure. It is the mutator's responsibility to assure that garbage collection has been completed prior to invoking the TendDesc procedure. In order to service TendDesc invocations with minimum latency, the garbage collector refrains from working on other garbage collection activities until it knows that all of the mutator's descriptors have been tended.

Figures 18, 19:
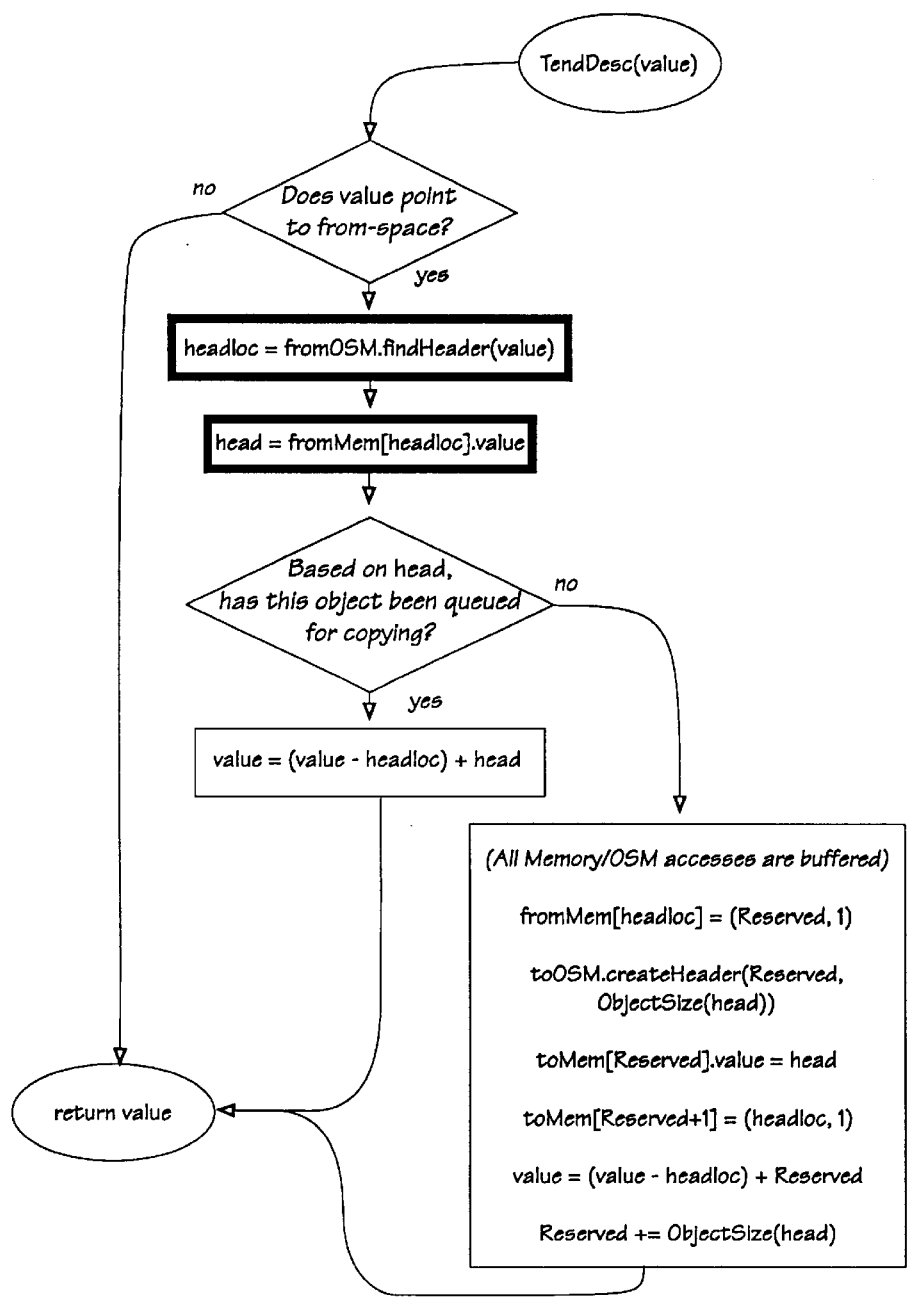
FIG. 18 is a flow diagram which describes the operation of tending a descriptor.
FIG. 19 is a C++ code fragment which demonstrates the protocol for informing the garbage collector that all descriptors have been tended.

The response of the arbiter 28 (FIG. 2) to the mutator's TendDesc request is detailed in the flow diagram shown in FIG. 18.

In the worst case, two memory cycles are required to tend a descriptor. The standard protocol guarantees that garbage collection is not active during times when TendDesc is invoked so there is no need to interrupt background garbage collection activities. Note that we are guaranteed sufficient space in the write buffers for the buffered writes illustrated in FIG. 18 because the block that performs the buffered writes is preceded by two memory cycles, neither of which accesses the to-space memory or $OSM_1$ 24 or $OSM_2$ 26 (FIG. 2).

Only one of the preceding memory cycles accesses from-space memory.

The mutator informs the garbage collector that all descriptors have been tended by invoking the TendingDone procedure shown in FIG. 19.

Figure 20:
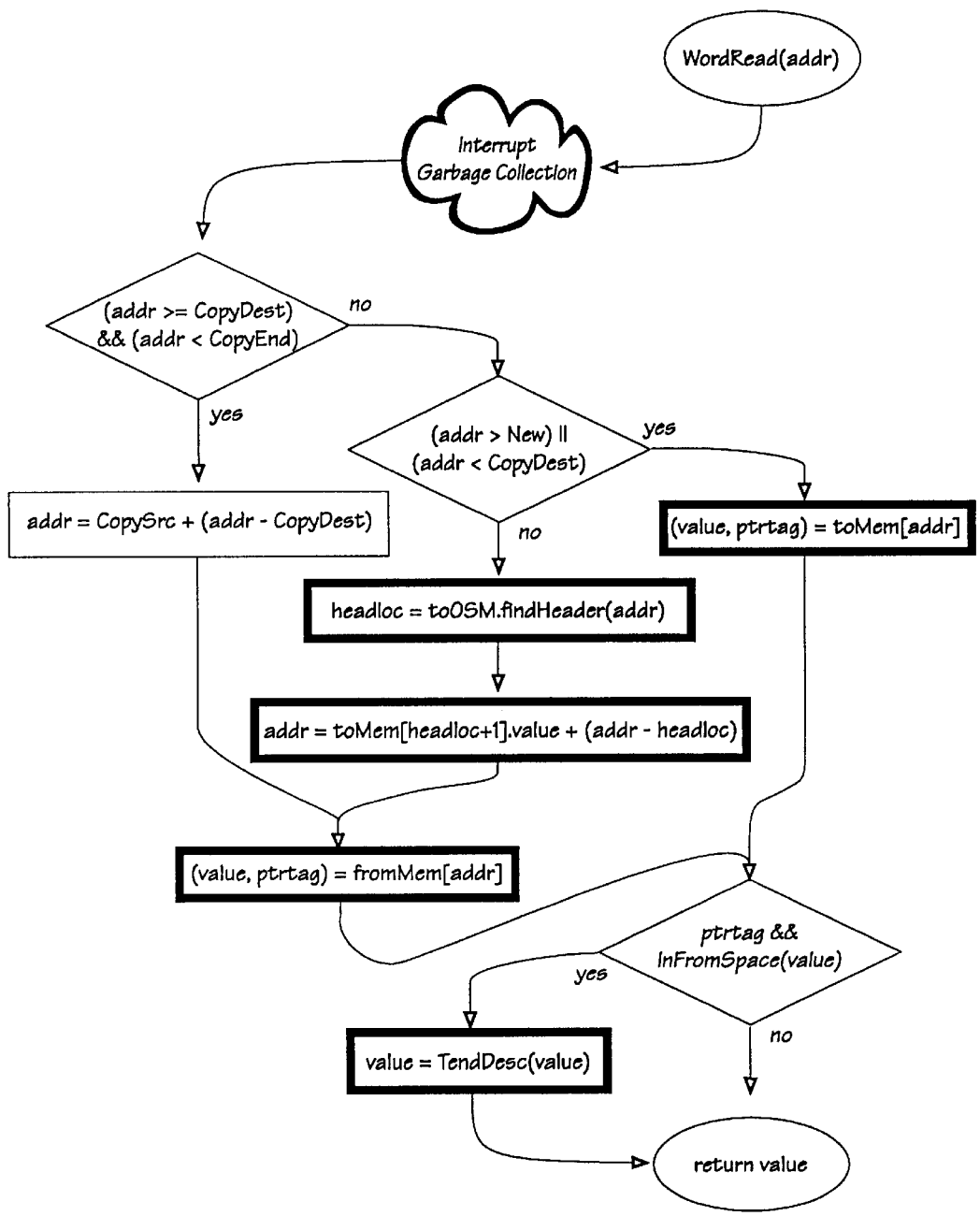
FIG. 20 is a flow diagram which describes the operation of reading a single word from memory.

The WordRead routine shown in FIG. 20 services traditional mutator fetches that refer to the GCMM. The worst-case number of memory cycles required to service a read request, including the costs of interrupting garbage collection, is four plus the cost of executing a TendDesc instruction. Thus, the total worst-case cost to read a word of memory is six memory cycles.

Figure 21:
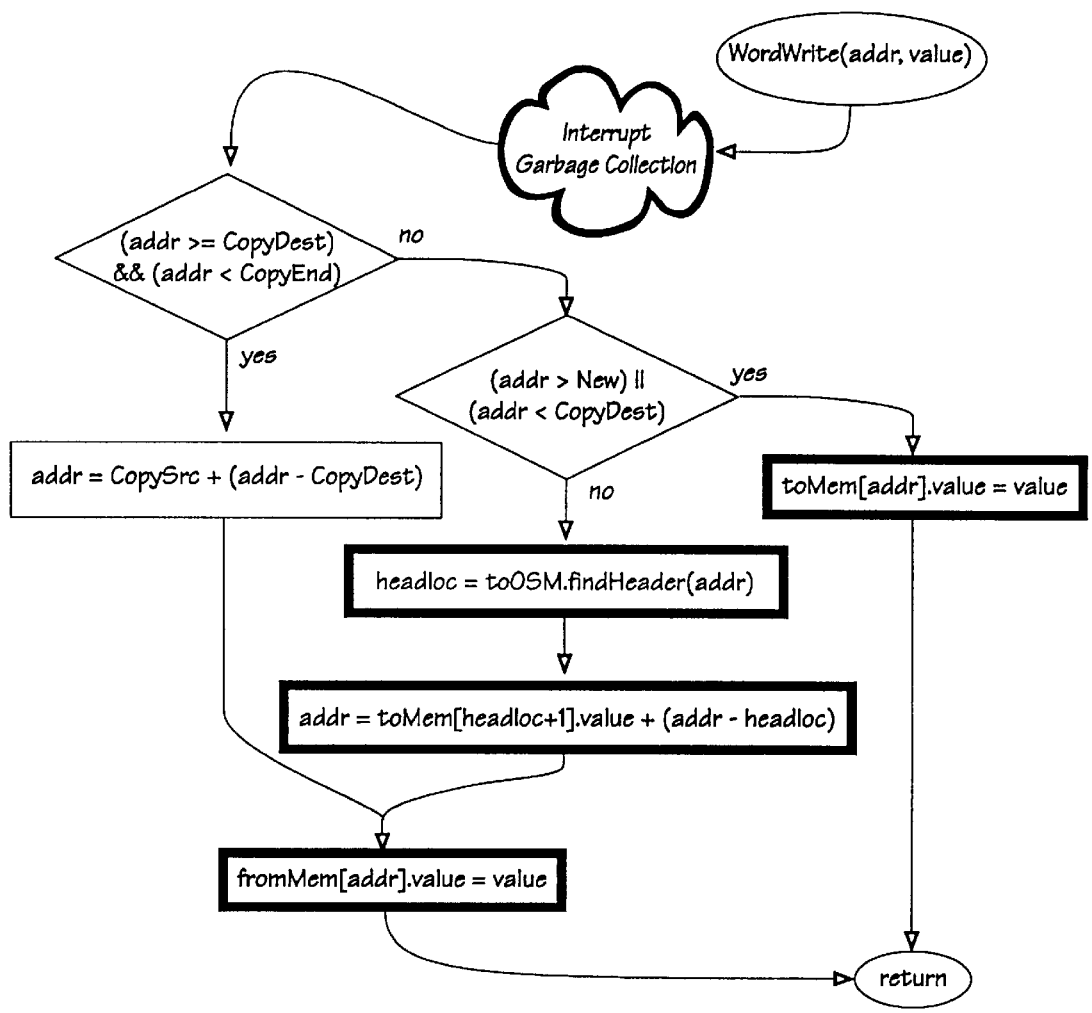
FIG. 21 is a flow diagram which describes the operation of writing a single word to memory.

The WordWrite routine shown in FIG. 21 services traditional mutator store operations that refer to the GCMM. The longest path through this routine makes four memory accesses. However, the last of these four memory accesses can be buffered. Thus, the worst-case total cost to write a word of memory is three memory cycles.

Figure 22:
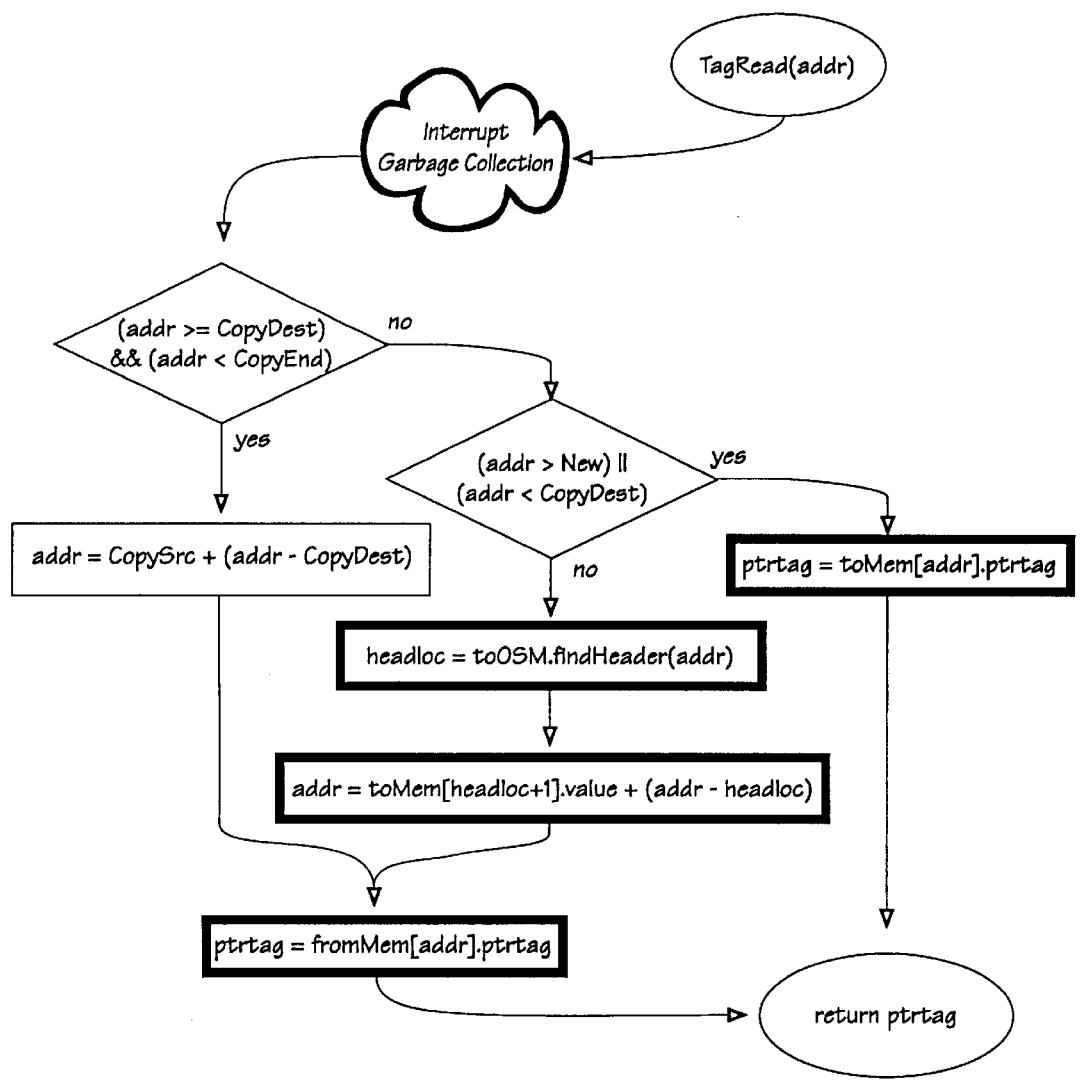
FIG. 22 is a flow diagram which describes the operation of reading the descriptor tag associated with the word at a particular memory location.

The TagRead routine shown in FIG. 22 enables the mutator to read the descriptor tag associated with the word at a particular memory location in the GCMM. The worst-case path through the TagRead routine requires four memory cycles.

Figure 23:
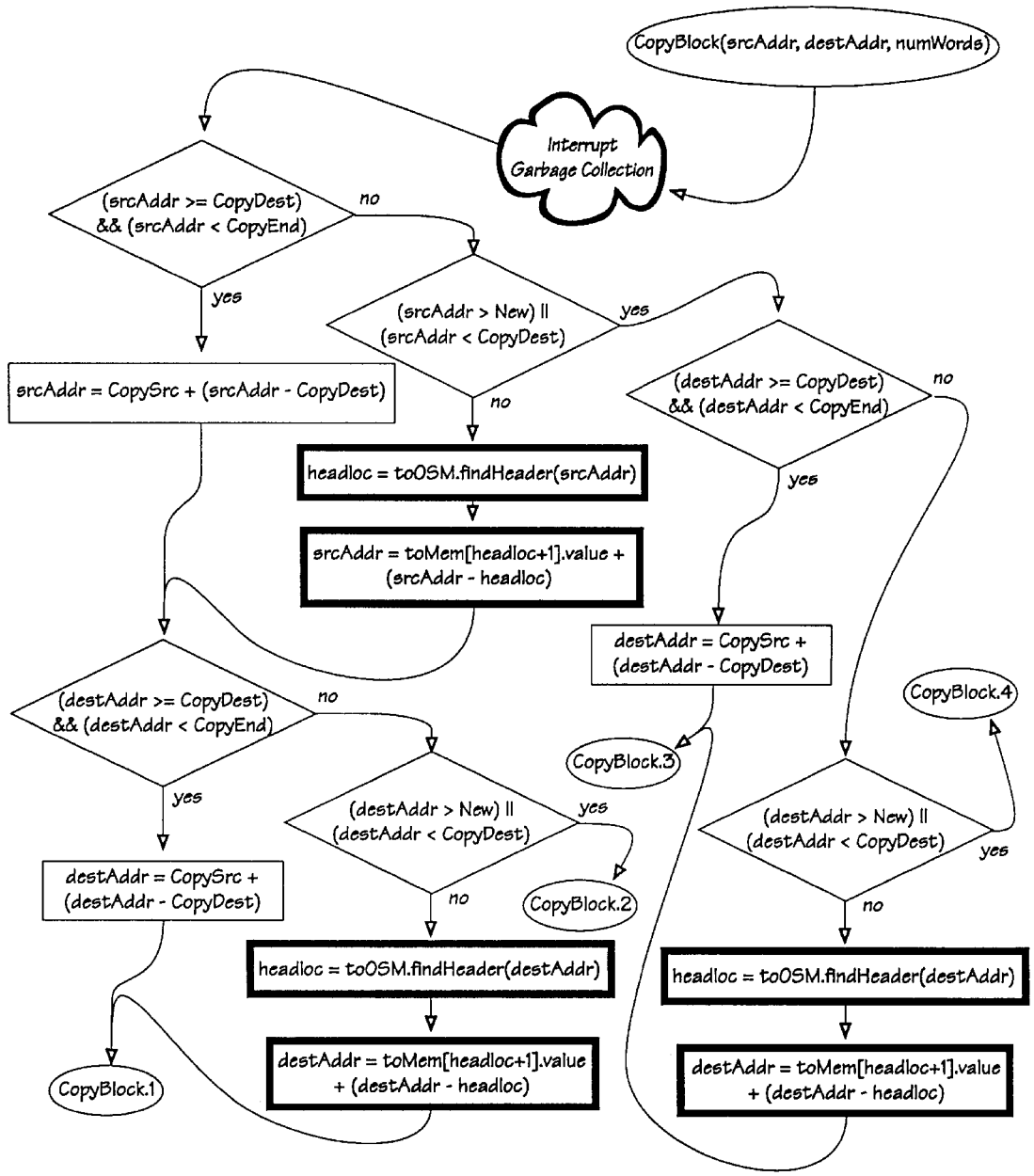
FIG. 23 is a flow diagram which describes the operation of copying data from one memory region to another.

The CopyBlock routine shown in FIG. 23 causes numWords of data with accompanying descriptor tags to be copied from srcAddr to destAddr. It is assumed that both the source and destination memory regions each reside entirely within a single object. Memory words are copied in ascending order. The startup code for CopyBlock requires five memory cycles in the worst case. The purpose of the startup code is to determine which memory regions hold the source and destination data and where the data resides within the appropriate region.

Figure 24:
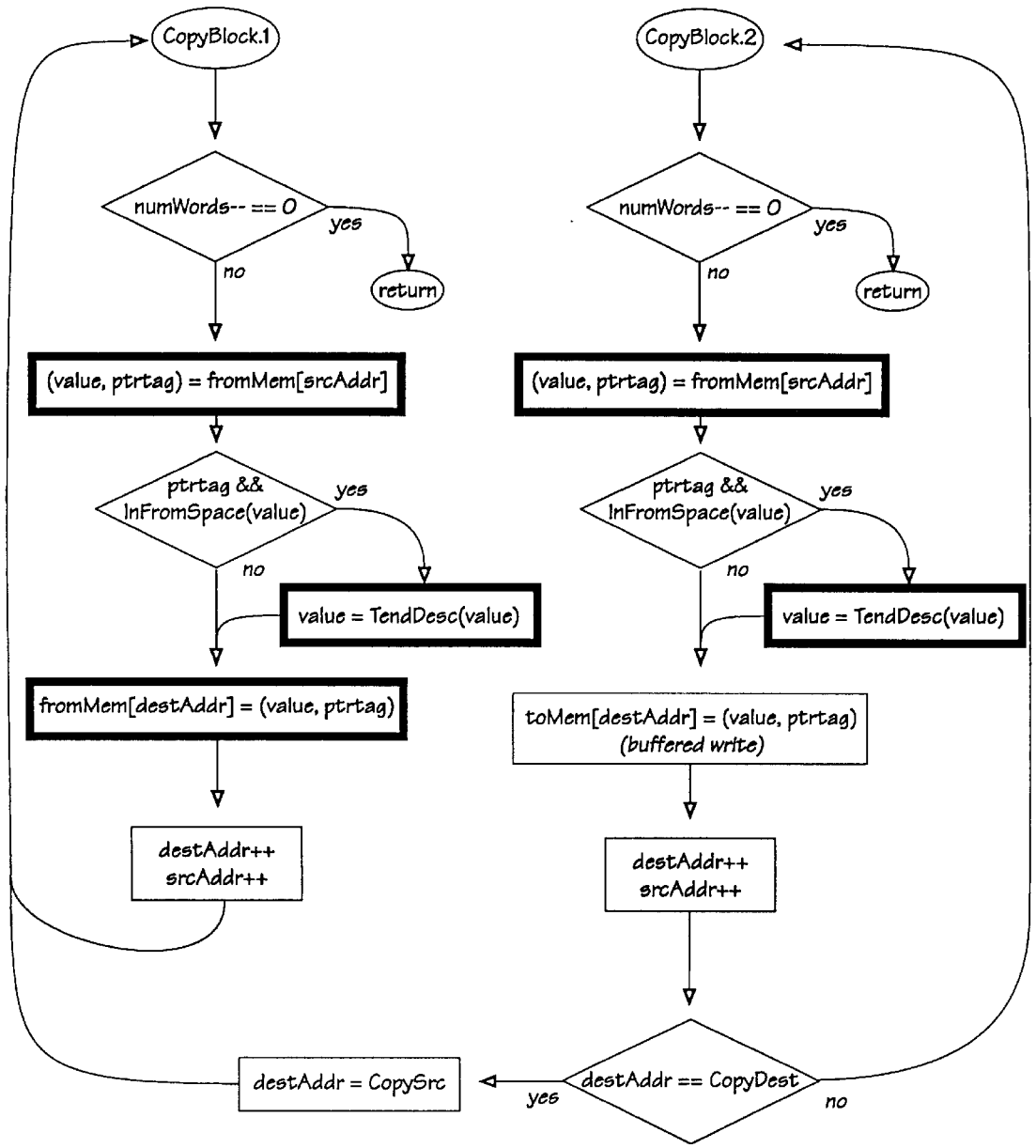
FIG. 24 is a continuation of the flow diagram of FIG. 23.
Figure 25:
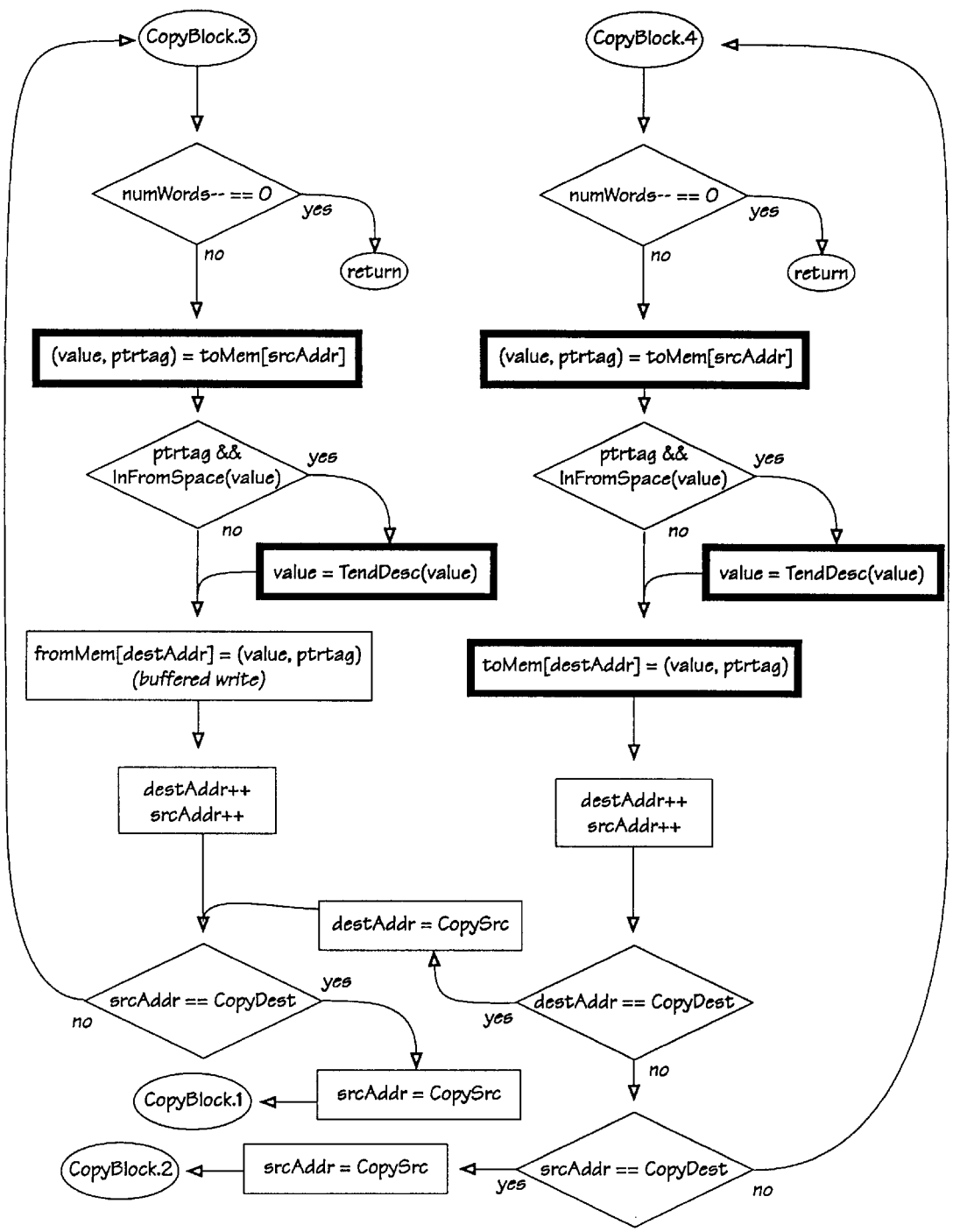
FIG. 25 is a continuation of the flow diagram of FIG. 23.

The CopyBlock.1, CopyBlock.2, CopyBlock.3, and CopyBlock.4 subroutines are shown in FIGS. 24 and 25. In the CopyBlock.1 routine the source and destination data reside in from-space. In the CopyBlock.2 routine the source data resides in from-space and the destination data resides in to-space. In the CopyBlock.3 routine the source data resides in to-space and the destination data resides in from-space. In the CopyBlock.4 routine the source and destination data reside in to-space.

Each iteration of the CopyBlock.1 loop requires four memory cycles in the worst case. Each CopyBlock.2 iteration costs three memory cycles in the worst case because one of TendDesc's memory cycles can overlap CopyBlock.2's write to to-space. For similar reasons the worst-case costs of executing each iteration of the CopyBlock.3 and CopyBlock.4 loops are three and four memory cycles respectively. The worst-case cost, therefore, of executing a CopyBlock instruction is five plus four times numWords memory cycles. An even tighter bound on memory cycles could be derived by accounting more carefully for the write buffering made possible by the CopyBlock startup code.

Figure 26:
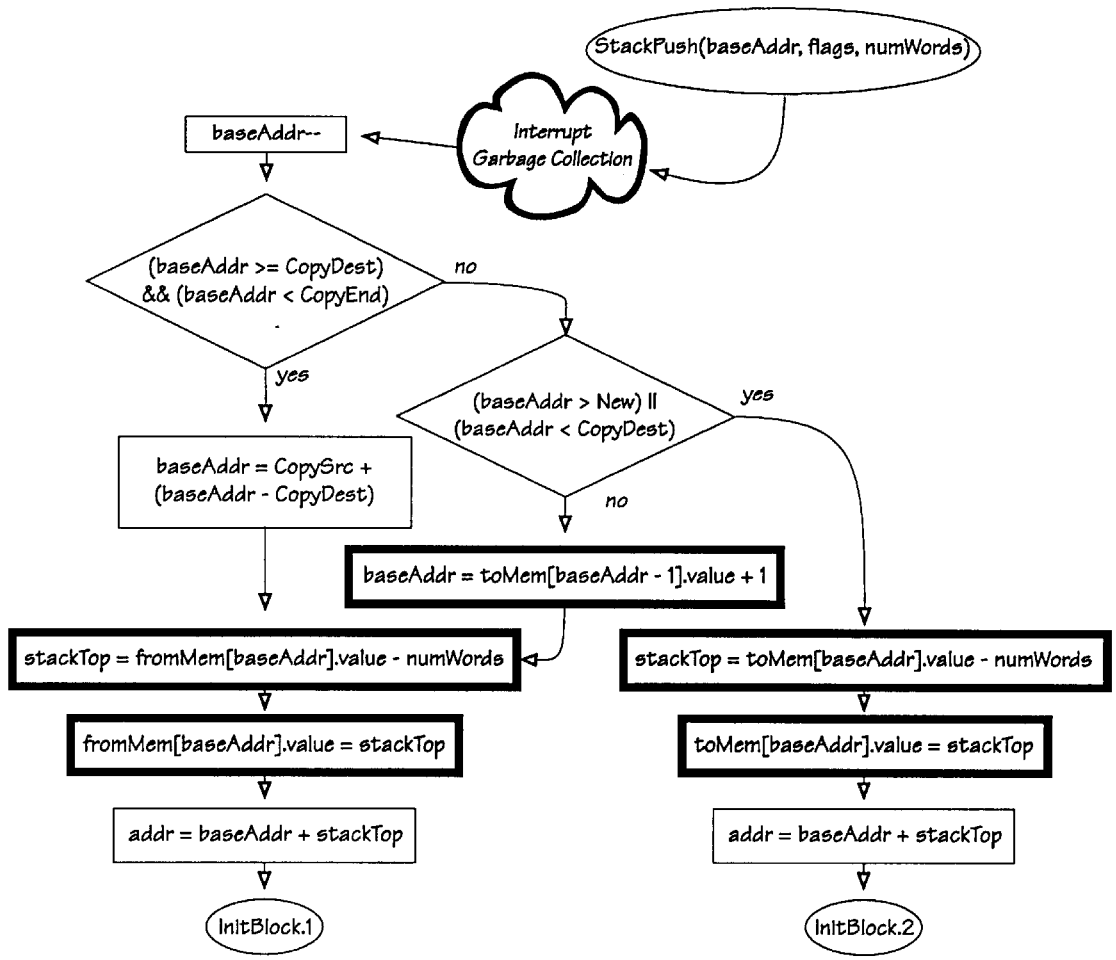
FIG. 26 is a flow diagram which describes the operation of increasing the live portion of a stack, initializing each of the stack-allocated words, and setting descriptor tags.

The StackPush routine shown in FIG. 26 increases the live portion of the stack based at baseAddr by numWords, initializes each of the stack-allocated words to zero, and sets descriptor tags according to flags. The flags parameter is interpreted as outlined in the InitBlock discussion in connection with FIGS. 15 and 16.

Every path through the StackPush startup code requires, in the worst case, three memory cycles. There is one path through this code that appears to require four memory cycles. However, the last memory write on that path can always be buffered, since one of the preceding three memory cycles on that path reads from to-space without requiring any access to from-space. Execution of the startup code is followed by numWords iterations of the InitBlock.1 or InitBlock.2 loops, each of which costs one memory cycle. Thus, the total cost of executing a StackPush operation is three plus numWords memory cycles.

Figure 27:
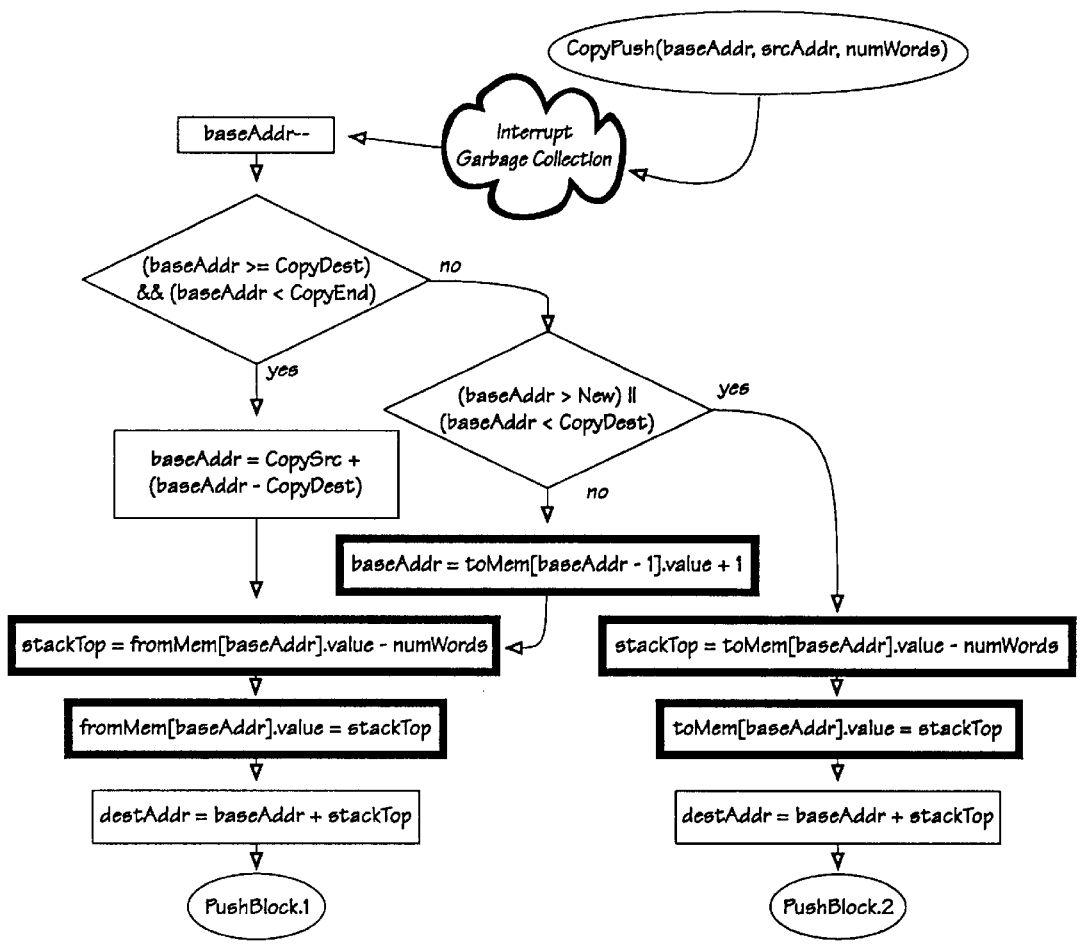
FIG. 27 is a flow diagram which describes the operation of expanding a stack and then copying data with accompanying descriptor tags onto the top of the stack.

The CopyPush routine shown in FIG. 27 copies words of data with accompanying descriptor tags from srcAddr onto the top of the stack found at baseAddr thereby expanding the stack before the data is copied. It is assumed that both the source and destination memory regions each reside entirely within a single object.

Figure 28:
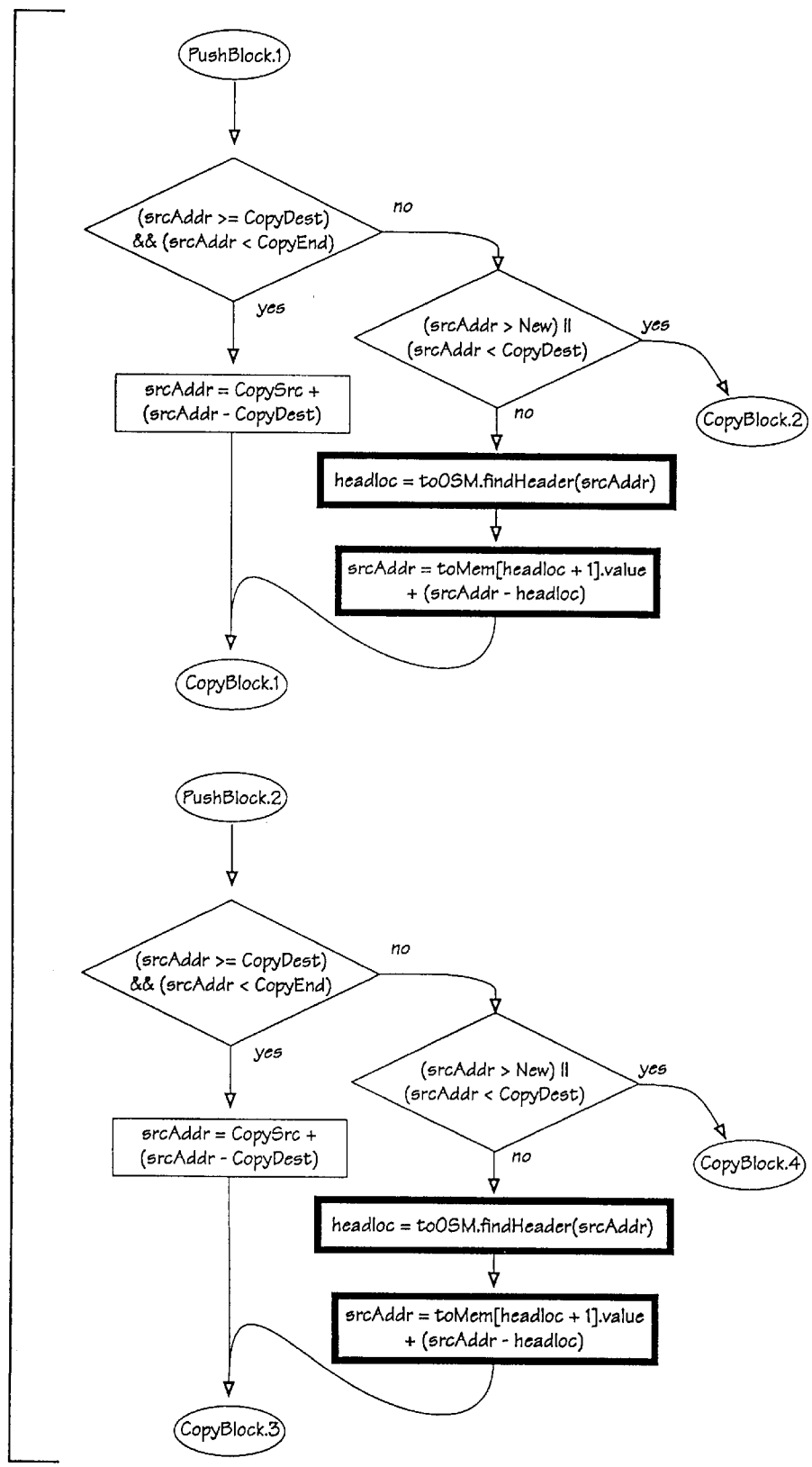
FIG. 28 is a continuation of the flow diagram of FIG. 27.

Every path through the CopyPush startup code illustrated in FIG. 27 requires, in the worst case, three memory cycles. There is one path through this code that appears to require four memory cycles. However, the last memory write on that path can always be buffered, since one of the preceding three memory cycles on that path reads from to-space without requiring any access to from-space. The startup code is followed by execution of the additional startup code associated with either the PushBlock.1 or PushBlock.2 subroutines shown in FIG. 28.

The worst-case requirements of the PushBlock.1 and PushBlock.2 subroutines are each two memory cycles, but the first memory cycle of each can overlap with the last memory cycle of the CopyPush code described above in connection with FIG. 27. This code is followed by numWords iterations of the appropriate CopyBlock subroutines shown in FIGS. 24 and 25. Each CopyBlock iteration costs, in the worst case, four memory cycles. So the worst-case total cost for execution of CopyPush is four plus four times numWords memory cycles. An even tighter bound on memory cycles could be derived by accounting more carefully for the write buffering made possible by the CopyPush startup code.

Figure 29:
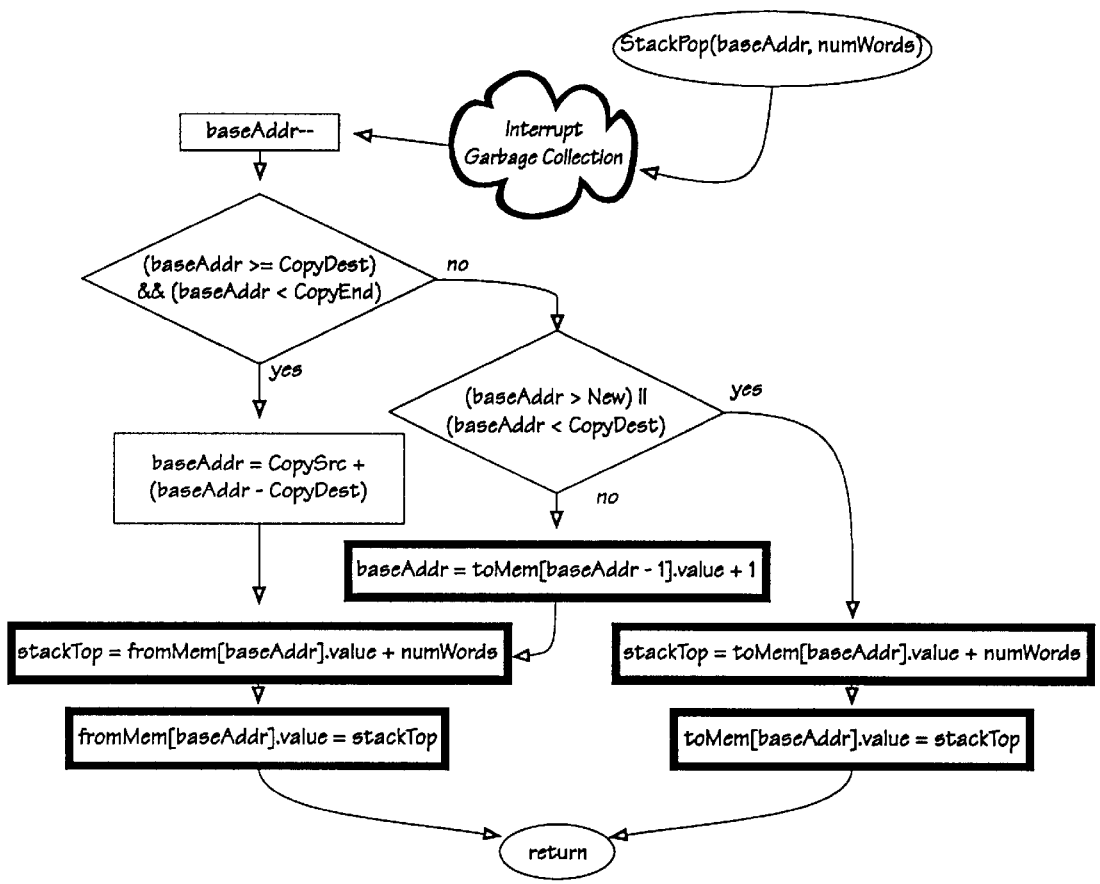
FIG. 29 is a flow diagram which describes the operation of shrinking the size of a stack.

The StackPop routine shown in FIG. 29 shrinks the size of the active stack by numWords. Every path through the StackPop code requires, in the worst case, three memory cycles. There is one path through this code that appears to require four memory cycles. However, the last memory write on that path can always be buffered, since one of the preceding three memory cycles on that path reads from to-space without requiring any access to from-space.

Figure 30:
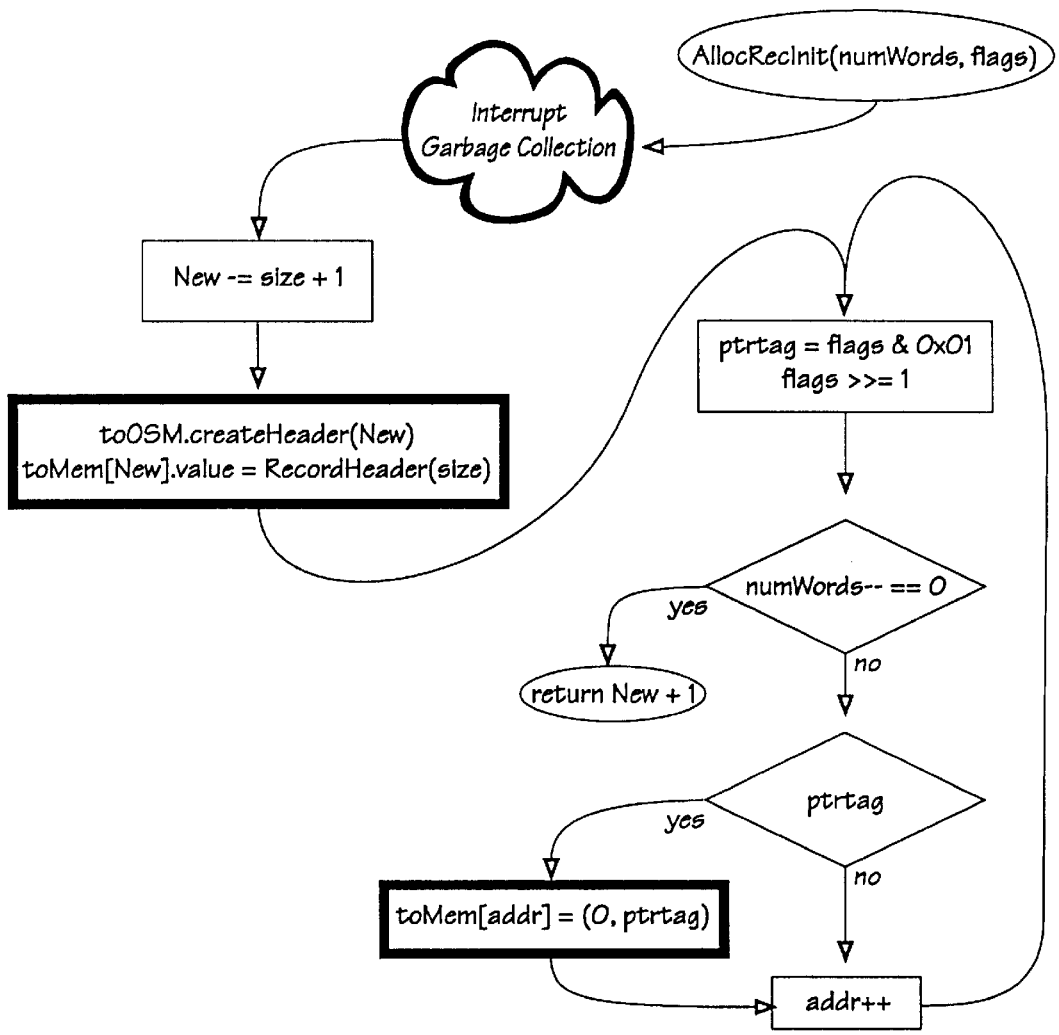
FIG. 30 is a flow diagram which describes the operation of allocating memory to a record and initializing the descriptor tag of each word.

The AllocRecInit routine shown in FIG. 30 allocates a record of size numWords $\leq 32$ and initializes the descriptor tag of each word according to flags. Only two memory cycles are required to implement the startup code. An additional memory cycle is required for each non-zero bit in AllocRecInit's flags argument.

The AllocStack routine shown in FIG. 31 allocates a stack with room to hold numWords of data and returns a pointer to the first of the allocated words. The stack, which grows downward, is initially empty. Three memory cycles are required in the worst case to allocate a stack.

The doflip function, defined in FIG. 32, initiates garbage collection by tending each of the mutator's pointers into the GCMM and invalidating cache entries which are known to have obsolete information due to garbage collection.

The purpose of doflip is to allow the garbage collector to begin mass copying of live data from one region of memory to another. The garbage collector divides its memory into two semispaces which it calls to-space and from-space, as previously indicated. Garbage collection consists of copying all live data out of from-space into to-space. New allocation requests are also serviced out of to-space. Thus, once the mutator has tended its pointers to the GCMM, all of its pointers refer to objects residing in to-space.

Initialization of a new garbage collection pass consists of interchanging the roles of the two semispaces. This operation is called a "flip". Since following execution of doflip, the mutator no longer has any pointers into from-space, any from-space memory that happens to reside in the mutator's cache is harmless. Most of the cached from-space lines will eventually be overwritten as new blocks of data are brought into the cache. If, however, any from-space data still resides in the cache at the time of the next flip, that data must be removed from the cache before program execution continues. Otherwise, subsequent fetches from the new to-space may accidentally return two-generation-old data. For this reason, doflip removes any data residing in the old fromspace before requiring that the garbage collector exchange the roles of to- and from-space.

Having described the software protocol for the GCMM that forms the basis for its integration with a variety of computer systems, we will now discuss the internal structure of the GCMM and its operation.

The GCMM, in various configurations, is intended to serve a large number of processor and bus architectures. The preferred embodiment, however, assumes that the system bus is capable of communicating 32 bits of address and 32 bits of data to support traditional memory store and fetch operations. The preferred embodiment is structured to accommodate byte and half-word memory updates in support of those system architectures that are capable of generating these operations. The preferred embodiment design assumes that the system bus provides some mechanism by which a memory or I/O module can stall the CPU until the module has processed whatever fetch or store operations it is responsible for. The specific design constraints imposed on the preferred embodiment should not be interpreted, however, as placing a limit on the general applicability of the GCMM invention to a wide variety of computer systems.

In order to facilitate parallel processing among the GCMM modules, transactions on the internal bus 18 (FIG. 2) are asynchronous in the following sense. First, a request is issued on the bus. After the appropriate module recognizes the request, the request is removed from the bus so that the bus can serve other needs. Later, if a response must be sent upon completion of the service routine, the bus is used to transmit the response.

Of the modules connected to the internal bus, only the BIU 16 and the arbiter 28 are able to initiate transactions on the bus. The internal bus includes two lines which identify the current bus master. One line is raised if the BIU is mastering the transaction. The other is raised whenever the arbiter is mastering the bus. If both lines are raised simultaneously (signaling a collision), all modules ignore the current bus transaction and the arbiter relinquishes the bus so that the BIU can issue its request on the subsequent bus cycle. This bus contention protocol was selected to give the fastest possible turnaround to BIU requests in the absence of contention from the arbiter (under typical workloads, the arbiter sits idle more than 90% of the time). Further, this protocol minimizes the overhead of occasional bus collisions.

Requests by the BIU 16 may preempt uncompleted requests issued previously by the arbiter 28. For example, the BIU may issue a fetch from $RAM_1$ only one internal bus cycle after the arbiter issues a store to the same bank of memory. Each memory and OSM module aborts handling of previously-issued tasks upon receipt of a new request. The arbiter monitors all transactions issued by the BIU. Whenever it detects that one of its own requests has been preempted, the arbiter waits for completion of the BIU service and then reissues its previously-aborted command. This protocol is designed to provide very fast handling of BIU requests with minimal impact to the arbiter's ongoing garbage collection activities.

Each of the modules connected to the internal bus may receive a request from another component on the bus to perform a certain action. Private ready lines are connected to each of the seven components connected to the bus. These lines signal completion of the respective component's most recently issued task.

The internal bus 18 accommodates four addressing bits and 64 data bits. Except for the BIU 16, each of the modules connected to the internal bus 18 has its own I/O port. Port addresses of the various modules are given in FIG. 33 using C++ notation: i.e. the 0x denotes that the two digits that follow are hexadecimals. Occasionally the arbiter 28 must "forge" responses to BIU-issued memory-fetch operations. The arbiter does this by asserting the most significant address bit on the local bus. Whenever the high-order address bit is set, the corresponding RAM module is inhibited from responding to the BIU's request to read from the RAM port because the address bus holds 0x0a or 0x0b rather than 0x02 or 0x03 respectively.

One bit on the bus distinguishes between read and write operations. One bit signals that the BIU 16 is mastering a bus transaction and another indicates that the arbiter 28 is mastering a bus transaction. The internal bus 18 sits idle most of the time. Occasionally, both the BIU and the arbiter request simultaneous access to the bus. The bus protocol requires that all modules ignore any bus transaction during which both the BIU and the arbiter assert their private bus-mastering signals. The BIU and the arbiter monitor each bus transaction that they initiate for possible collisions. If the BIU detects a collision, it reissues its request on the next local bus cycle. If the arbiter detects a collision, it deliberately remains silent on the following bus cycle. The arbiter listens in on the BIU's bus transaction, and takes special care to stay out of the BIU's way throughout the remainder of its current interaction with the internal bus. Consequently, for each mutator-initiated memory fetch or store, the internal bus contention overhead is never more than the time required to execute one local bus cycle.

Each of the modules connected to the internal bus 18 (FIG. 2) except for the BIU 16 may receive service requests from either the BIU or the arbiter 28. For each of these modules, the internal bus provides a dedicated one-bit signal to indicate that the module has completed the operation most recently issued to it. Whenever the BIU issues a memory fetch or store operation on behalf of the mutator, the arbiter must indicate approval of the response of the RAM module 20 or 22 before the memory operation is considered complete. The reason for requiring the arbiter's approval is that occasionally the read and write operations issued by the BIU must be redirected by the arbiter to a different semi-space than was addressed by the BIU. An additional one-bit signal is provided on the local bus to allow the arbiter to indicate approval of the RAM module's responses to BIU-initiated requests. After issuing a memory request, the BIU awaits both the RAM's ready signal and the arbiter's approval. A detailed description of the special handling that the arbiter gives to BIU-initiated memory read and write operations will be described a little later.

The BIU 16 (FIG. 2) provides communication between the GCMM 2 and the CPU 8 (FIG. 1) by monitoring the system bus 12 (FIGS. 1 and 2) for transactions that require communication with the GCMM. The BIU services system "writes" to memory locations in the address range between GC_AllocRec through GC_TendingDone inclusive (FIG. 4), "reads" from memory locations in the address range between GC_Status through GC_Busy inclusive (FIG. 4), and both "reads" from and "writes" to memory locations in the address range corresponding to $RAM_1$ 20 and $RAM_2$ 22 (FIG. 2) in the GCMM.

To process a memory read operation, the BIU 16 (FIG. 2) subtracts the base address of the GCMM from the system address and includes this difference in the encoding of a read request written to the command port of either RAM₁ 20 or RAM₂ 22. The BIU stalls the CPU 8 (FIG. 1) until the requested memory is available. After issuing its request to the RAM module, the BIU waits until both the module's ready signal and the approval signal of the arbiter 28 (FIG. 2) are raised, at which time the BIU reads from the appropriate RAM port. As mentioned previously, the arbiter occasionally forges responses to BIU-initiated RAM read operations. After obtaining the requested memory word, the BIU copies the word onto the system bus and lowers the system stall signal.

To process a memory write operation, the BIU 16 (FIG. 2) subtracts the base location of the GCMM from the address supplied on the system bus and includes this difference along with the value to be written to memory in the encoding of a write request written to the command port of either RAM₁ 20 or RAM₂ 22. The full encoding is described below. The BIU stalls the CPU 8 (FIG. 1) until the write operation has been completed. After issuing its request to the RAM module, the BIU waits until both the module's ready signal and the approval signal of the arbiter 28 (FIG. 2) are raised, at which time the BIU signals completion of the mutator's store operation on the system bus 12.

Upon detecting a mutator store to one of the GCMM's input ports (FIG. 4), the BIU 16 (FIG. 2) saves the data within an internal buffer. The BIU knows how many arguments are required for each of the operations supported by the GCMM. Upon receipt of the last argument for a particular operation, the BIU encodes the garbage collection request as a 64-bit word and writes this to the arbiter's command port. The encodings are described below. Because of the internal buffering implemented by the BIU, there is never a need to stall the CPU during writes to the GCMM's input ports.

Fetches from the GCMM output ports (FIG. 4) ranging from GC_Status through GC_Busy require that the BIU 16 (FIG. 2) communicate with the arbiter 28. The BIU stalls the CPU 8 (FIG. 1) while it writes the encoded request to the arbiter's command port. The BIU then waits until the arbiter signals approval, at which time it reads the value of the appropriate register from the arbiter's port and copies this value to the system bus, simultaneously lowering the system stall flag. The encodings for arbiter commands are described below.

Each RAM module 20, 22 (FIG. 2) responds to Read, Write, and Reset requests. The modules support byte, half-word, and word "writes". Write requests may be augmented with an optional one-bit descriptor tag and/or an optional one-bit write-protect bit. A Reset instruction initializes all of memory, including the descriptor and write-protect tags, to zeros. The output to a RAM command port is coded in accordance with the format shown in FIG. 34.

Internally, each RAM module 20, 22 (FIG. 2) is organized as an array of 34-bit data words, each word being accompanied by six bits of error-correcting codes (ECC). Single-bit errors are detected and corrected within each RAM module. In order to maintain the ECC bits, all updates to memory must overwrite the entire 34-bit word. Writes that update fewer than 34 bits require that the RAM module fetch the word, overwrite the relevant bits, and then write the entire word accompanied by its revised ECC bits back to memory.

Requests to overwrite words that have a non-zero write-protect bit are only honored if they overwrite the write-protect bit as well. Only the arbiter 28 (FIG. 2) issues memory requests that modify the write-protect bit. Thus, the mutator is prevented from overwriting memory that has been write-protected by the arbiter.

Static-column DRAM is used to support high throughput. This type of DRAM is especially useful in supporting less-than-full-word memory updates and in supporting sequential access to consecutive memory locations, a common access pattern for garbage-collection operations.

Upon receipt of a Read, Write, or Reset request, a RAM module 20, 22 (FIG. 2) aborts processing of any previously issued unfinished memory operations and begins working on the newly received request. In processing Write operations, a RAM module raises its ready signal as soon as it has placed the requested operation in its write buffer. A RAM module is capable of buffering three words of write data. With Read operations, a RAM module raises its ready signal as soon as it has fetched the requested data either from one of its write buffer slots or from memory. Under normal circumstances, the bus master that originated the Read operation will then read from the RAM module's command port thereby obtaining the entire 34-bit word as the least significant bits of the 64-bit command port.

For Reset operations, a RAM module 20, 22 (FIG. 2) raises its ready signal after it has initialized all of memory to zero. Special circuitry supports rapid initialization of memory by writing zeros to multiple RAM chips in parallel.

Each OSM module—OSM₁ 24 and OSM₂ 26 (FIG. 2)—responds to CreateHeader, FindHeader, and Reset requests. A CreateHeader request installs a new object into the OSM module's data base. A FindHeader request retrieves the location of the header (first word) of the object containing a particular memory location. A Reset request causes an OSM module to initialize its data base to its empty state. The encodings for OSM requests are shown in FIG. 35.

Requests to OSM modules 24, 26 (FIG. 2) are issued only by the arbiter 28. Upon receipt of a CreateHeader, FindHeader, or Reset request, an OSM module aborts processing of any previously issued operation that has not yet terminated and begins working on the new request. In response to a CreateHeader request, an OSM module raises its private ready flag as soon as it has buffered a description of the object to be created. The OSM is capable of buffering one CreateHeader invocation. Upon receiving a FindHeader request, an OSM module examines its buffer of Create-Header requests and searches in parallel its data base of object header locations. The OSM module raises its ready signal as soon as it has determined the location of the header corresponding to the object that contains the derived pointer passed as an argument to the FindHeader request. The arbiter then reads from the OSM's command port to obtain the address of the object's header. The 24-bit header location is returned as an offset relative to the beginning of the corresponding semi-space. Upon receipt of a Reset request, an OSM module clears its internal data base of object locations. After all of its internal memory has been initialized to zero, the OSM module raises its private ready signal.

The challenge in implementing the OSM modules 24, 26 (FIG. 2) is that all header lookups and installs must execute in constant time regardless of the sizes of the objects involved in the operations. An OSM module is a mirror of its associated RAM module 20, 22 in that there is an OSM module memory cell associated with each associated RAM module memory cell. In order to bound the work involved when installing a new header location, the OSM module memory cells are divided into "groups", each group controlling a different memory segment of the associated RAM module 20, 22. The OSM install algorithm maintains the following invariant (except for the top-most level of the OSM hierarchy):

For each possible object location within memory the corresponding OSM entry records the offset of the beginning of the object that spans that location if the object begins within the region of memory controlled by the OSM group that encloses the OSM entry.

If the object begins prior to the start of memory controlled by a particular group, then that group takes no responsibility for representing the object's start address. The OSM module maintains a hierarchy of groups and this invariant is maintained at all levels. An operation of a single level-one OSM group that controls eight possible object locations is illustrated in FIG. 36 wherein memory cell addresses increase from left to right. One object with an unspecified starting address spans the first three object locations controlled by this OSM group. The second object occupies locations three, four, and five. A third object begins at offset six within the group and extends into the group that follows. For each possible object location, an OSM module dedicates a single bit of each memory cell to distinguish between valid and invalid offsets. Since the object that spans the first three cells of the illustrated OSM group does not begin within this group, the first three offsets are flagged as invalid.

Figure 37:
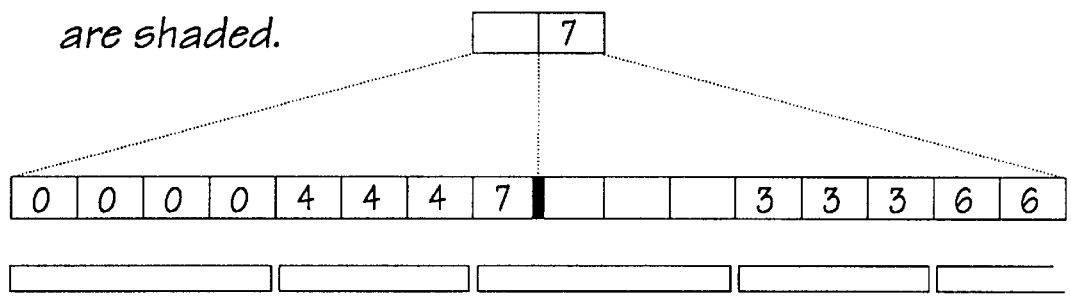
FIG. 37 illustrates two level-one object space management groups controlled by a two-element level-two group.

An OSM module maintains level-two and level-three groups of memory cells for the purpose of storing the starting positions of objects that span the boundaries between level-one groups and result in "invalid" designations in the level-one groups that do not contain the starting addresses of the objects. The level-two groups are formed by grouping the level-one groups and assigning a level-two memory cell to each level-one group. The level-three groups are formed by grouping the level-two groups and assigning a level-three memory cell to each level-two group. For example, in FIG. 37 the level-one group illustrated in FIG. 36 is shown as the second of two level-one groups that are associated with a two-cell level-two group. The seven in the second cell of the level-two group indicates that the object that spans the boundary between the two level-one groups begins at offset seven relative to the beginning of the memory controlled by the level-two group. Note that each level-two group controls more memory than a level-one group. However, level-two coverage is spotty. Level two only represents objects that (1) begin within the segment of memory controlled by the level-two group, and (2) span the boundary between neighboring level-one groups that both control memory within the jurisdiction of the level-two group. Since all valid level-two entries represent objects that span (or cross) boundaries between adjacent level-one groups, we refer to the level-two entries as crossing pointers. Level-three crossing pointers describe objects that span boundaries between groups of level-two offsets.

Figure 38:
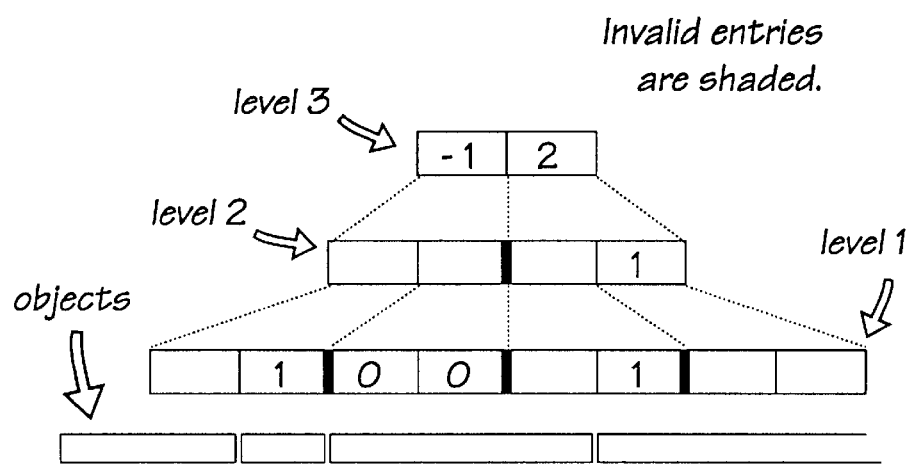
FIG. 38 illustrates four level-one object space management groups controlled by two level-two groups which are in turn controlled by a single level-three group.

An example involving three group levels is shown in FIG. 38. Each group in the example maintains two offset fields. At level-one of this pyramid each group can represent two possible object locations. Each group of level-two offsets can represent four possible object locations. And at the top level there is only one group which spans the entire region of memory controlled by an OSM module 24, 26 (FIG. 2). In this example, the level-three group controls eight possible object locations. In the figure, dotted lines connect group boundaries at one level with the bottom-left corner of the associated crossing offset in the next level up. At all levels, each group maintains offsets only for objects that begin within the region of memory controlled by that group. All offsets are expressed relative to the beginning of the group that holds the offset. For example, top-level offsets are expressed relative to the beginning of the OSM chip space. The offset value 1 shown in the second group of level-two offsets translates to offset 4 +1 =5 relative to the beginning of OSM chip space (4 is the offset at which the second group of level-two offsets begins). The top-level group encompasses the entire region of memory controlled by a particular OSM chip and also represents objects that span the boundary between memory controlled by this OSM and lower-addressed memory. In this example, −1 in the leftmost position of the level-three group denotes that the first object begins at offset −1 relative to the beginning of the region of memory controlled by this particular OSM chip.

In the initial state of an OSM module 24, 26 (FIG. 2), all entries at all levels of the OSM's pyramid of starting offsets are flagged as invalid. Execution of the OSM module's Reset instruction restores the OSM module to this initial state.

The C++ declarations given in FIG. 39 represent the three levels of OSM hierarchy illustrated in FIG. 38.

The install instruction is parameterized with the object's starting and ending addresses. Installation of a new object within an OSM module 24, 26 (FIG. 2) consists of executing the algorithm beginning in FIG. 39 and continuing in FIG. 40. The term OSMBase represents the address of the first word of memory controlled by an OSM module. We assume that integers are capable of representing memory addresses and that assigning a value to one of the array elements marks that array element as valid.

At most, three complete groups of entries must be updated during installation of a new header location. Whenever multiple OSM spaces are spanned by a single object, all of the involved OSM chips process the install instruction in parallel. The chip that holds the start pointer executes the algorithm given in FIG. 40. The other chips simply update whichever level-three entries are spanned by the object.

Given a pointer to a location within an object and the data structure outlined above, header lookups, as illustrated in FIG. 41, are straightforward. It is assumed that the IsValid() function reports whether a particular array element has been assigned since the most recent Reset instruction.

Deletion of objects can be accomplished by executing the Install algorithm with one minor modification: Instead of updating particular entries within the OSM hierarchy, the Delete algorithm invalidates those entries.

No changes to the existing algorithms are necessary to support creation of new objects nested entirely within previously created objects. Following installation of a small object within a larger one, a Lookup invocation that refers to the smaller object would find the start address of the smaller object. This capability is used during garbage collection to divide large objects that contain segments of garbage into multiple smaller objects, each containing live data. Following creation of a small object within a larger one, Lookup operations that refer to portions of the larger object not included within the smaller one are no longer guaranteed to report the header location of the enclosing object. Deletion does not work in the presence of object nesting since, rather than invalidating values within the OSM hierarchy when deleting an enclosed object, it may be necessary to restore the OSM entries to whatever value they held prior to installation of the smaller object.

It should be noted that each header lookup requires the reading of at most three different offsets—one from each of the three levels in the data structure described above. Installation of a header requires writing to at most three complete groups of memory cells—one from each of the three levels of the OSM data structure. In order to implement fast install and lookup instructions, each level of the data structure is stored in a separate array of dynamic random-access memory (DRAM) cells and each group of offsets is aligned with the row boundaries of the corresponding DRAM array.

By hardwiring parallel data paths to each of three memory arrays, it is possible to update all of the entries within three hierarchical groups of start offsets in a single memory cycle. Using the same parallel data paths, the three OSM entries required to respond to a Lookup request are also obtained in a single memory cycle. To implement the Reset instruction, each of the arrays, in parallel, sequentially overwrites each row of memory with zeros. Since the largest of these arrays in the preferred embodiment, level-one, has $2^{11}$ rows, this many memory cycles are required to perform a reset operation.

There are a large number of alternative ways to arrange three tiers of starting-offset pointers within three separate memory arrays. The optimal arrangement depends on a variety of factors such as: the combined sizes of the DRAM arrays; VLSI layout considerations (which ultimately determine how many OSM circuits fit on a single silicon wafer); the costs of decoders, fanout trees, control logic, and other support circuitry; and circuit depth (which is the maximum number of components through which a signal must propagate in servicing primitive operations). The configuration chosen for the preferred embodiment results in a chip that delivers a good ratio of total object locations to bits of DRAM and lends itself to a fairly dense rectangular VLSI layout. This chip supports a total of $2^{19}$ distinct object locations.

Each level-one group on the chip has eight memory cells for representing offsets. Each of the eight memory cells can store four bits of which three bits represent offsets within the group and the fourth bit marks invalid entries. Thus, there are 32 bits per group. Thirty-two 32-bit groups are stored on each row of the level-one DRAM array. To represent a total of $2^{19}$ distinct object locations, $2^{11}$ rows are required, each row holding $2^{10}$ bits. The total size of this array is thus $2^{10} \times 2^{11}$.

Since the level-one array holds $2^{16}$ groups, the level-two array must have this many memory cells. Each level-two group consists of 128 memory cells. Each memory cell stores 11 bits of which seven bits represent offsets within the level-two group, three bits represent offsets within the level-one group, and an eleventh bit flags invalid entries. Thus, there are a total of 128×11=1408 bits in each group. Only one group is stored on each row of the DRAM array. To represent $2^{16}$ different offsets, $2^9$ rows are needed in the level-two DRAM array. The total size of this array is thus $2^9 \times 1408$.

Since the level-two array holds 512 different groups, the single level-three group has this same number of memory cells. Each memory cell must store enough bits to represent negative offsets that point into adjacent OSM chip spaces. Thus, the total size of this array is $2^9 \times 32$.

The level-one, level-two, and level-three DRAM arrays together occupy less than three-quarters of the space required for a four-megabit DRAM chip. Recognizing that the control circuitry for an OSM chip is somewhat greater than that required for a conventional DRAM chip, it is anticipated that a single OSM chip of approximately the same transistor density as a conventional four-megabit DRAM will be capable of representing $2^{19}$ object locations. If all objects are aligned on four-word boundaries, then 16 four-Megabit DRAMs are required to represent $2^{19}$ distinct objects ($2^{21}$ four-byte words). Thus, one OSM chip is required for every 16 DRAM chips in the preferred embodiment.

The information required by the OSM to perform lookups can be compressed so as to reduce the complexity and costs of the OSM chips required to implement the GCMM. Note, for example, that the first memory cell in each level-two group is never used because any object that spans the boundary of the level-one group controlled by this memory cell must necessarily begin outside the segment of memory controlled by the level-two group. Similarly, note that the largest offset to be stored in the second memory cell of a level-two group is the size of a level-one group. And the largest offset to be stored in the third memory cell of a level-two group is twice the size of a level-one group. Thus, certain entries in the OSM hierarchy do not make use of all the bits reserved for them in the analysis above. For example, the analysis above assumed that each level-one group would consist of eight entries with 4 bits per entry. This data can be compressed by discarding 3 bits from the first entry, 2 bits from the second entry, and 1 bit from each of the third and fourth entries. All of the discarded bits are hardwired to logical zero. By eliminating extraneous bits from the DRAM arrays, the level-one array can be reduced from 2,097,152 bits to 1,638,400 bits and the level-two array can be reduced from 720,896 bits to 653,824 bits.

Further compression is made possible by removing redundant information from the upper levels of the OSM hierarchy. Each entry in level two records the number of the level-one group that controls the memory that contains the start of the object in question in its most significant bits and represents the offset of the object's start within the level-one group in its least significant bits. This offset is redundant with information already provided in the last entry of the corresponding level-one group. By removing this redundant information from each entry in level two, we can further reduce the OSM implementation hardware. In particular, 512×128×3=196,608 bits can be removed from the level-two memory. The savings offered by this compression are rather small in comparison to the total size of the OSM. The cost of this optimization is an extra memory cycle in the worst-case cost to look up an object header and is not recommended.

Garbage collection consists of copying live data out of one memory region called from-space into another memory region called to-space. After objects are copied, certain objects are scanned. Both copying and scanning is done incrementally. During garbage collection, to-space is divided into segments containing objects in different intermediate stages of garbage collection. Segment boundaries are delimited by several dedicated registers within the arbiter 28 (FIG. 2). A typical configuration of these registers is illustrated in FIG. 42.

Within to-space, Relocated points to the beginning of the object currently being copied. Memory between CopyDest and CopyEnd is currently being copied from the block of memory within from-space referenced by the arbiter's CopySrc register. Memory between CopyEnd and Reserved has been reserved for copying objects, but only the first word of each of these objects has been copied into to-space. The word following the one-word header points to the true location of the object residing in from-space. Memory between Reserved and New is not currently reserved or in use. Objects to the right of New were allocated after the current garbage collection pass began.

The arbiter 28 (FIG. 2) governs the sharing of memory between the garbage collector and mutator. All memory fetches and stores issued by the garbage collector are performed by the arbiter. All memory fetches and stores issued by the mutator are monitored by the arbiter. In cases where the mutator's requested memory access temporarily conflicts with activities currently carried out by the garbage collector, the arbiter intercepts the mutator's memory access and provides whatever special handling is required to maintain system integrity.

The pseudo-code implementations of TendDesc, HandleRead, and HandleWrite make use of the declarations given in FIG. 43. The MemWord structure is intended to abstract the representation of 34-bit data words.

The arbiter 28 (FIG. 2) gives highest priority to supervising memory operations initiated by the BIU 16. Each time the BIU issues a RAM read operation by way of the local bus, the arbiter takes responsibility for assuring the validity of the data eventually returned to the mutator by the BIU. The algorithm implemented by the arbiter in monitoring read transactions is given in FIG. 44. Though the monitoring algorithm is expressed as sequential code, the conditional tests that determine how the BIU's request is handled are evaluated concurrently in parallel hardware.

Handling of BIU-initiated memory write operations is somewhat simpler. The psuedo-code is shown in FIG. 45.

A one-word memory cache represented in FIG. 6 by the CREG declaration is maintained within the arbiter 28 (FIG. 2). All of the memory fetches and stores required to implement the memory-monitoring routines described in FIGS. 32 and 33, including the memory operations issued to the RAM modules 20, 22 by the BIU 16 (FIG. 2), may hit the arbiter's cache. If they do, the corresponding memory transactions are redirected to the arbiter's cache instead of going to the RAM modules.

Memory operations initiated by the BIU 16 (FIG. 2) may interrupt work already in progress within the arbiter 28, RAM modules 20, 22, and OSM modules 24, 26. The arbiter's context switch is hardwired so as to be very fast. Furthermore, whenever the arbiter detects that one of the requests it issued previously to a RAM or OSM module has been interrupted, the arbiter reissues that request after the interrupting activity has been completed.

To minimize the complexity of interrupting the arbiter, several of the routines performed by the arbiter contain rollback points to which internal control backtracks whenever that routine is interrupted. The principal motivation for using rollback points is that the interrupting operation may result in changes to the system state. In these situations it is much easier to restart certain complicated computations than to suspend these computations with the system in one state, to resume them with the system in a modified state, and to automatically incorporate the system's state changes into the intermediate stages of the incomplete computation.

The next priority of the arbiter 28 (FIG. 2), after servicing of requests to RAM modules 20, 22 initiated by the BIU 16, is to service mutator requests for garbage collection operations. These operations are forwarded to the arbiter by way of the BIU. The encodings of these operations are detailed in FIG. 46.

The InitBlock routine initializes a block of no more than 32 words of memory to zero, setting the descriptor tag for each of the words according to the descriptor tags sent as arguments in the InitBlock invocation. The least significant bit is the descriptor tag corresponding to the first address in the block. The remaining bits are mapped in sequence to words within the memory block in increasing order. Any words within the block to be initialized that are write-protected are not overwritten by InitBlock. After initializing all of the words in the specified block, the arbiter asserts its ready signal on the internal bus 18 (FIG. 2).

The AllocRec routine decrements the New register by the specified size plus one word to hold the record's header. After creating a write-protected header for the record, the arbiter 28 (FIG. 2) asserts its ready signal. When the BIU 16 next reads from the arbiter's command port, the arbiter returns a pointer to the word following the newly-allocated record's header.

In response to AllocDSlice and AllocTSlice requests, the arbiter 28 (FIG. 2) must allocate both a three-word slice object and an appropriate amount of slice region data to be referenced by the slice object. Slice data regions are allocated in increments of 256 bytes.

In servicing AllocDSlice and AllocTSlice requests, the arbiter first allocates the appropriate amount of slice region data. If this requires creation of a new slice data region, then the arbiter must create the slice region's write-protected header and inform the OSM of the new object. Otherwise, the allocation consists simply of adjusting the values of two internal registers that represent the location and amount of free memory within the current allocation region for slice region data.

The first slice object allocated after a flip causes a slice data region of the specified size rounded up to the nearest multiple of 256 bytes to be allocated. Subsequent slice object allocations attempt to utilize the excess memory available in the previously allocated slice data region. If a particular slice allocation request does not fit within the previously allocated slice data region, the arbiter allocates a new slice data region by rounding the desired slice data size up to the nearest multiple of 256.

After satisfying the allocation request, the arbiter compares the amount of free space within the previous and newly allocated slice data regions. The arbiter continues to remember whichever of these two slice data regions contains the most free space in order to serve future slice data allocation needs.

After allocating the slice region data, the arbiter allocates the slice object by decrementing New by the size of three words and initializing the three write-protected words to be the slice header, a pointer to the slice data, and the length of the slice data.

The only difference between a descriptor slice and a terminal slice is the format of the slice object's header.

Concurrent with initialization of the slice object, the arbiter informs the appropriate OSM module 24, 26 (FIG. 2) of the existence of the new slice data object.

After all of the relevant memory cells and the OSM module have been updated, the arbiter asserts its ready signal on the internal bus 18. The BIU 16 then reads the address of the newly-allocated slice object from the arbiter's command port.

The AllocDSubSlice and AllocTSubSlice routines allocate a slice object by decrementing New by the size of three words and initializing this data as three write-protected words representing the slice header, a pointer to the slice data, and the length of the slice data. The only difference between a descriptor slice and a terminal slice is the format of the slice object's header.

After all of the relevant memory cells and the appropriate OSM module 24, 26 (FIG. 2) have been updated, the arbiter 28 asserts its ready signal on the internal bus 18. The BIU then reads the address of the newly-allocated slice object from the arbiter's command port.

The ReadRegister command allows the BIU 16 (FIG. 2) to obtain the current values of certain registers of the arbiter 28 which represent the intermediate state of the garbage collector. In response to a ReadRegister request, the arbiter copies the value of the requested register into its 64-bit command port and raises its ready signal. Prior to making the value of the GC-Result register available, the arbiter waits for any previously-issued allocation or TendDesc instructions to terminate. Thus, the mutator is stalled until the desired result is available.

TendDesc is only invoked during initialization of a new garbage collection pass. The algorithm for tending a descriptor is presented in FIG. 47.

After tending the descriptor passed as an argument to the TendDesc invocation, the arbiter 28 (FIG. 2) raises its ready signal.

After the mutator has tended all of its descriptors, the mutator indicates that no more descriptors need to be tended by invoking the TendingDone primitive. Upon receipt of this command code, the arbiter 28 (FIG. 2) awakens the microprocessor 30 so it can resume copying and scanning of live objects referenced by the tended descriptors. Then the arbiter 28 signals "ready" to acknowledge receipt of the command.

The third priority of the arbiter 28 (FIG. 2) is to service requests issued by the GCMM microprocessor 30. Garbage collection executes as a low-priority task under the direction of the microprocessor. Whenever the mutator requires access to garbage-collected memory, garbage collection is interrupted to service the request. Care must be taken when interrupting the garbage collector to ensure that the integrity of garbage collection is not violated.

For example, one of the garbage-collection tasks implemented by the arbiter is to scan a region of memory. Scanning consists of reading each word in the region, tending any descriptors, and overwriting their values with the results of tending. If the mutator stores to the word currently being scanned after the garbage collector has fetched the word but before the updated word has been rewritten to memory, then it is important that the garbage collector abort (or restart) scanning of that particular word.

Similar concurrency control is necessary whenever the garbage collector enqueues an object onto the copying queue. The enqueue operation consists of reserving space in to-space into which the object will eventually be copied, overwriting the title of the original object with a forwarding pointer to the new location for the object, and writing a title and source pointer into the first two words of the space reserved for eventual copying. Suppose the mutator interrupts garbage collection after space has been reserved for an object to be copied, but before any of the links have been written to memory. If the mutator requests to fetch a pointer that happens to refer to the same object that was being queued for copying, the arbiter will automatically place the object on the copy queue and update the pointer before returning the pointer's value. Since the interrupted garbage collection operation has not yet overwritten the original object's title with a forwarding pointer, the arbiter does not know that memory has already been set aside for the to-space copy of the object. Thus, without special concurrency controls, the arbiter would reserve a new block of memory for the object's copy. Then, when the interrupted garbage collection operation is resumed, the forwarding pointer for the original object would be overwritten to point to the memory originally reserved for the object's copy. The result of this is that some of the pointers originally referring to the object are updated to point to the memory reserved for the first copy of the object, and some pointers are updated to refer to the object's second copy.

A number of approaches might be employed to resolve these sorts of race conditions. The memory cycle accountings presented herein are based on the following techniques.

First, the arbiter 28 (FIG. 2) has a special cache register named CREG. This register is loaded with a memory value and a memory address. All memory stores and fetches that refer to the address held in the CREG's address field access CREG's data rather than memory.

Second, since the highest priority of the arbiter 28 (FIG. 2) is to service demand operations of the mutator, the goal is to minimize the time required to interrupt background garbage collection activities. To reduce the complexity of the required circuitry, critical sections of garbage collection code simply roll back to a safe restart point whenever they are resumed after being interrupted.

The memory-cycle accountings reported below assume that the routines execute without interruption. If certain routines are interrupted, they will roll back to a safe restart point and require additional memory cycles to complete execution. In cases where the frequency of interrupting background activities is so high as to negatively impact system throughput, the mutator's forward progress is automatically slowed appropriately by requiring longer delays on allocation requests, as controlled by the ScanBalance state variable described earlier.

The microprocessor 30 (FIG. 2) issues requests by encoding the requests as 64-bit words, raising the microprocessor's private ready signal and making the encoded request available in the microprocessor's command port. Whenever the arbiter 28 is otherwise idle, it examines the microprocessor's ready signal to see if the microprocessor has pending work requests. If the ready signal is on, the arbiter reads the encoded work request from the microprocessor's command port. The arbiter works on the microprocessor's request as a background activity, giving highest priority to monitoring requests of RAM modules 20, 22 initiated by the BIU 16 and servicing of other mutator requests. Upon completing the microprocessor's work request, the arbiter writes a 64-bit encoded status and/or result value to the microprocessor's command port.

The microprocessor's work requests are encoded as described in FIG. 48. The operations performed by the arbiter on behalf of the microprocessor are summarized below.

The CopyBlock operation takes arguments representing the source address of a from-space block of memory to be copied into to-space and the size of the block measured in words. The destination of the copy is the value held in the Relocated register (see FIG. 42) of the arbiter 28 (FIG. 2). CopyBlock initializes the CopySrc register to point to the source block, copies the value of the Relocated register into the CopyDest register, and sets the CopyEnd register to point just beyond the block of memory into which the from-space object is to be copied. Then CopyBlock incrementally copies words from CopySrc to CopyDest, incrementing each of these registers as each word is copied. After CopyDest catches up to CopyEnd, the value of CopyEnd is copied into the Relocated register and the arbiter writes a zero value to the command port of the microprocessor 30 indicating that the CopyBlock operation is complete.

Figure 49:
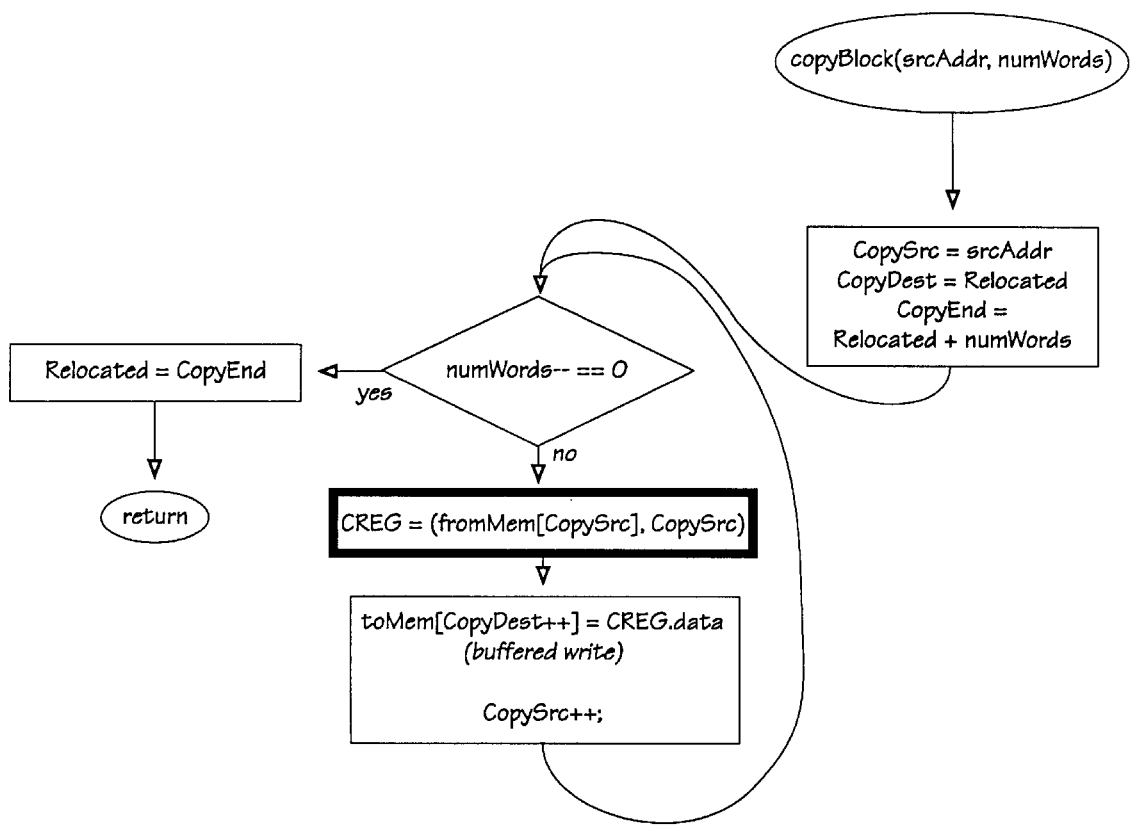
FIG. 49 is a flow diagram which describes the operation of incrementally copying data contained within a single from-space object to the Relocated address and maintaining the contents of the CopySrc, CopyDest, and CopyEnd registers during copying.

The CopyBlock routine is shown in FIG. 49. It is assumed that srcAddr points to at least numWords of contiguous data contained within a single from-space object. The routine incrementally copies this data to Relocated while maintaining the contents of the CopySrc, CopyDest, and CopyEnd registers during copying. The worst-case time required to execute a copyBlock instruction is numWords memory cycles.

The CopyScanBlock operation is parameterized identically to the CopyBlock. Execution of CopyScanBlock differs from CopyBlock only in that each descriptor copied by CopyScanBlock is tended while it is being copied.

Figure 50:
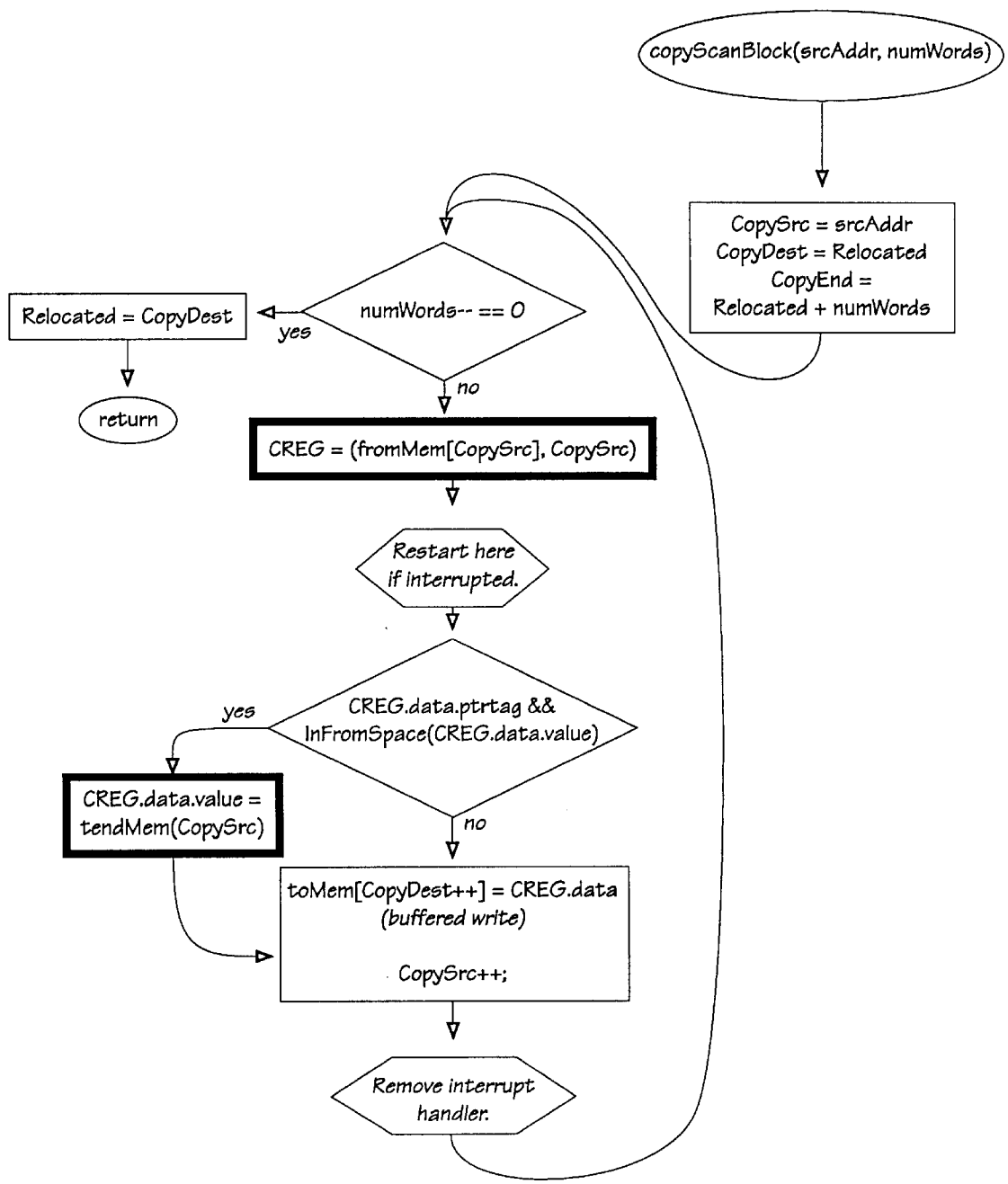
FIG. 50 is a flow diagram which describes the operation of incrementally scanning data contained within a single from-space object while copying it to the Relocated address and maintaining the contents of the CopySrc, CopyDest, and CopyEnd registers during copying.

The CopyScanBlock routine is shown in FIG. 50. It is assumed that srcAddr points to at least numWords of contiguous data contained within a single from-space object. The routine incrementally scans this data while copying it to Relocated while maintaining the contents of the CopySrc, CopyDest, and CopyEnd registers during copying.

Figure 51:
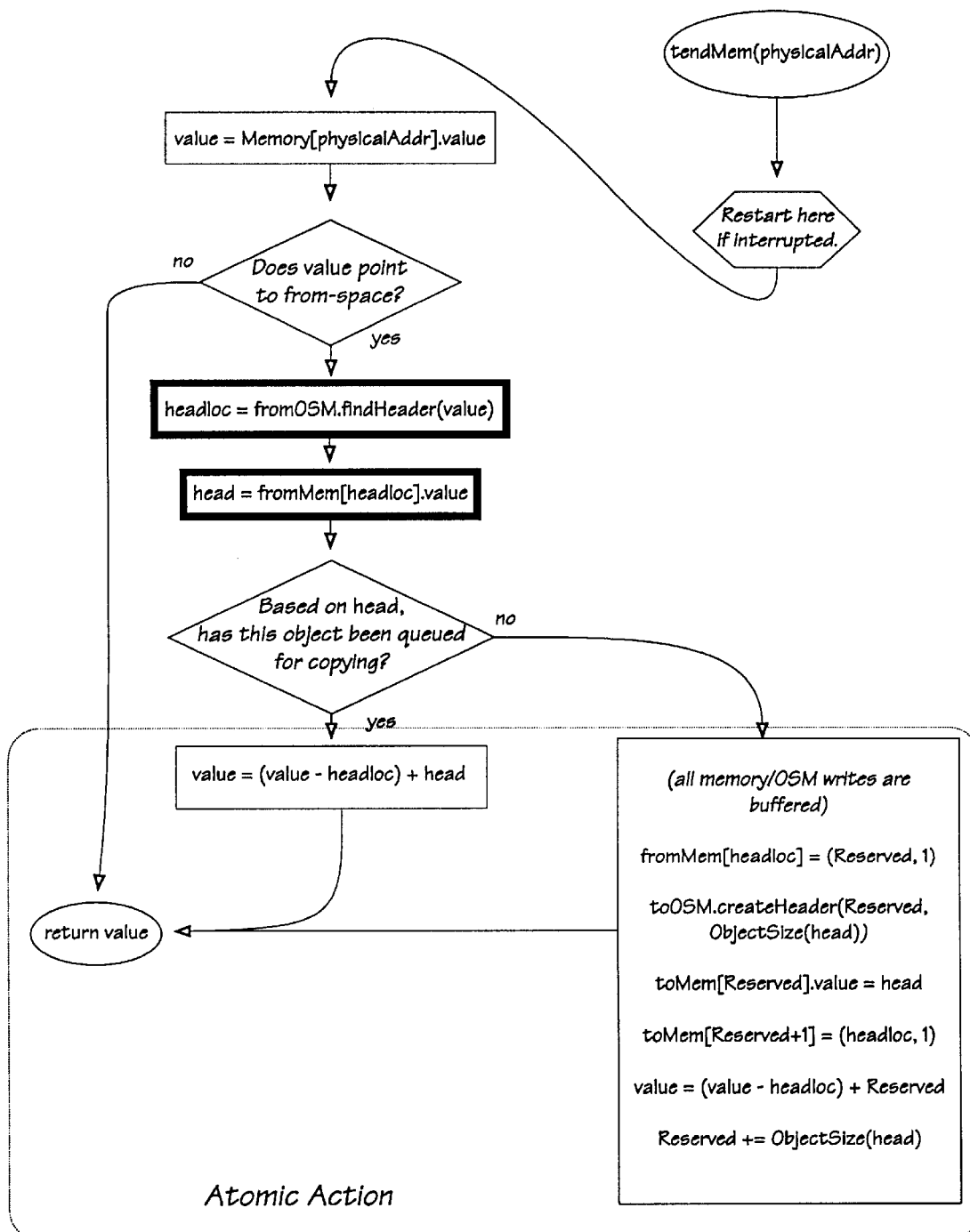
FIG. 51 is a flow diagram which describes the operation of tending a descriptor held in memory.

The tendMem subroutine referred to in FIG. 50 is shown in FIG. 51. The routine tends the descriptor held in the memory location named by its physicalAddr argument. Since tendMem assumes that the word of memory to be tended is held in the CREG register, the word can be fetched without accessing the memory system. Note that the large box containing multiple buffered writes to memory and the OSM modules 24, 26 (FIG. 2) stores two values to to-space, one value to from-space, and issues a single update request to the to-space OSM module. The path to this large box includes one read from the from-space OSM module and one read out of from-space memory. While these reads are being executed, other memory and OSM modules are able to process buffered write requests. Each module is guaranteed sufficient idle cycles to prepare its write buffers to hold all of the new requests to be buffered when the large box at the end of the tendMem operation eventually executes. The worst-case time required to execute a tendMem instruction is two memory cycles.

The ScanBlock operation examines each word of memory within a particular range and tends any descriptors found therein. This operation is parameterized with the starting address of the region to be examined and the number of words in the region. After tending all of the descriptors in the specified region, the arbiter 28 (FIG. 2) writes a zero value to the command port of the microprocessor 30 indicating that the ScanBlock operation is complete.

The ScanBlock routine is shown in FIG. 52. It is assumed that addr points to at least numWords of contiguous data contained within a single to-space object. The data is incrementally scanned. The worst-case time required to execute ScanBlock is four times numWords memory cycles.

To examine the contents of one of the RAM modules 20, 22 (FIG. 2), the microprocessor 30 must request that the arbiter 28 intercede on its behalf. The ReadWord operation, which is parameterized with the address of the word to be fetched, serves this purpose. After fetching the desired word, the arbiter writes the entire 34-bit word to the microprocessor's command port. This operation requires one memory cycle to execute.

Similarly, updates of the RAM modules 20, 22 (FIG. 2) must also be directed by way of the arbiter 28. The WriteWord operation is parameterized with the 25-bit address representing the RAM module location to be updated and the 34-bit data word to be stored in that location. After updating the memory, the arbiter writes a zero value to the command port of the microprocessor 30 indicating that the WriteWord operation is complete. This operation requires one memory cycle to execute.

Communication between the microprocessor 30 (FIG. 2) and the OSM modules 24, 26 must also be mediated by the arbiter 28. To install a new object into the OSM module's data base, the microprocessor passes a CreateHeader request to the arbiter by way of the microprocessor's command port. After installing the object into the appropriate OSM module, the arbiter writes a zero value to the microprocessor's command port, indicating completion of the CreateHeader operation. To look up the location of the header that corresponds to a particular address location, the microprocessor encodes a FindHeader request and communicates this to the arbiter by way of the microprocessor's command port. To signal completion of the operation, the arbiter writes the address of the header back to the microprocessor's command port. The FindHeader operation requires one memory cycle to execute.

The IncScanned, IncRelocated, IncReserved, IncTotalSlices, and IncScannedSlices primitives are each parameterized with a 25-bit signed offset to be added respectively to the internal registers Scanned, Relocated, Reserved, TotalSlices, or ScannedSlices of the arbiter 28 (FIG. 2). After the specified offset has been added to the appropriate register, the arbiter writes the new value of the register to the command port of the microprocessor 30 indicating that the operation is complete. To obtain the current contents of one of these registers without modifying its value, the microprocessor invokes the appropriate primitive and requests that the register's value be incremented by zero.

The ZapFromSpace primitive is invoked by the microprocessor 30 (FIG. 2) after all other phases of the current garbage collection pass have been completed. This primitive causes the arbiter 28 to reset the RAM module 20 or 22 and the OSM module 24 or 26 that represent the current from-space. The arbiter 28 does this in preparation for the subsequent garbage collection pass, during which the current from-space will serve as the new to-space. By initializing from-space prior to the start of the next garbage collection pass, the garbage collector is able to guarantee that all of the memory within every newly-allocated object contains zeros at the time of the object's allocation. Furthermore, it is necessary to clear out the previous contents of the current from-space OSM module before installing any new header locations into the OSM module's data base. The number of memory cycles required to implement this instruction is no greater than the total number of words in from-space.

After initializing the RAM and OSM modules, the arbiter waits for a TendingDone invocation to arrive at its command port from the BIU 16. After servicing the BIU's request, the arbiter writes a value of zero to the microprocessor's command register indicating that it is time to exchange the roles of to- and from-space in order to begin a new garbage collection pass.

The microprocessor 30 (FIG. 2) oversees garbage collection by issuing requests to the arbiter 28. A single 64-bit port supports communication between the microprocessor and the arbiter 28. The microprocessor encodes arbiter requests and writes them to this port. The arbiter reads from this port whenever it is able to begin servicing a new garbage collection task. Upon completion of the task, the arbiter writes a status and/or result code to the same port. After examining the return code provided by the arbiter, the microprocessor may issue a new arbiter request by making a new encoded instruction available to the arbiter by way of the microprocessor's command port.

The microprocessor 30 (FIG. 2) repeatedly issues commands to the arbiter 28 and then awaits their results. The two function prototypes shown in FIG. 53 abstract the interface between the microprocessor and the arbiter. Arbiter requests are encoded as described in FIG. 48. The constants shown in FIG. 54 represent the operation code portion of the operation encodings.

The type declarations shown in FIG. 55 are used in the C++ implementation of the garbage collection code that runs on the microprocessor 30 (FIG. 2). The main point of these declarations is to emphasize the number of bits required to represent values of different types. Since each bank of memory is 16 MBytes large, 24 bits is adequate to represent an address within either memory bank. An additional bit is required to distinguish to-space from from-space. If the size of an object is known to be word-aligned, then a 22-bit unsigned integer is sufficiently large to represent the size of the largest object supported by the garbage collection system.

Each dynamically-allocated object is tagged in the least significant two bits of its one-word header. The corresponding declarations are shown in FIG. 56.

During garbage collection, all slice regions within which any data is still live are copied in their entirety into to-space. After copying the slice region, the original slice region is overwritten with a region control block. Because each slice region must be large enough to represent its own control block, all slice regions must contain a total of at least seven words. The garbage collector searches for holes of unaccessed data (garbage) between segments of live data originating in different subregions. In order to eventually find all of the garbage contained within slice regions, the garbage collector aligns subregions at a different offset relative to the beginning of the slice region on each pass of the garbage collector. The byte offset of subregion alignments is represented by the ProbeOffset variable. Definitions supporting this process are given in FIG. 57.

The final phase of garbage collection is to postprocess control blocks, carving each of the controlled regions into smaller regions containing the contiguous segments of live data described by the region's control block. The memory found between segments of live data within each slice region will be reclaimed by the next pass of the garbage collector. Between the time that a slice data region is copied into to-space and the time when the slice data region is eventually postprocessed, the header of the slice region holds a pointer to the region's control block. The two least-significant bits of the control block pointer identify the object as a slice data region. These two bits are masked out of the header word to obtain the pointer value. The two C++ routines shown in FIG. 58 implement the necessary bit manipulations.

Every word of memory is accompanied by one tag bit that distinguishes terminal from descriptor data and another tag bit that identifies write-protected memory. The values of these flags are represented by the constant declarations shown in FIG. 59.

For records and slice data regions, the size of the object measured in bytes is obtained by masking out the two least significant bits from the object's header as indicated in FIG. 60. All slice object preambles have the same size.

The declarations shown in FIG. 61 represent the configuration of the GCMM.

The global pending operation variable defined in FIG. 62 remembers whether the arbiter 28 (FIG. 2) is currently working on an operation whose completion has not yet been verified. This variable is utilized in functions that abstract the interface between the microprocessor 30 and the arbiter and which are presented in FIGS. 47, 48, and 49.

The arbiter may service only one request at a time. If a particular arbiter service returns a value that is relevant to subsequent garbage collection efforts, the microprocessor generally waits for that value to be returned by the arbiter before continuing. However, with arbiter primitives for which the return value is not important, the microprocessor needs only to make sure that it does not issue a subsequent request until the previously-issued request has been completed.

Before issuing a new command to the arbiter, the microprocessor checks to see whether the previously-issued command has been completed. If not, the microprocessor first reads from the shared command port. This forces the microprocessor to stall until the arbiter delivers a response to the previously-issued command.

Of the functions that represent the interface between the arbiter and the microprocessor, those functions that return no result are presented in FIGS. 62, 63, and 64. Library routines that return arbiter responses to the requested operations specified are given in FIG. 65.

A C++ implementation of the garbage collector is given in FIGS. 66 through 74. Control begins in the main function.

With reference to FIG. 66, the Reserved register of the arbiter 28 (FIG. 2) is incremented automatically whenever space for a newly-discovered live object must be allocated. Automatic incrementation is triggered within the arbiter by TendDesc invocations and memory fetches issued by the mutator or by CopyScanBlock and ScanBlock invocations issued by the microprocessor 30. Whenever it must decide which garbage collection activity to work on next, the microprocessor first updates the value of its Reserved register. Having updated this value, the garbage collector gives highest priority to copying of objects for which space has been reserved by the arbiter, second priority to scanning of objects already copied, third priority to postprocessing of slice region control blocks, and fourth priority to reinitializing the current from-space in preparation for the next pass of the garbage collector. The zapFromSpace invocation does not terminate until after the mutator has initiated a new garbage collection.

The code used to copy an object into to-space is given in FIG. 67. Note that slice objects and records are handled identically. In both cases, all descriptors within these objects are tended during the copying process. Since all copying takes priority over scanning, we are assured that the slice data region will have been copied into to-space prior to scanning of the slice object that references the data region.

Copying of slice data regions is accompanied by initialization of a slice region control block, as exhibited by the two functions given in FIG. 68. Each subregion control block keeps track of all the live slice objects whose memory originates within that particular subregion. The length field of each subregion is initialized to zero when the region control block is created.

When a slice object is scanned, the control block for the associated slice region is updated to identify the live data within that slice region. Additionally, if the slice object is identified in its header as a descriptor slice, the corresponding slice region data is rescanned and any descriptors referenced by this particular slice object are tended. Since slice region data may be shared between multiple slice objects, the scanning of slice region data that is triggered by slice object scanning is occasionally redundant. The implementation is shown in FIG. 69.

The last phase of garbage collection consists of examining each of the region control blocks on the linked list headed by the ControlBlocks pointer and dividing each of the slice regions that contains garbage into smaller regions containing live data. The macro definitions shown in FIG. 70 are used in the implementations of doControlBlock and makeSmallDataRegion shown in FIGS. 70, 71, and 73. The AlignUp and AlignDown macros take a machine address as their parameter and round this address up or down respectively to align the address with a word boundary. The obsolete slice region data located between the smaller regions created by doControlBlock will be reclaimed during the next pass of the garbage collector.

The endContiguous function shown in FIG. 72 takes responsibility for deciding when to divide a single slice data region into multiple smaller regions, the decision being based on a variety of conditions. In particular, the current segment of contiguous data must end before the next segment of live data begins, and there must be sufficient space in between the two live regions to hold an aligned header for the second of the two live regions. Furthermore, the first of the two live regions must be at least SmallestDataSize words large, and there must be at least SmallestDataSize words remaining in the enclosing slice data region so as to make sure that the second of the two smaller regions will be no smaller than SmallestDataSize words.

Whenever the garbage collector isolates a sufficiently large contiguous span of live slice region data, it encapsulates this slice data into a smaller slice region by invoking the makeSmallDataRegion function. Prior to calling makeSmallDataRegion, the garbage collector verifies that there is sufficient room for a one-word aligned header preceding the data and that the complete size of the small data region that is to be constructed is at least SmallestDataSize words large. The implementation of makeSmallDataRegion is shown in FIG. 73.

Weak pointers can also be handled within the framework of the GCMM. Weak pointers (see J. S. Miller, "Multischeme: A Parallel Processing System Based on MIT Scheme", MIT/LCS/Tech. Rep.-402, Ph.D. Thesis, 1987) have the following attributes: (1) If only weak pointers reference a GCMM-allocated object, the object is garbage; and (2) if at least one live strong (traditional) pointer references a GCMM-allocated object, the object is not garbage. When an object referenced by only weak pointers is garbage-collected, each of the weak pointers to the object is overwritten with zero. When a live object having both weak and strong pointers is copied into to-space, both weak and strong pointers to the object are updated to reflect its new location.

There are many important applications that benefit from garbage collection support for weak pointers. Miller describes, for example, a hashing function built into Multi-Scheme that associates a unique integer with each object (see reference given above). The hashing libraries retain a weak pointer to each object that has requested a hash number so that subsequent requests for the hash identity of the same object map to the same integer number. If garbage collection finds that the only pointers to certain objects originate in the hashing system, then the object is reclaimed, the hashing system eventually discovers that the weak pointer to the object has been overwritten with zero, and the integer previously associated with that object is recycled.

Other applications for which weak pointers are very useful include support for symbolic debugging, automatic garbage collection of idle processes (processes whose results cannot possibly result in either direct or indirect I/O), automatic closing of files that are no longer being used, and implementation of MIT Scheme's population data type.

Within the framework of the GCMM described herein, support for weak pointers is obtained in the following way. A new primitive data type called WeakPointer is defined. As previously discussed, each object title describes both the type and the size of the object. The least significant two bits describe the type, and the remaining bits describe the object's size in words. No object can be larger than to-space, and to-space can be no larger than half of the system's addressable memory. Therefore, the title's most significant bit is not needed to represent the object's size and can be used instead to distinguish the WeakPointer type. The WeakPointer object contains a single pointer.

When WeakPointer objects are copied into to-space, they are threaded onto a list of WeakPointer objects waiting to be postprocessed. The pointer field within the WeakPointer object is not tended during copying. One ScanBalance point is charged for each word of the WeakPointer object that is copied.

Postprocessing of the WeakPointer list follows postprocessing of the slice region control blocks. Postprocessing consists of examining the object referenced by the weak pointer to determine whether it has been copied into to-space. If the object referenced by the weak pointer has been copied, the weak pointer is updated to reflect the object's new location. Otherwise, the weakpointer is overwritten with zero. The garbage collector decrements ScanBalance by the size of a WeakPointer object after postprocessing of each WeakPointer object.

If, during garbage collection, the data field of a WeakPointer object is fetched, the garbage collector recognizes that the requested pointer data has not yet been tended and tends it before returning its value. To read the data value of a WeakPointer object into a register is to create a strong pointer (the machine register) to the referenced object. Note that this case is handled without adding any sophistication to the WordRead primitive. That routine already checks memory words to see if they contain pointers to from-space before delivering their values to the mutator.

To allow the mutator to enquire regarding the status of a weak pointer without accidentally causing its pointer value to be tended, a new primitive operation called WeakStatus is provided. The argument to WeakStatus is a pointer to the weak pointer field. The return value is 0 if the field contains zero, 1 if the field points to live data, and −1 if the object referenced by the field has not yet been queued for copying into to-space.

Additional primitives might be provided to allow the mutator to participate in the postprocessing of WeakPointer objects. For example, the garbage collector might interrupt the mutator each time it overwrites a weak pointer field with zero. Similar functionality is described in the Miller reference given above.

The GCMM can also accommodate multi-tasking real-time applications that are safety critical and must run reliably. Consider, for example, garbage collection support for multiple tasks, some of which are safety critical, and others of which are simply interactive user applications. If a user task consumes all available memory, important safety critical applications may discover that sufficient memory is no longer available to meet their needs.

One way to protect against these sorts of problems is to place more than one garbage-collected memory module in a system. Traditional memory protection techniques would prevent processes from accessing regions of physical memory that belong to other processes (and reside within different memory modules).

Rather than dedicate a separate garbage-collected module to particular tasks, it is also possible to partition the memory within a single module. The arbiter in a memory-partitioning version would contain multiple sets of the registers (ScanBalance, Relocated, Reserved, New, etc.) required to garbage collect a single region. A front-end to the arbiter would select the appropriate partition and set of registers based on the addresses passed as arguments to particular operations. Traditional memory management hardware would protect particular address ranges from unauthorized access by unprivileged processes.

Another way to limit the amount of live memory available to particular processes is to tag each object with an identifier representing the process that allocated the object. The arbiter would have knowledge of how much memory each process is allowed to keep live and would refuse to exceed any process's allotment during relocation of live data into to-space. Rather than exceed the allotment, the arbiter would simply nullify pointers to objects that could not be copied. Meanwhile, the kernel would be notified that a particular process had exceeded its allocation limit. Most importantly, all processes that honored their allotment would continue to run unhampered.

Finally, it should be emphasized that although the preferred embodiment of the GCMM has been described in terms of garbage-collecting computer memory, another important application of the invention is garbage collection of computer disk storage. This application is immediately apparent if the RAM and OSM modules illustrated in FIG. 2 are replaced with functionally-equivalent custom-programmed disk interfaces. The OSM's would be aligned on disk sector boundaries rather than on the row boundaries of the RAM arrays.

What is claimed is:

1. A random access memory assembly (RAMA) comprising G random access memories (RAMs) identified by the integers from 1 to G, said RAMA having $\log_2 F$ address lines and G sets of data lines, $\log_2 F$ being an integer, one set of data lines being associated with each of said RAMs, said RAMA address lines being numbered from 1 to $\log_2 F$ in order of address bit significance, address line 1 corresponding to the most significant bit, the address lines for RAM H being address lines 1 to $\log_2(F/N_{H-1})$, H taking on every integer value from 1 to G, $\log_2 N_H$ being an integer less than or equal to $\log_2 F$, $N_G$ being equal to F, $N_0$ being equal to 1, the values of $N_H$ being different for different values of H.

2. The random access memory assembly (RAMA) of claim 1 wherein RAM H has at least $(\log_2 N_H)$ data lines.

3. The random access memory assembly (RAMA) of claim 1 wherein RAM H has at least $(\log_2(N_H/N_{H-1}))$ data lines.

* * * * *